April 4, 1961

L. C. PEARCE 2,977,733

SHEET DISTRIBUTING MECHANISM AND
RECEPTACLE CONVEYOR

Filed Oct. 17, 1957

INVENTOR.
LEWIS C. PEARCE

BY Hyde, Meyer, Baldwin & Doran

ATTORNEYS

April 4, 1961

L. C. PEARCE 2,977,733

SHEET DISTRIBUTING MECHANISM AND
RECEPTACLE CONVEYOR

Filed Oct. 17, 1957

INVENTOR.
LEWIS C. PEARCE
BY
Hyde, Meyer, Baldwin & Doran
ATTORNEYS

April 4, 1961
L. C. PEARCE
2,977,733
SHEET DISTRIBUTING MECHANISM AND
RECEPTACLE CONVEYOR
Filed Oct. 17, 1957
17 Sheets-Sheet 3
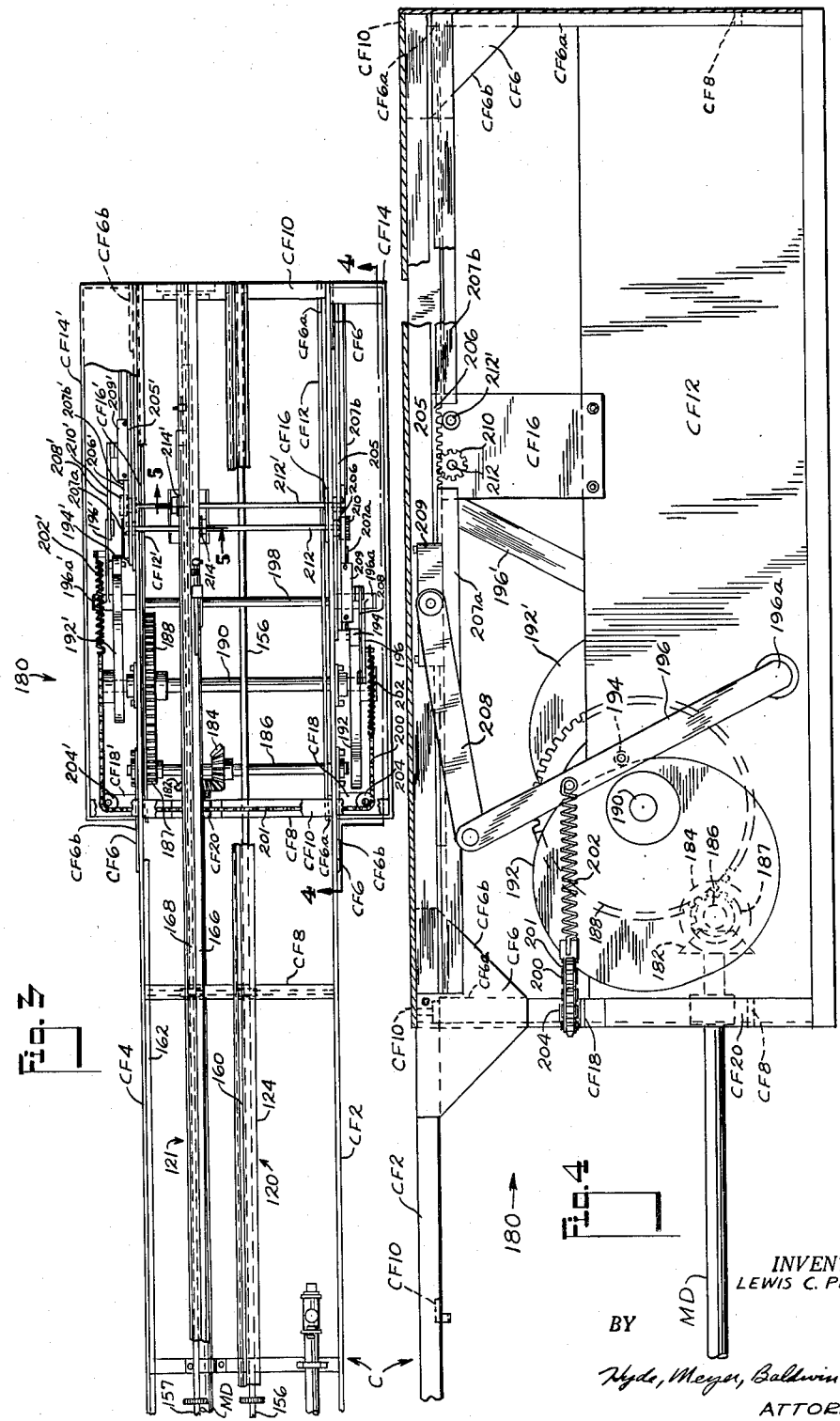
INVENTOR.
LEWIS C. PEARCE
BY
ATTORNEYS April 4, 1961
L. C. PEARCE
2,977,733
SHEET DISTRIBUTING MECHANISM AND
RECEPTACLE CONVEYOR
Filed Oct. 17, 1957
17 Sheets-Sheet 4
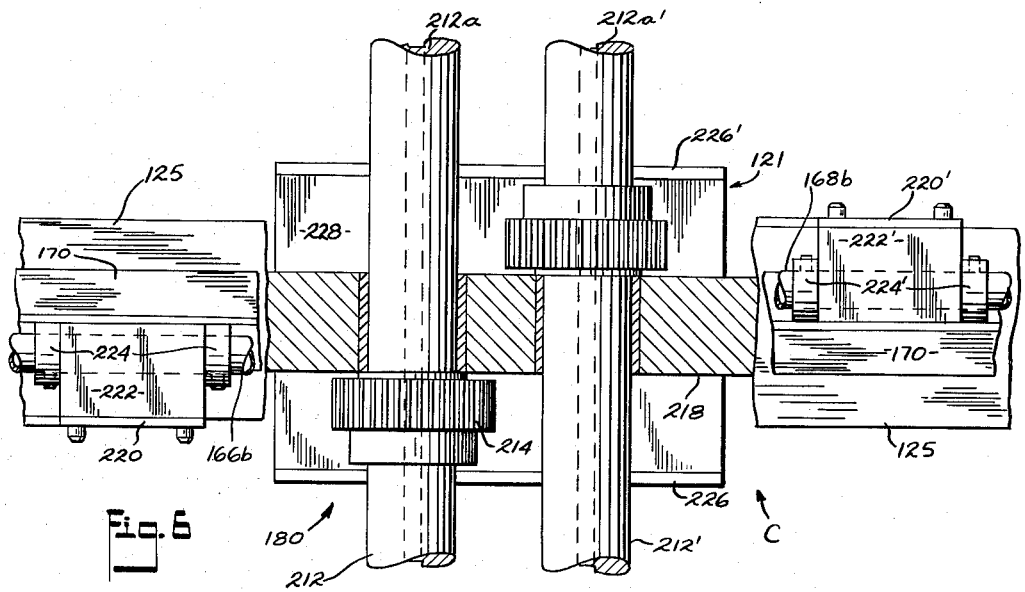
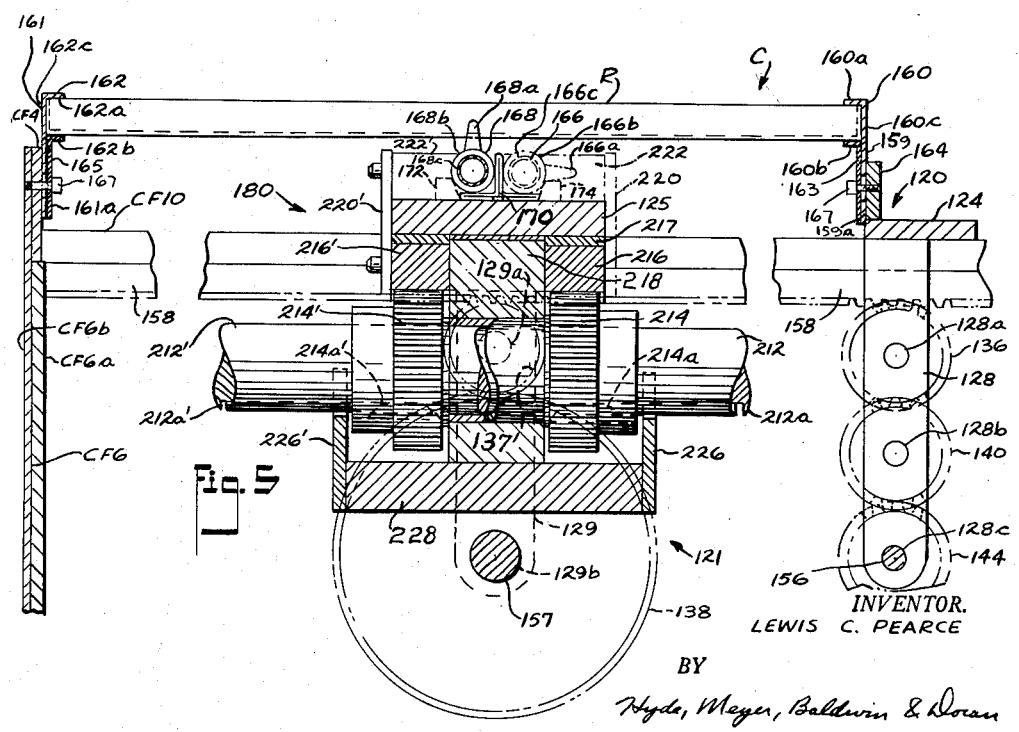
INVENTOR.
LEWIS C. PEARCE
BY
Hyde, Meyer, Baldwin & Doran
ATTORNEYS

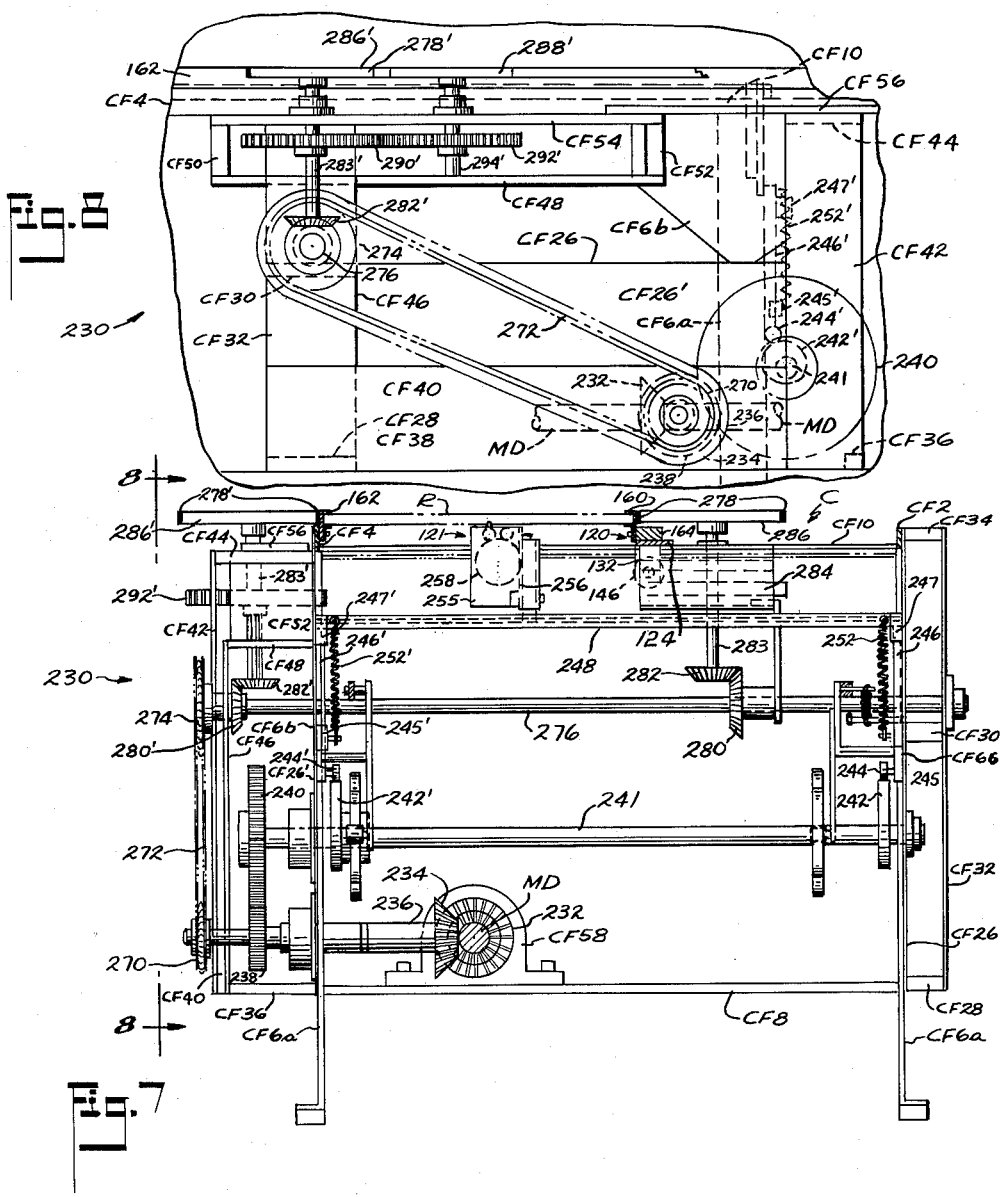

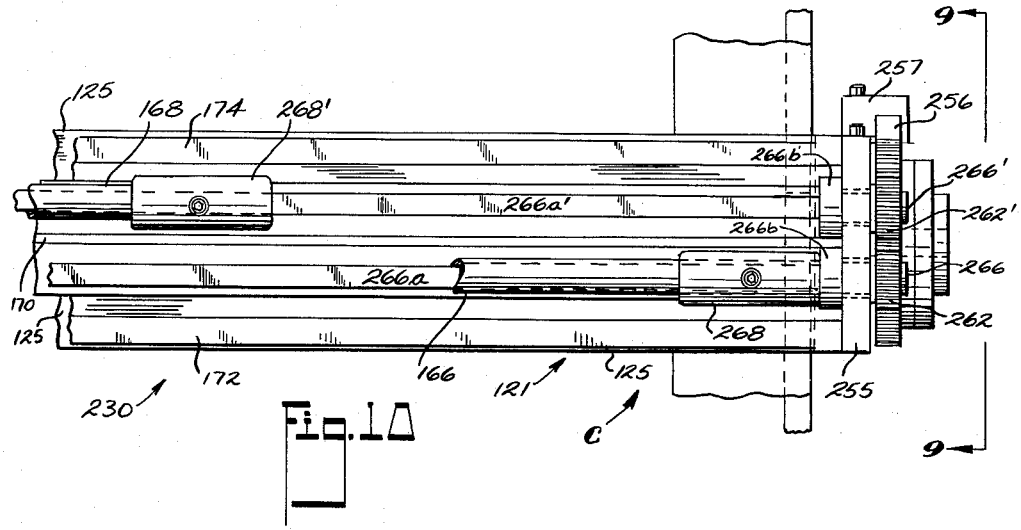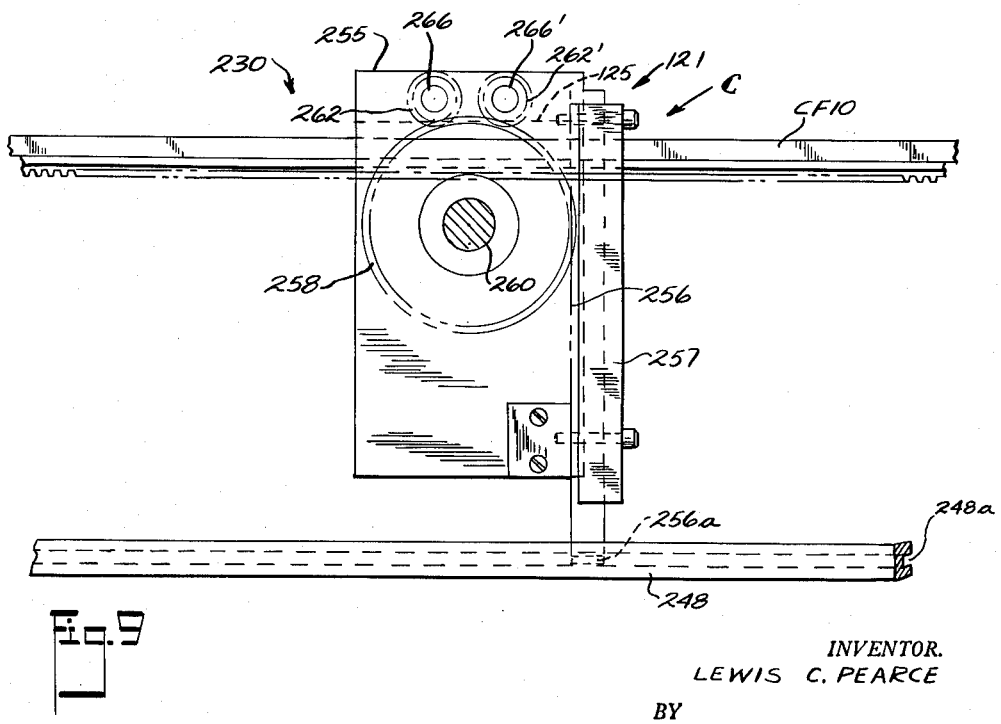

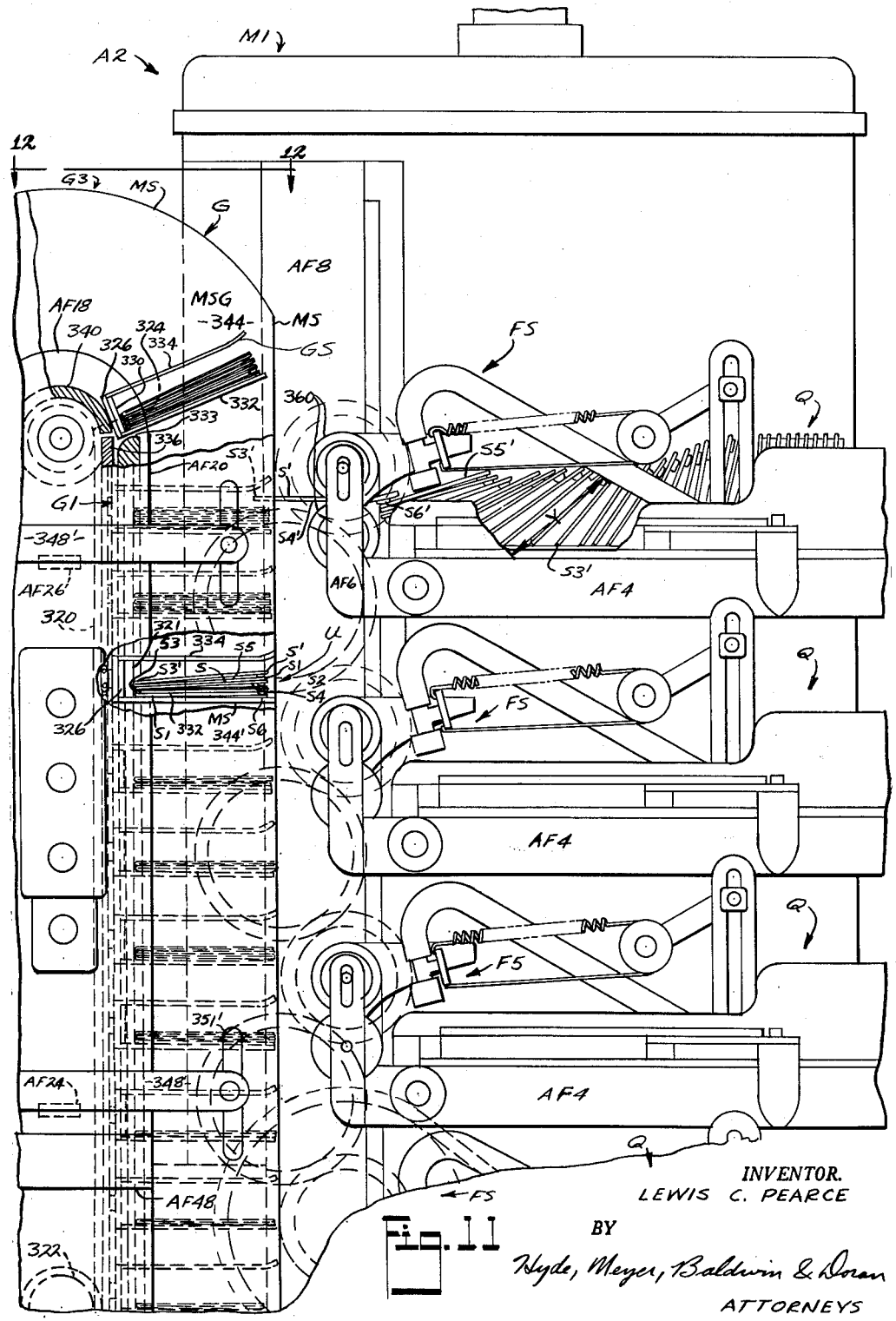

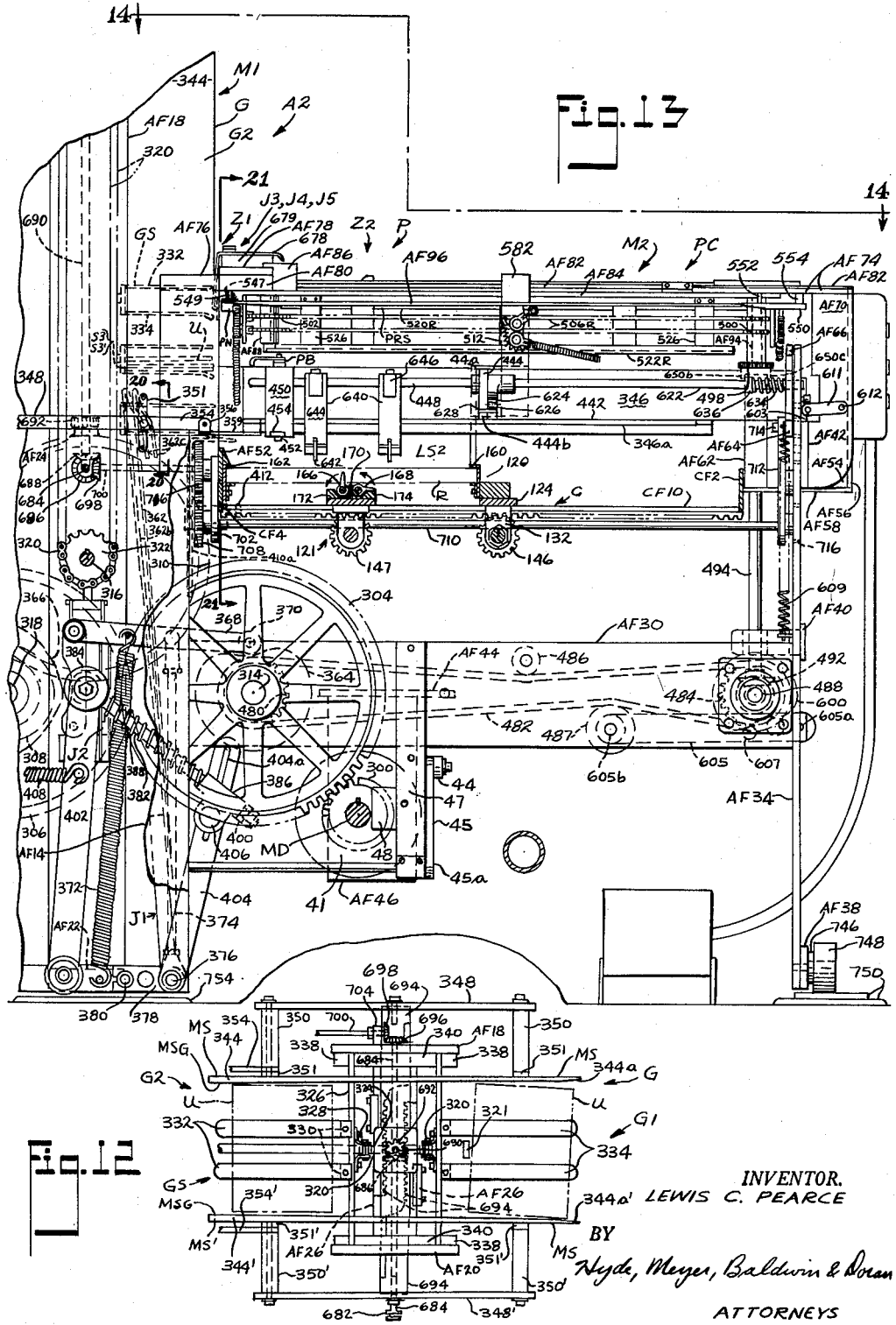

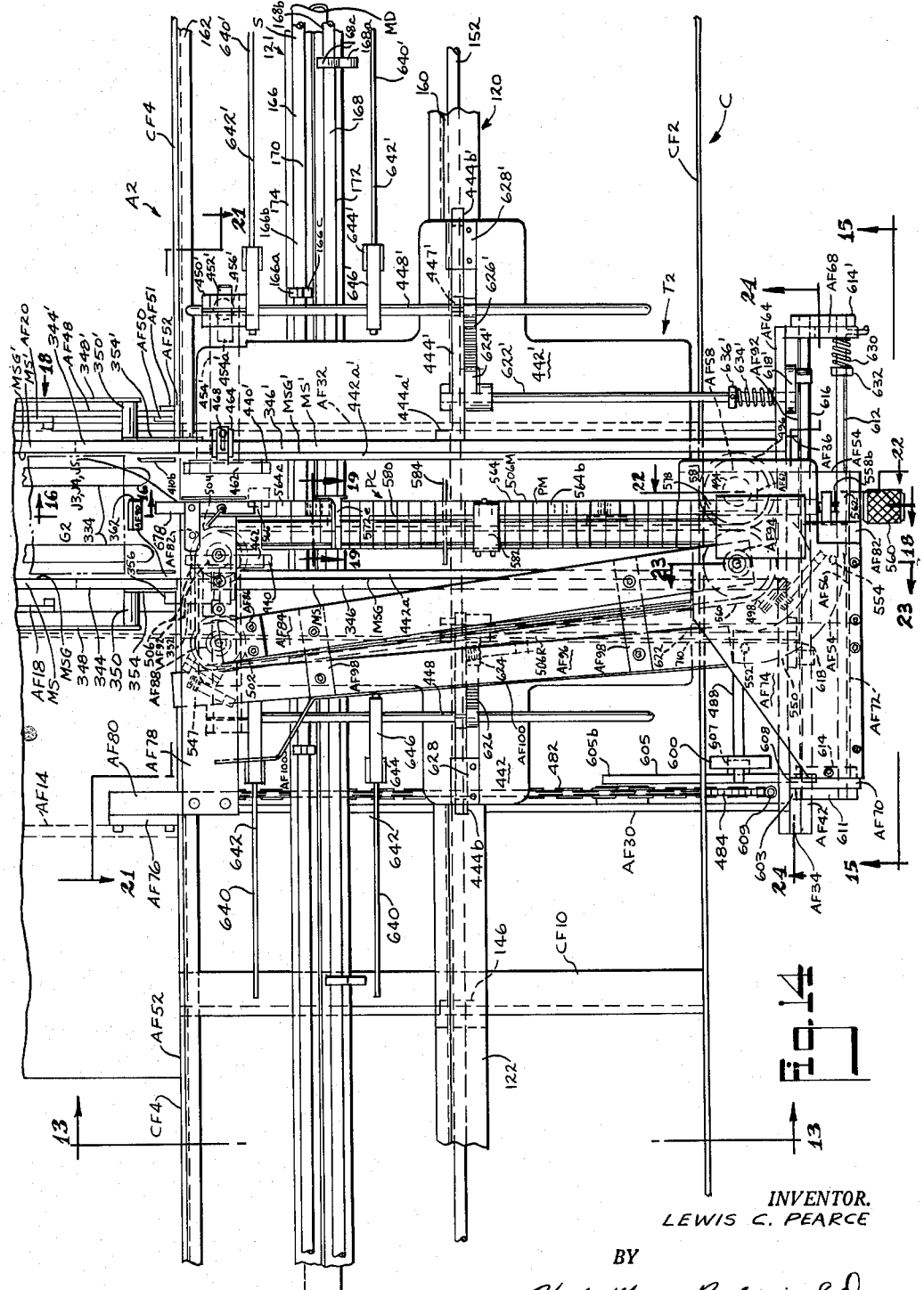

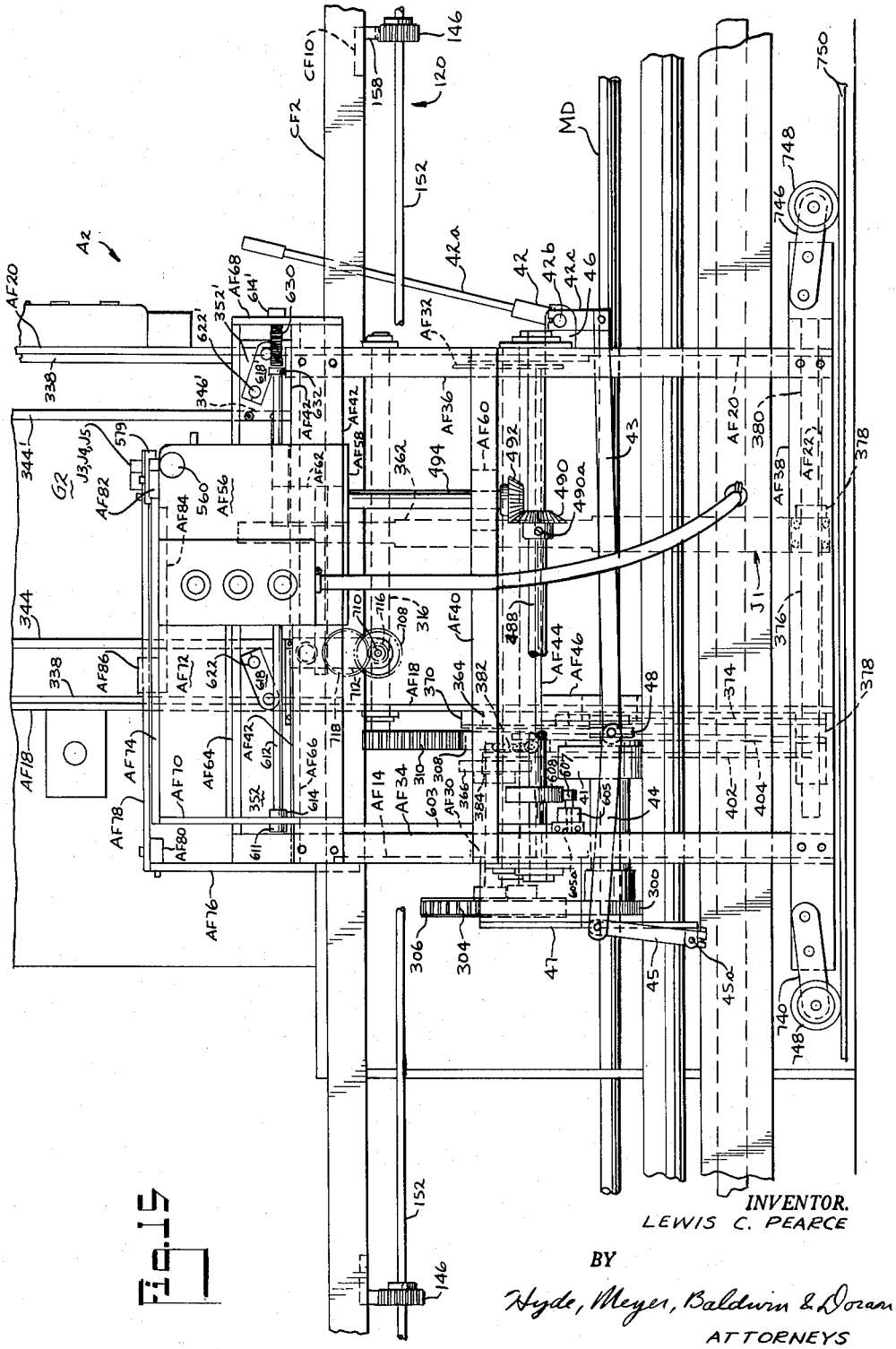

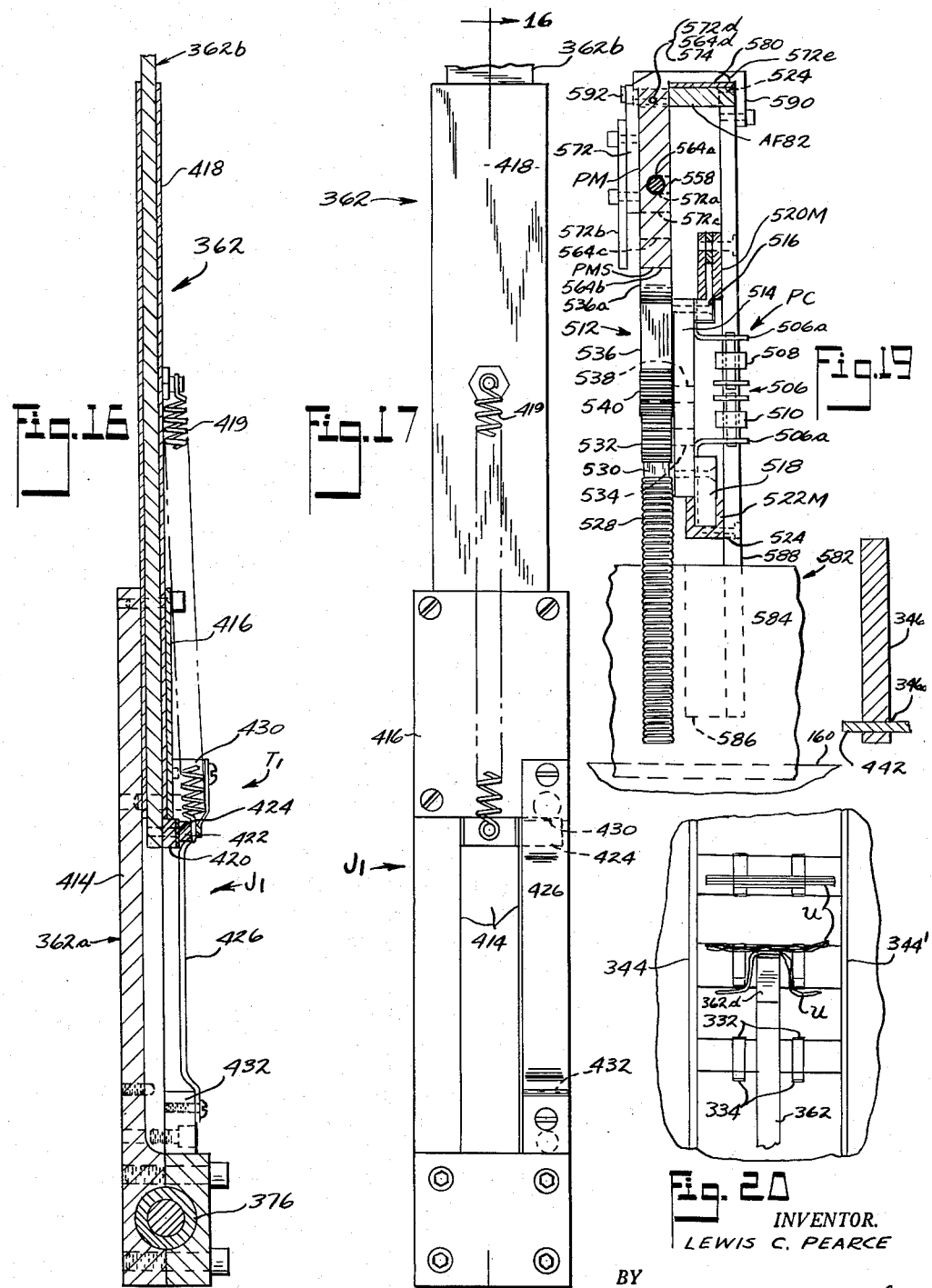

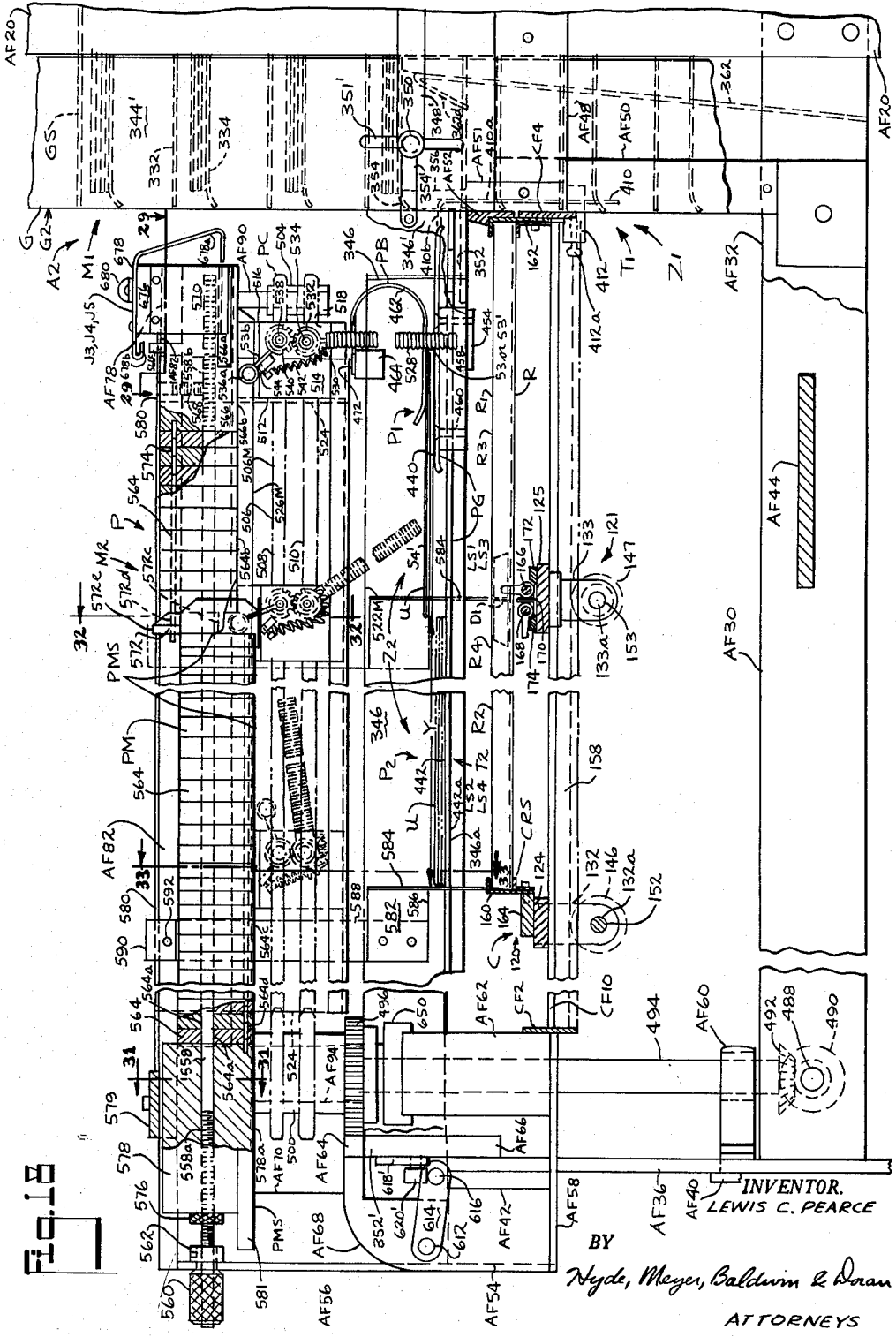

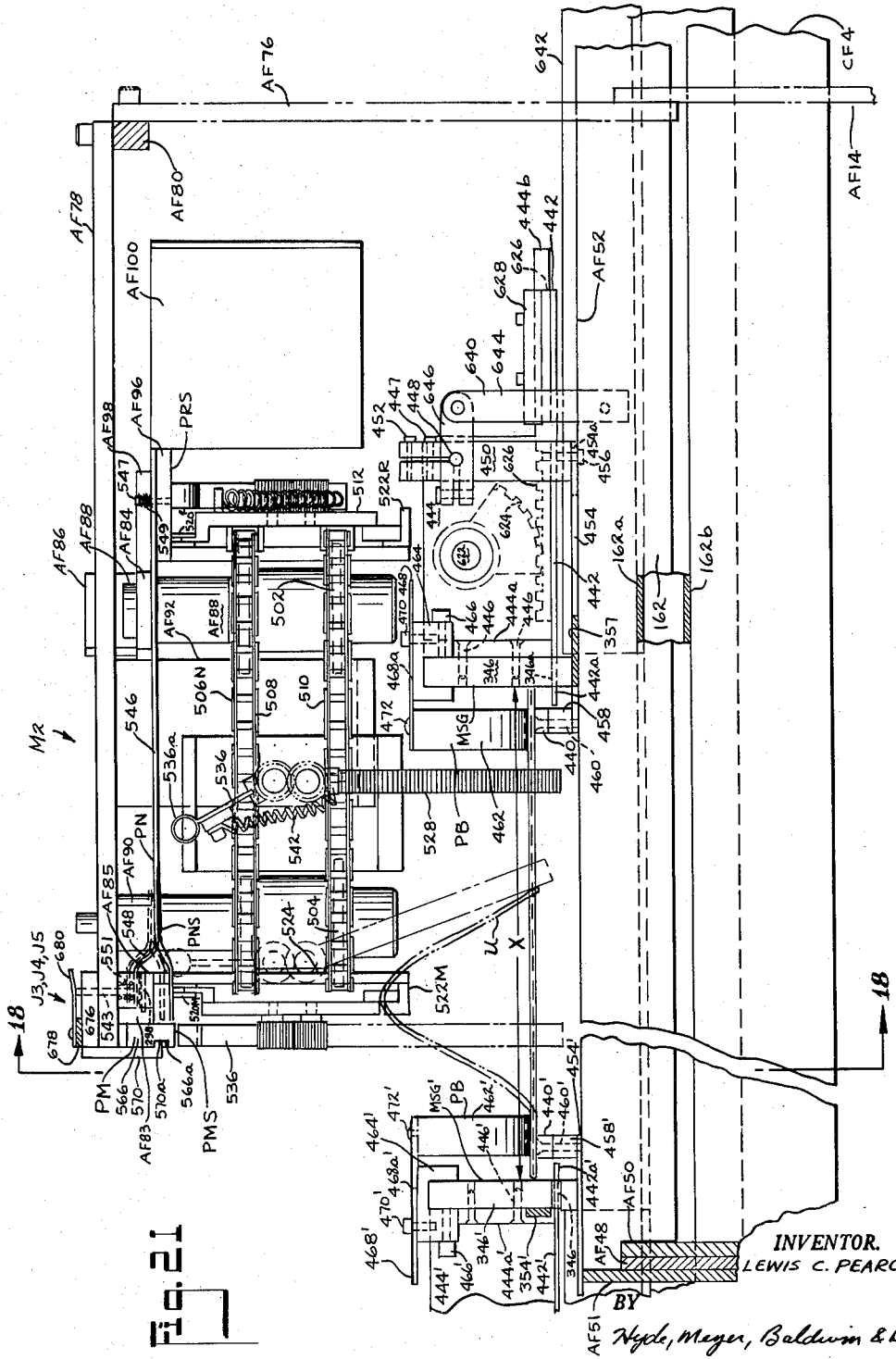

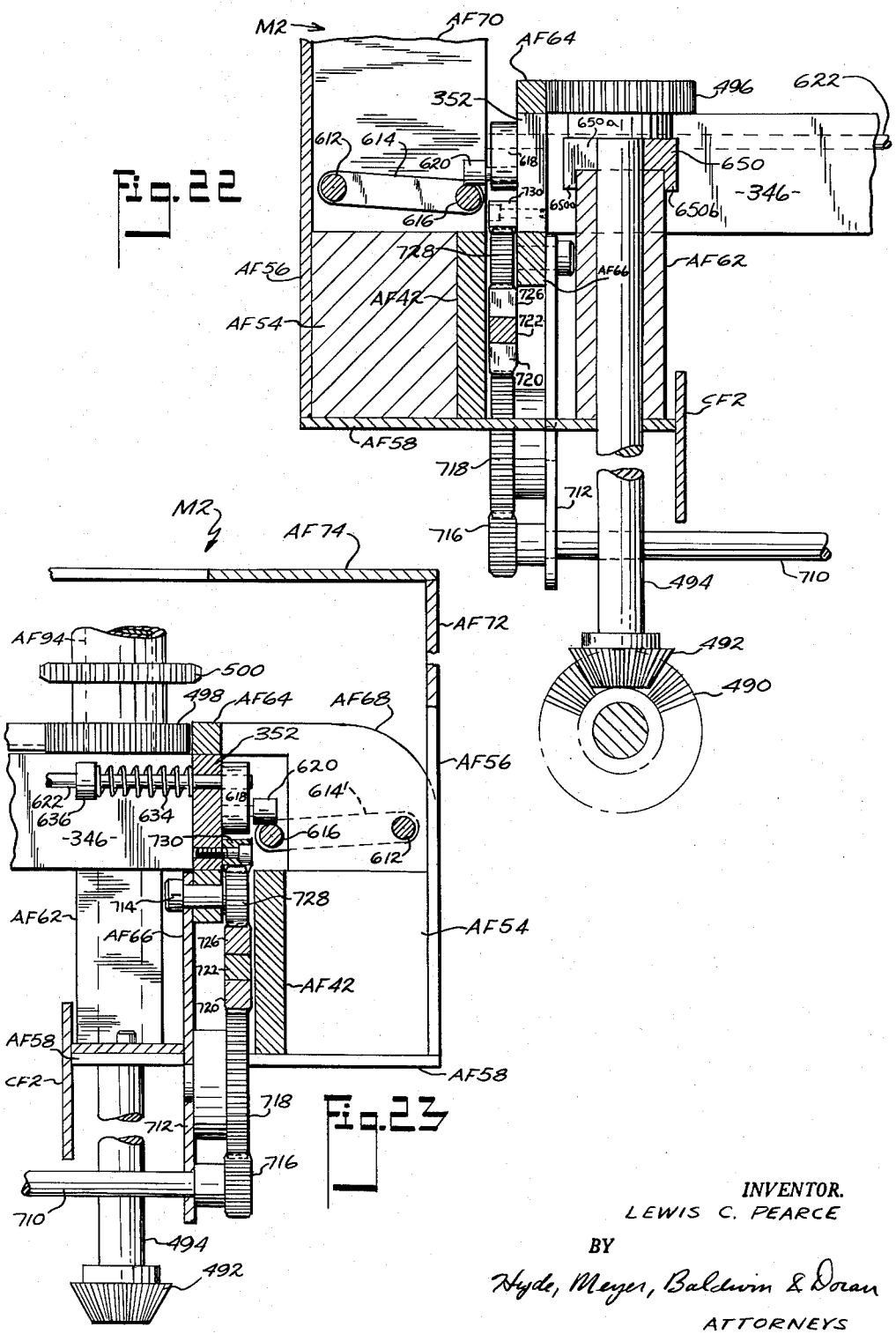

April 4, 1961 L. C. PEARCE 2,977,733
SHEET DISTRIBUTING MECHANISM AND
RECEPTACLE CONVEYOR
Filed Oct. 17, 1957 17 Sheets-Sheet 15

INVENTOR.
LEWIS C. PEARCE
BY
Hyde, Meyer, Baldwin & Doran
ATTORNEYS

April 4, 1961
L. C. PEARCE
2,977,733
SHEET DISTRIBUTING MECHANISM AND
RECEPTACLE CONVEYOR
Filed Oct. 17, 1957
17 Sheets-Sheet 16
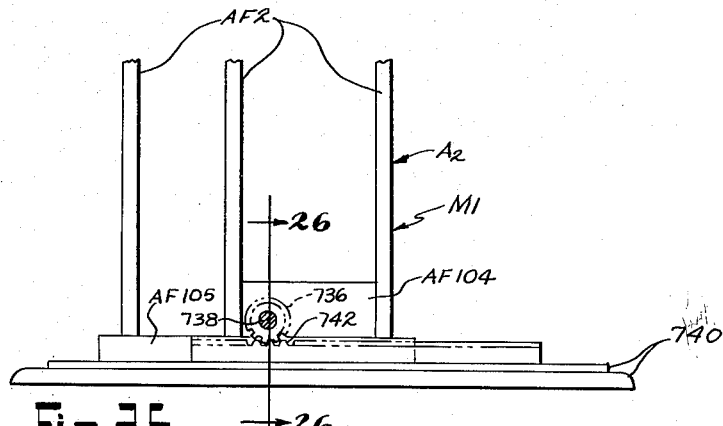
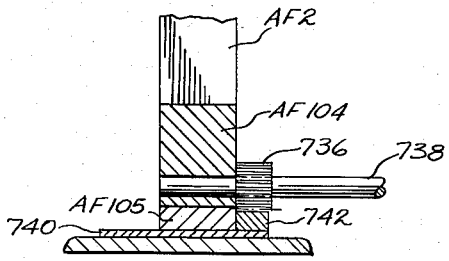
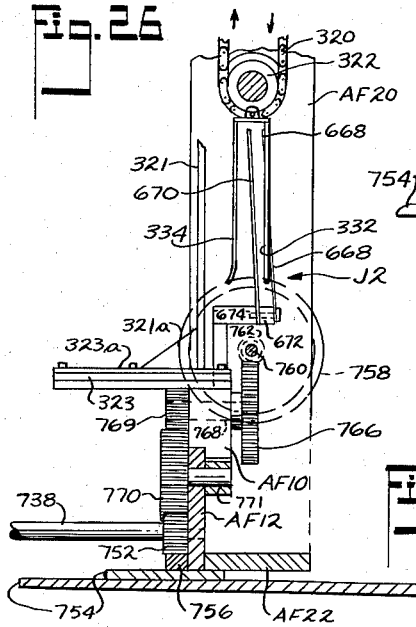
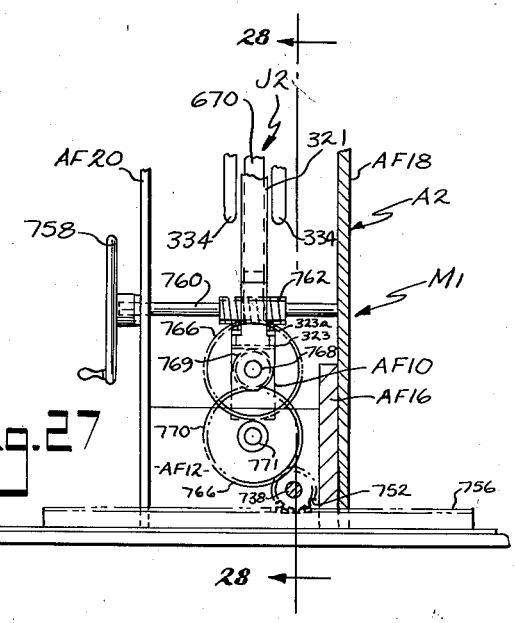
INVENTOR.
LEWIS C. PEARCE
BY
Hyde, Meyer, Baldwin & Doran
ATTORNEYS

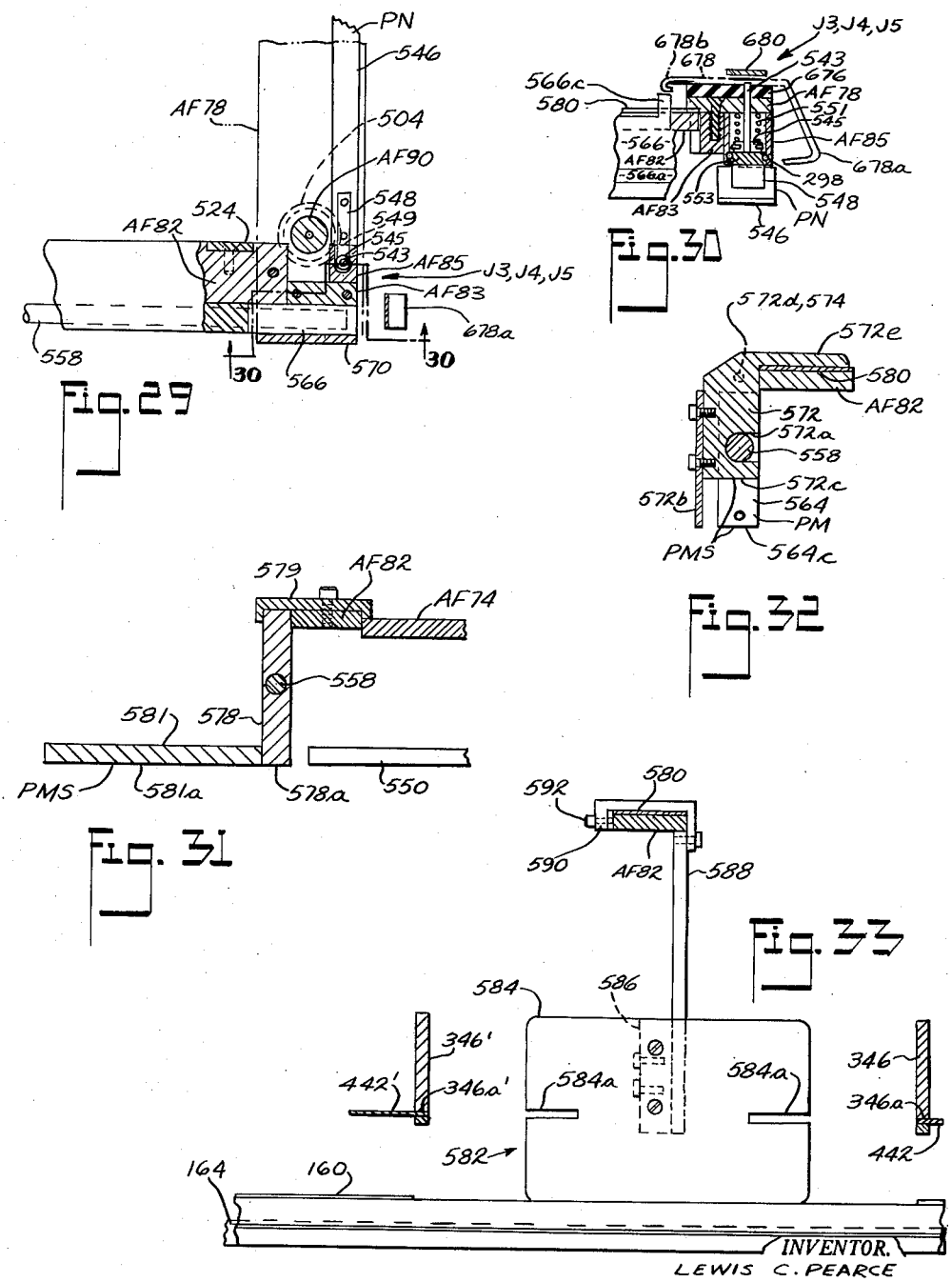

United States Patent Office 2,977,733
Patented Apr. 4, 1961

2,977,733

SHEET DISTRIBUTING MECHANISM AND RECEPTACLE CONVEYOR

Lewis C. Pearce, Berea, Ohio, assignor to American Greetings Corporation, Cleveland, Ohio, a corporation of Ohio Filed Oct. 17, 1957, Ser. No. 690,858

42 Claims. (Cl. 53—154)

This invention relates to improvements in a sheet positioning mechanism, a sheet handling mechanism, a receptacle conveyor, and/or a receptacle loading mechanism.

An object of the present invention is to provide a machine for collating and packaging greeting card, other sheet and/or envelope mixture assortments, for loading sheet units in different zones or receptacle compartments, and/or for handling, positioning or loading sheets efficiently.

A further object of the present invention is to provide a machine characterized by its operating efficiency, ease of operation, structural simplicity, and universal characteristics permitting it to handle sheets and/or receptacles of various sizes and types.

Other features of this invention reside in the arrangement and design of the parts for carrying out their appropriate functions.

Other objects and advantages of this invention will be apparent from the accompanying drawings and description and the essential features will be set forth in the appended claims.

In the drawings,

Fig. 3 is an enlarged top plan view of the right-hand end of the receptacle conveyor omitted in Fig. 1;

Fig. 4 is a vertical view of a portion of the receptacle conveyor drive mechanism taken along the line 4—4 of Fig. 3;

Fig. 5 is a vertical sectional view taken along the line 5—5 of Fig. 3;

Fig. 6 is a top plan view of Fig. 5 with parts broken away;

Fig. 7 is a transverse sectional view taken generally along the line 7—7 of Fig. 1;

Fig. 8 is a side elevational view taken along the line 8—8 of Fig. 7;

Fig. 9 is an enlargement of the central upper portion of Fig. 7 taken along line 9—9 of Fig. 10;

Fig. 10 is a top plan view of Fig. 9 behind the plane of the drawings and of the receptacle conveyor to the right of the lines 7—7 in Fig. 1;

Fig. 11 is a side plan view with portions cut away of an upper portion of one of the six sub-assemblies taken along the line 11—11 in Fig. 1;

Fig. 12 is a top plan view of a gathering conveyor per se taken along the line 12—12 in Fig. 11;

Fig. 13 is a transverse vertical sectional view taken along the line 13—13 of Figs. 1 and 14 with portions cut away;

Fig. 14 is a top plan view of one of the six positioning means placed over the top of the receptacle conveyor in Fig. 1 with the view taken generally along the line 14—14 of Fig. 13;

Fig. 15 is a vertical elevational view taken along the line 15—15 of Fig. 14;

Fig. 16 is a vertical sectional view taken along the line 16—16 in Figs. 14 and 17 of an ejector arm of a first sheet unit transfer means;

Fig. 17 is a front elevational view of the ejector arm of Fig. 16;

Fig. 18 is a vertical sectional view of a portion of the positioning conveyor taken longitudinally of the active run thereof generally along the line 18—18 of Figs. 14 and 21;

Fig. 19 is a vertical sectional view of a portion of the positioning conveyor taken transverse to one of the runs thereof along the line 19—19 of Fig. 14 with its pushing arm extending vertically in the pushing position;

Fig. 20 is a vertical longitudinal view taken along the line 20—20 of Fig. 13 showing the relationship of the sheet units when one type of sheet unit jam occurs;

Fig. 21 is a vertical elevational view taken along the line 21—21 of Fig. 13;

Fig. 22 is a transverse vertical sectional view taken along the lines 22—22 of Figs. 14 and 24;

Fig. 23 is a transverse vertical sectional view taken along the line 23—23 of Fig. 24;

Figure 1:
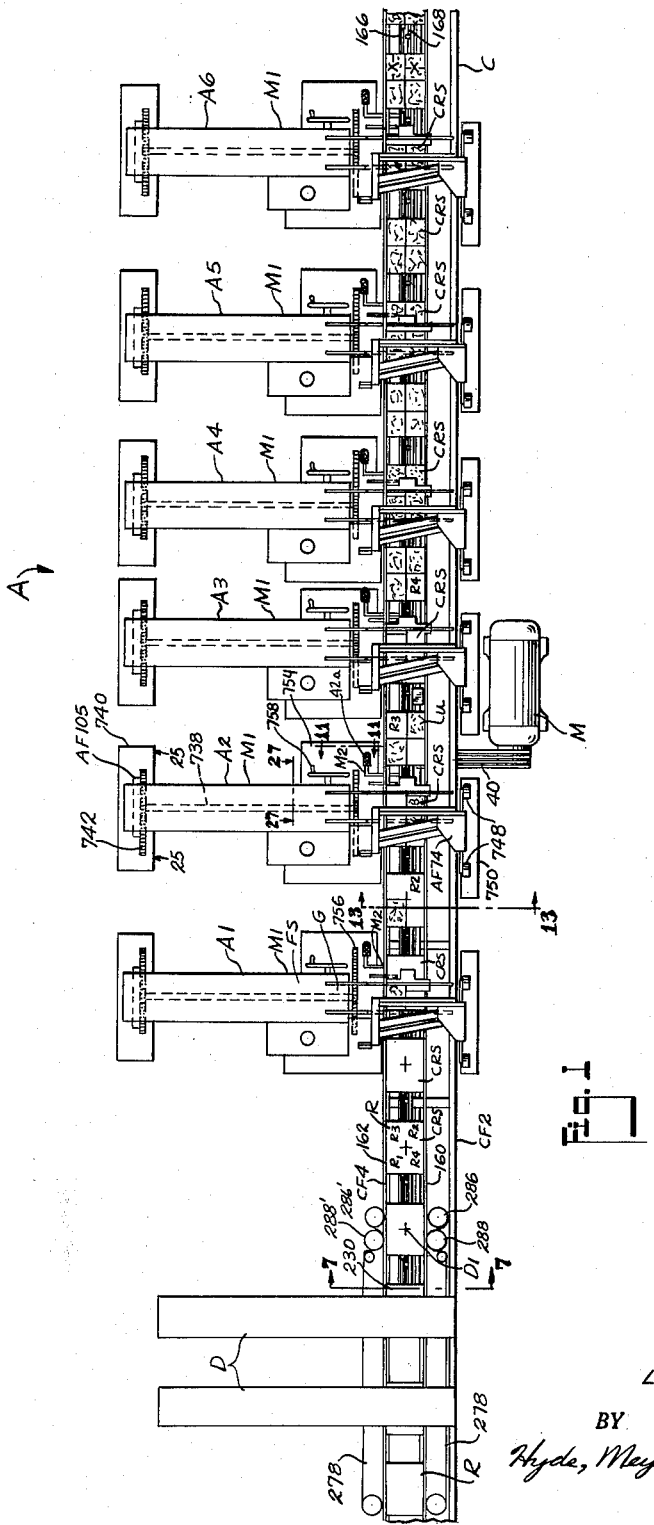
Fig. 1 is a top plan view of the complete machine.

Figs. 25 and 27 are vertical section views of the machine taken along lines 25—25 and 27—27 in Fig. 1 respectively;

Figs. 26 and 28 are vertical sectional views taken along line 26—26 of Fig. 25 and line 28—28 of Fig. 27 respectively;

Fig. 29 is a horizontal sectional view taken along line 29—29 of Fig. 18;

Fig. 30 is a vertical sectional view taken along line 30—30 of Fig. 29;

Fig. 31 is a vertical sectional view taken along the line 31—31 of Fig. 18;

Fig. 32 is a vertical sectional view taken along the line 32—32 of Fig. 18; while Fig. 33 is a vertical sectional view taken along the line 33—33 of Fig. 18.

Before the machine here illustrated is specifically described, it is to be understood that the invention here involved is not limited to the structural details or arrangement of parts here shown since machines embodying the present invention may take various forms. It also is to be understood that the phraseology or terminology herein employed is for purposes of description and not of limitation since the scope of the present invention is denoted by the appended claims. Also, the machine components in the different views and the sectional views thereof are not shown in the same phase relationship or machine position but are shown in a variety of positions for convenience of illustration and better pictorial presentation of the disclosure. Also, many drawing figures have many parts omitted to present the complex machine more clearly; and many figures have sheet, sheets, sheet units and receptacles omitted in many locations for clarity and simplicity of illustration.

General description

This application ties together a divider strip former and affixer D in Fig. 1, disclosed in more detail in my copending U.S. patent application, Serial No. 603,142, filed August 9, 1956 and entitled "Apparatus for Forming and Affixing a Divider in a Box and the Product Thereof;" a plurality of collating elements or sub-assemblies A1, A2, A3, A4, A5, and A6 in Fig. 1, each identical in construction and each having a mechanism M1 and a portion of a mechanism M2 thereof disclosed in more detail in my copending U.S. patent application, Serial No.

535,492, filed September 20, 1955 and entitled "Collating Machine;" and a receptacle conveyor C connecting former and affixer D and each sub-assembly A1, A2, etc. of a sheet collating and sheet unit loading assembly A.

This machine is especially adapted for collating greeting cards into units or groups for greeting card mixture assortments in which each card in the receptacle or assortment is or can be different so that the purchaser may buy in one receptacle R, for example, sixteen greeting cards S arranged in four receptacle compartments R1, R2, R3 and R4 with each greeting card S being different.

Although greeting cards have many variations in construction, they are all capable of being handled by this machine. One of the greeting cards S, shown in Fig. 11 by way of example, is a sheet folded to form overlapping sheet sections S1, S2 with a folded edge S3 while the other greeting cards S' are of single sheet thickness having an edge S3', corresponding to folded edge S3. Each sheet has a dimension X and a dimension Y in Figs. 1 and 11.

However, other greeting cards may be formed with a uniform thickness by a sheet folded into four quarters so that each section is of double thickness. Also, each greeting card may be formed by a plurality of folded sheets stapled together at their folds to form a greeting card with four or more sheet sections instead of the two in the illustrated greeting card S. The sheet may be of thin or thick stock. The sheet section S2 or card S' in Fig. 11 may have a design viewed on one outer face thereof with this design causing no substantial variation in sheet thickness or forming variations in thickness across the sheet face (in the direction parallel to and/or perpendicular to the fold S3 or edge S3') caused by (1) variations in area of section S2 relative to section S1 by having a die cut design forming its periphery remote from fold S3 or, (2) by ornamentation S6 or S6' applied in localized areas to the outer display design bearing face S4 of section S2 or face S4' of card S'. This ornamentation may take the form of ribbons, bows, flocking, chatons (material resembling a precious stone), etc. formed on or secured to the outer face S4 or S4', such as shown at S6 or S6' in Fig. 11. It should be noted that the display designs on all cards face the same direction and can be read from the same location when folds S3 or corresponding edges S3' are correspondingly located. Hence, this display design, ornamentation, or die cut will cause variation in the thickness of each folded sheet so as to cause problems during sheet pack advancing and sheet feeding but are solved by the copending application "Collating Machine" and the machine disclosed in this application. However, the words "sheet" or "greeting card" used herein refers to a single sheet, a sheet folded into overlapping sheet sections of single or multiple thickness, a plurality of folded sheets stapled or otherwise secured together, a single envelope, a plurality of sheets or envelopes prebanded or packaged or otherwise wrapped or assembled to form a single package able to be handled as a unit, or a sheet or plurality of connected sheets with or without ornamentation, die cutting or thickness variations since some greeting cards come without these complications and many features of the machine are applicable to ordinary sheets.

Each sub-assembly A1, etc. has a first mechanism M1, identical to that disclosed in the copending application "Collating Machine," with a plurality of pack advancing means for the sheets of the four packs Q in Fig. 11 for advancing the packs Q with the folded edges S3 or corresponding edges S3' being on the lower pack edge as the packs are advanced toward the left in Fig. 11 toward vertically aligned sheet feeding positions. All the sheets of one pack Q are generally the same but folded sheets S or single sheets S' may compose any one or all of the packs Q, depending on the choice of the machine operator. Four suction-type sheet feeding means FS in Fig. 11 have heads moving together to pick individually the left end cards off the feed-off end of the packs Q by suction engagement of the rear greeting card face, such as outer face S5 of section S1 or outer face S5' of card S', and feed them fold-first into the four pairs of vertically arranged feed rolls. These crease the card folds S3 more firmly and feed them into the appropriate sheet unit supporting means GS in Fig. 11 of the vertically upwardly traveling run G1 of gathering conveyor G in such a manner as to prevent interleaving. The upwardly moving run of gathering conveyor G has four cards S or S', forming a sheet unit U, in each supporting means GS after it travels upwardly past the upper pair of the feed rolls in Fig. 11 if it has received a card from each of the four packs Q in Fig. 11 but may have fewer cards if fewer packs are feeding gathering conveyor G. The gathering conveyor G has side guide members MS and MS' in Figs. 11 and 12 to pull the cards laterally (both perpendicular and parallel to the fold S3 or edge S3') into a compact unit as they move across the top of the gathering conveyor G in Figs. 11 and 12. A card sheet unit ejector arm 362 in Figs. 13, 14, 15, 16 and 18 ejects individually each unit U of four cards by pushing outwardly against the folds S3 or edges S3' in Fig. 13 to transfer individually each sheet unit U from the gathering conveyor G by the ejector arm of transfer means T1 of a second mechanism M2 in a first transfer zone Z1 onto a positioning means P at a position P1 in Fig. 18 where a brake and fold closing means PB stops the unit U and closes the open folds thereof by pushing it down against portions of support member PG. Conveyor C in Figs. 1, 13 and 18 moves a line of receptacles R, each divided by cross shaped divider D1, or one or more L-shaped dividers, formed and adhesively affixed to receptacle R by machine component D to divide the receptacle into multiple sheet unit receiving compartments to assure that the two compartments R1 and R3 or R4 and R2 in Fig. 1 spaced along the conveyor path and the two compartments R1 and R4 or R3 and R2 spaced transverse to said path are accurately fixed against relative movement so that the machine will operate properly. Conveyor C moves receptacles R between conveyor receptacle stations CRS in Figs. 1 and 18 located in fixed places along conveyor C under loading stations LS1, LS2, LS3, etc. A second transfer means T2 in Figs. 14 and 18 transfers each sheet unit U by gravity either from position P1 at a loading station LS1 or LS3 into a receptacle compartment R1 or R3 by sub-assembly A1 or A3 respectively or from position P2 at a loading station LS2 or LS4 into a receptacle compartment R2 or R4 by sub-assembly A2 or A4 respectively. The positioning means P includes a positioning conveyor PC and other suitable structure to transfer individually the sheet units U in sub-assembly A2, for example, from position P1 to P2 in the second transfer zone Z2. Hence, each sub-assembly A1–A4 loads its sheet units U in Fig. 1 into a different receptacle compartment of receptacle R with a mixture of sixteen different greeting cards formed with the cards properly displayed with the outer display design bearing faces S4 and S4', not engaged by suction pick-up by sheet feeding means FS, facing upward in receptacle R with all folded edges S3 (including corresponding edges S3') and all display designs on faces S4 and S4' correspondingly located and facing in the same direction. All greeting cards S will be properly oriented, since gathering conveyor G has turned the cards over as they move along a path center line between pack feed-off and receptacle compartment loading operations. It should be noted that the cards S always have their folded edges S3 presented where likelihood of damage is the greatest and to permit easy handling; each card S in packs Q rests upon this fold on its pack feed board; is fed fold first by sheet feeder FS; is stopped, supported, pulled together with other cards S into a compact unit, and ejected by gathering conveyor G and transfer means T1 exerting pressure on the fold; and positioning conveyor PC pushes the sheet units U between positions P1 and P2 by pressure on the fold. There is no danger to the thin edges of the greeting card S remote from the fold. All cards, when ejected, will be in a compact unit; none will be interleaved; and all designs will face upwardly and in the same direction when the purchaser thumbs through the receptacle R so as to make an attractive display with each greeting card properly oriented for viewing from the same position.

The machine has structure making it universal in character so as to handle a large variety of types and sizes of sheets or cards S or S' and receptacles R.

Although the sheet unit U in Fig. 11 has 4 sheets S or S' therein, it is intended that a sheet unit may consist of one or more sheets because many features of the machine will be obtained when each unit U has only one sheet S or S'.

For clarity, many parts have been omitted in the different views, but at least some of the rigidly interconnected frame members for conveyor C are designated CF and for each sub-assembly are designated AF in each view with these frame members being connected together by screws or in any other suitable manner.

*Drive motor and motor control*

Figure 2:
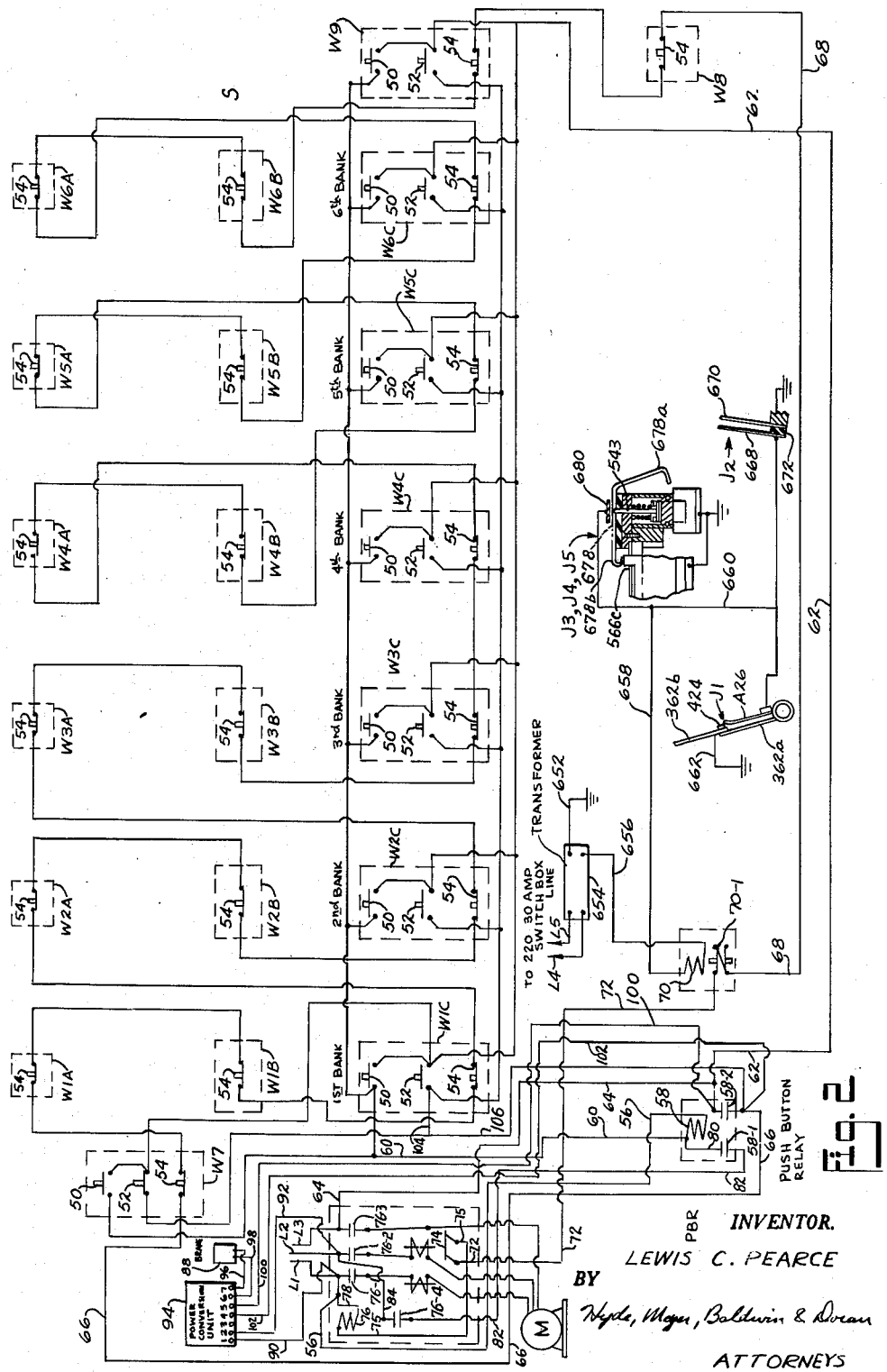
Fig. 2 is an electrical diagram of the manually operated control for the drive motor and the automatically operated sheet unit jam control for stopping the motor in emergency situations.

All components of the complete machine are driven by a single motor M in Fig. 1 except for a small portion of each sub-assembly A1, etc., driven by a separate motor as shown in Figs. 1 and 2 of the aforesaid copending patent application entitled "Collating Machine." Motor M drives through suitable belts 40 and pulleys, the common drive shaft MD in Figs. 3, 4, 7, 8, 13, 14, and 15 extending throughout the length of the machine and located directly under the receptacle conveyor C in Fig. 1 with the left end of this drive shaft MD adapted to drive the divider strip former and affixer D at the left in Fig. 1 through the mechanism shown in Fig. 7 of the present application and corresponding generally to Fig. 26 of the aforesaid copending patent application entitled "Apparatus for Forming and Affixing a Divider in a Box and Product Thereof"; and to drive each sub-assembly A1, A2, etc. through the drive gearing of Fig. 13 in the present application corresponding with the drive gearing in Figs. 2 and 3 of the aforesaid copending application entitled "Collating Machine." Each of these components, driven by the common drive shaft MD and including sub-assembly A1, etc. and former and affixer D, has a manually operable clutch, such as clutch 41 in Figs. 13 and 15 for sub-assembly A2 or a corresponding clutch disclosed in the aforesaid patent application on the former and affixer D, for disconnecting any component from the drive shaft when it is not in use and for permitting establishment of the proper phase relationship between the different components so that the complete machine will work properly. Clutch 41 is disengaged by manually swinging lever 42a of bell crank 42 counterclockwise in Fig. 15 about pivot 42b on bracket 46 secured to sub-assembly frame member AF32 to swing the lower end of bell crank arm 42c toward the right so as to move links 43 and 44 toward the right to disengage by shoes 48 clutch 41. Links 43 and 44 are pivotally connected at opposite ends to arm 42c to each other and shoe 48, and to lever 45 pivotally connected at 45a to bracket 47 secured to frame member AF30. Another clutch lever, similar to lever 42a on the right side of sub-assembly A2 in Fig. 15 and similarly connected to link 43 may be provided on the left side of sub-assembly A2 in Fig. 15 and each of the sub-assemblies A-1 to A-6, if desired for safety reasons.

Motor M is manually controlled at the six sub-assemblies A1-A6, and at divider strip former and affixer D by the electric circuit in Fig. 2. Sub-assemblies A1-A6 have switches W1A-W6A, W1B-W6B and W1C-W6C located on three different places on the sub-assemblies; divider strip former and affixer D has switch W7; the delivery or right end of conveyor C in Fig. 3 has switch W8; and a switch W9 may be provided on a long cable to use anywhere on the machine. Each switch has a start button 50, a jog button 52 and/or a stop button 54. All start buttons 50 are connected in parallel, all jog buttons 52 are connected in parallel, and all stop buttons 54 are connected in series. When any start button 50 is pushed, a first circuit is formed from power line L1 through line 56, push button relay coil 58, line 60, the depressed start button 50, line 62, line 64, and line L3. Energized coil 58 now closes normally open push button relay coil contact 58-2 to form a second circuit to energize motor M from line L3 through line 64, normally open push button relay contact 58-2 now closed, line 66, all stop buttons 54 in series, line 68, normally closed safety trip relay contact 70-1, line 72, closed switch 74, line 75, main drive coil 76, line 78, and line L1. Main drive coil 76 closes its three normally open contacts 76-1, 76-2 and 76-3 to energize motor M from lines L1, L2 and L3. A third or holding circuit is formed to maintain the second circuit upon opening of the first circuit by release of the start button 50. This third circuit is formed from line L1 through line 56, coil 58, line 80, normally open push button relay contact 58-1 now closed, line 82, normally open main drive coil contact 76-4 now closed, line 84, and line L2. The motor M may be easily stopped by pressing any of the stop buttons 54 to break the second circuit and thus deenergize coil 76 to open the three motor drive contacts 76-1, 76-2, and 76-3 and to open contact 76-4. As contact 76-4 opens, the third or holding circuit is broken to deenergize push button relay coil 58. Opening the normally open push button relay contact 58-2 also energizes a motor brake 88 to stop motor M quickly. Brake 88 is energized by a fourth circuit formed from lines L1 and L2 through lines 90 and 92, a power conversion unit 94, and lines 96 and 98. Power conversion unit 94 energizes brake 88 only while push button relay contacts 58-2 are open to open a circuit to the power conversion unit 94 through lines 100 and 102 and contact 58-2. Hence, brake 88 will quickly stop motor M when any stop button 54 is pushed and will hold it against rotation until any start button 50 is again pushed.

If the machine operator desires to jog slowly the machine by motor M thereof, one of the jog buttons 52 may be pushed to form another circuit corresponding to the second circuit without forming the holding or third circuit. This other circuit, remaining closed only as long as a jog button 52 remains depressed, is formed from line L3 through line 64, line 62, the closed jog button 52, line 104, line 106, line 66, all stop buttons 54 in series, line 68, normally closed safety trip relay contact 70-1, line 72, closed switch 74, line 75, main drive coil 76, line 78, and line L1.

*Receptacle conveyor*

Receptacle conveyor C is shown principally in Figs. 3, 4, 5, 6, 7, 8, 9, and 10 and is shown partially in Figs. 1, 13, 14, 15, 18, 21 and 23.

Receptacle conveyor C has a frame having component parts designated by reference numerals having a CF prefix. Conveyor C includes in Figs. 3 and 4 two opposite outer and inner side rails CF2 and CF4 made up of longitudinally arranged end abutting rail sections secured together by and supported by pairs of posts CF6 arranged in spaced relation along the length of conveyor C in Fig. 1 with each pair comprising two posts CF6 and CF6 forming inner and outer posts aligned transversely on the conveyor C and located at the opposite sides thereof. In Figs. 3, 4 and 5, each post CF6 has a vertical leg CF6a upon which rest side rails CF2 and CF4 and has a connector plate CF6b secured to leg CF6a and to the abutting rail sections of its side rail CF2 or CF4. Each pair of posts CF6 is maintained in parallel relationship by lower cross bar CF8 and upper cross bar CF10, resting on top of a pair of legs 6a, with each cross bar secured at opposite ends to the respective posts CF6.

In Figs. 3 and 4, the conveyor frame includes two longitudinally and vertically extending parallel inner and outer plates CF12 and CF12' respectively secured at opposite ends to inner and outer post legs CF6a of different pairs to form the inner walls of mechanism enclosing cabinets CF14 and CF14'. Plates CF16 and CF16' are respectively secured at upper and lower ends to side rails CF2 and CF4 and to plates CF12 and CF12'. Brackets CF18 and CF18' are respectively secured to the outer faces of outer and inner post legs CF6a. Bracket CF20 is secured to cross bar CF8 and rotatably supports drive shaft MD.

In Figs. 7 and 8, the conveyor frame has two vertically and longitudinally extending inner and outer parallel plates CF26' and CF26 secured at their right end in Fig. 8 to post legs CF6a in coplanar relation with connecting plates CF6b. Outer plate CF26 has at its free left end in Fig. 8 vertically spaced apart spacer blocks CF28 and CF30 secured at their outer ends to vertical plate CF32 parallel to plate CF26. A spacer block CF34 is secured at opposite ends to plate CF32 and side rail CF2. On the inner side of conveyor C, plate CF26' is secured to one end of spacer blocks CF36 and CF38, which are secured at the other end to plate CF40 extending parallel to plate CF26'. A vertical plate CF42 is secured at its lower end to plate CF40, which plate CF42 is secured by a spacer block CF44 to inner rail CF4. Another plate CF46 is secured at its lower end to plate CF40 and at its upper end to lower plate CF48 of four inter-connected plates CF48, CF50, CF52 and CF54 forming a rectangular tube with upper plate CF54 secured to inner rail CF4. A connecting plate CF56 is secured to both upper plate CF54 and spacer block CF44 to reinforce the structure.

An outer carrier 120 and a center carrier 121, best shown in Figs. 5 and 18, extend along the length of conveyor C and include respectively base plates 124 and 125 supported on the top of cross bars CF10 with these plates extending along the full length of conveyor C. These carriers have respectively posts 128 and 129 in Fig. 5 (near the right end of Fig. 1) and posts 132 and 133 in Figs. 7, 13 and 18 spaced along the length of conveyor C with each secured at its upper end to the bottom of its base plate 124 and 125 at a cross bar CF10. Posts 128 and 129 in Fig. 5 have three and two vertically spaced holes 128a, 128b, 128c and 129a, 129b, and posts 132 and 133 in Fig. 18 have holes 132a and 133a with corresponding holes in the posts coaxially aligned. Also, holes 128a and 132a and holes 129a and 133a are coaxially aligned. Gears 136, 140 and 144 meshing together; gears 137 and 138 meshing together; gear 146; and gear 147 are respectively rotatably mounted to their respective posts for rotation coaxially with holes 128a, 128b, 128c, 129a, 129b, 132a and 133a. Shafts 152, 153, 156 and 157, extending longitudinally along conveyor C, have respectively secured thereto gears 146, 147, 144 and 138. Also, shafts 152 and 153 have respectively secured thereto one of the gears 137 and one of the gears 136 at the right end of these shafts in Fig. 1. Also, each cross bar CF10 has a rack 158 secured to its bottom surface with which associated gears 136, 137, 146 and 147 mesh. Hence, either carrier 120 or 121 may be caused to move, independently of the other carrier and along its full longitudinal length, laterally over cross bars CF10 by turning any one of the shafts 152, 153, 156 or 157 associated therewith.

Receptacle conveyor C advances receptacles R in step fashion by pushing each receptacle from one longitudinally reciprocating driving device to another by driving strokes having adjacent ends overlapping, as will be brought out in more detail hereinafter. This conveyor moves the receptacles R along the path, from left to right and along a horizontal straight line in Fig. 1, in step fashion to and from receptacle stations CRS fixed equidistant along the length of the conveyor C. Each conveyor receptacle station CRS has a receptacle R located thereat in Fig. 1 and corresponds with the position wherein the advance of each receptacle is changed from one driving device to another.

Receptacle conveyor C includes two opposite receptacle outer and inner edge guides 160 and 162 respectively secured to base plate 124 of carrier 120 by plate 164 and to rail CF4 for guiding said receptacles with said guides being generally parallel and equidistant along the length of the conveyor C. These are shown most clearly in Figs. 1, 3, 5, 7, 13, 14 and 18 with each having in Fig. 5 top portion 160a or 162a, bottom portion 160b or 162b and upright and connecting portion 160c or 162c so as to retain the receptacle R between these portions in the manner illustrated as the receptacles move along the conveyor path. Upright portions 160c and 162c and top portions 160a and 162a are integrally connected together respectively as portions of L-shaped members 159 and 161. Bottom portions 160b and 162b integrally form portions of respective L-shaped members 163 and 165. Vertical portions of members 159 and 163 and vertical portions of members 161 and 165 are secured respectively to plate 164 and rail CF4 by screws 167 and 167 respectively extending through circular holes in members 163 and 165, through vertically elongated slots 159a and 161a in members 159 and 161 respectively, and screwed in threaded holes in plate 164 and rail CF4. These vertically elongated slots permit vertical adjustment of top portions 160a and 162a relative to vertically fixed respective bottom portions 160b and 162b so that the machine may be set up to use receptacles R of different vertical heights in Fig. 5. This is desirable because the vertical height of a pack or packs dropped in any one receptacle compartment may vary widely as will be more apparent hereinafter, for example, from one single sheet to 24 banded packs of envelopes or 24 greeting cards with each greeting card having multiple sheets. Upright portion 162c of the inner guide is fixed to the machine frame against movement transverse to the conveyor by being secured to stationary frame rail CF4. The upright portion 160c is also carried by the conveyor frame but is adapted to be moved toward and away from guide 162 by carrier 120 to permit the setup of the machine for different width receptacles R.

Receptacle conveyor C includes two feed members 166 and 168 in Figs. 1, 3, 5, 6, 10, 13, 14 and 18. Each feed member in Fig. 5 includes tube 166b or 168b having secured respectively thereto a plurality of receptacle driving devices or laterally extending lugs 166a or 168a spaced equidistant along its length dimension (longitudinally to or along the path of movement of the receptacles R along the receptacle conveyor C) for engagement during their driving strokes with the receptacles R and for release therefrom during return strokes. The lugs 166a or 168a each have integral annular portions or rings 166c or 168c secured to tube 166b or 168b. Both of these feed members 166 and 168 are carried by carrier 121 located equidistant between the guides 160 and 162.

T-shaped member 170 in Figs. 5, 6 and 18 is secured in inverted position to base plate 125 and wedge-shape members 172 and 174 form therewith channels for supporting the annular portions 166c and 168c of driving devices 166a wherein feed members 166 and 168 may respectively oscillate and reciprocate around their longitudinal axes.

The receptacle conveyor C includes a driving type actuating means 180, shown in Figs. 3, 4, 5 and 6 and located beyond the right end in Fig. 1, for reciprocating feed members 166 and 168 in opposite directions along the length dimension of the conveyor C through a driving stroke and a return stroke with the feed member strokes alternately arranged along the length dimension of the conveyor with only the adjacent stroke ends of the driving devices 166a and 168a overlapping. The feed members are 180 degrees out of phase so that one is travelling through the driving stroke while the other travels through the return stroke. The driving type actuating means 180 includes for each feed member 166 or 168 in Figs. 3–6 a similar mechanism with the part for feed member 166 being designated by one reference numeral and the corresponding part for feed member 168 being designated by the same reference numeral bearing a prime designation. From the motor driven drive shaft MD in Fig. 4, the power is transmitted through bevel gears 182 and 184 with the latter being keyed to a shaft 186 rotatably mounted in frame plates CF12 and CF12'. Shaft 186 drives through a gear 187 keyed thereon a driven gear 188 keyed to a cam shaft 190 rotatably mounted in frame plates CF12 and CF12'. Cam shaft 190 has keyed thereto cams 192 and 192' at opposite ends with the rise of the cams causing driving stroke movement and the fall thereof causing return stroke movement. Roller type cam followers 194 and 194' coact with the periphery of the respective cams. A connecting means operatively connects each follower to its cam and takes the form of a lever 196 or 196' having the follower 194 or 194' rotatably secured intermediate its ends and having its lower end rotatably secured by a pivot type connection 196a or 196a' to a stationary cross shaft 198 carried by frame plates CF12 and CF12'. This connecting means also includes a flexible connector 200 in Figs. 3 and 4 operatively connecting the followers together to urge them into cam contact by having the opposite ends of this flexible connector secured to levers 196 and 196'. Since the cams 192 and 192' are substantially identical but 180 degrees out of phase to move one feed member through the driving stroke while the other moves through the return stroke, they are arranged so that the connector 200 does not substantially change in length through the operating cycle but always urges both followers 194 and 194' into contact with cams 192 and 192' respectively. This flexible connector 200 includes for the middle portion of its length a flexible sprocket chain 201 adapted to travel over sprockets 204 and 204' rotatably mounted respectively on frame brackets CF18 and CF18'; and includes for the end portions of its length a resilient means, such as springs 202 and 202', which urge the followers 194 and 194' into contact with the respective cams 192 and 192', cause the return strokes respectively of the feed members 166 and 168 while the driving strokes are caused by the positive displacement rises of the cams 192 and 192', and provide give in the feed member drive to prevent breakage of the parts if any receptacle R or foreign member should jam a feed member during its return stroke. Since the cam peripheries are arranged so that the connector 200 remains of substantially constant length (unless jamming occurs) because of the cam periphery design, no work need be normally performed against these springs 202 and 202' so that minimum driving power is required. However, it should be readily apparent that the feed members 166 and 168 may be positively driven in both directions by having the followers 194 and 194' positively driven in both directions by cams 192 and 192' in any suitable manner, such as by a cam track instead of a cam peripheral follower surface, if so desired.

The driving type actuating means 180 includes a rack and pinion drive for converting the oscillation of the cam followers 194 and 194' into a reciprocating movement for feed members 166 and 168 respectively. Also, a connecting means is provided for operatively connecting each cam follower to its associated rack and each pinion to its associated feed member. For the respective feed members and cams, there are provided racks 206 and 206' mounted in guides 205, 207a, 207b and 205', 207a', 207b' secured to side rails CF2 and CF4 for rack reciprocation along the length of the receptacle conveyor C and links 208 and 208' pivotally connected at opposite ends to the distal ends of levers 196 and 196' and to racks 206 and 206' by blocks 209 and 209' for converting the oscillation movements of levers 196 and 196' into reciprocation movements of racks 206 and 206'. The pinion 210 and 210', keyed to shafts 212 and 212' rotatably mounted in frame plates CF16 and CF16', mesh with racks 206 and 206' for conversion of the rack reciprocation movement into a rotary movement. Pinions 214 and 214' in Fig. 6 are keyed to shafts 212 and 212'. Racks 216 and 216' are mounted for reciprocation along the length of the receptacle conveyor C within center carrier 121 and mesh with pinions 214 and 214' so that the oscillation of the followers 194 and 194' will reciprocate feed members 166 and 168 in opposite directions.

Racks 216 and 216' are mounted for reciprocation on carrier base plate 125 and pinions 214 and 214' are mounted for axial movement along shafts 212 and 212' by this structure. Bearing plate 217 and center plate 218 in Fig. 5 are secured to the under surface of base plate 125. L-shaped plates 220 and 220' are secured to the outer surfaces of racks 216 and 216' and to the outer surfaces of bearing blocks 222 and 222' adapted to reciprocate on the upper surface of base plate 125. Feed member tubes 166b and 168b are fixed against axial movement and rotatably mounted in blocks 222 and 222' by two collars 224 and 224' on each feed member tube. Hence, blocks 222 and 222' and racks 216 and 216' straddle base plate 125 to keep feed members 166 and 168 nestled down into the channels formed by T-shaped member 170 and wedge-shaped members 172 and 174 on base plate 125. Pinions 214 and 214' are restrained against substantial endwise movement relative to carrier 121 by two side plates 226 and 226' secured by bottom plate 228 to center plate 218 with pinions 214 and 214' respectively straddled by carrier plates 218, 226 and 218, 226'.

Since shaft keyways 212a and 212a' in shafts 212 and 212' extend a substantial distance along the length of these shafts and keys 214a and 214a' are carried by pinions 214 and 214', this structure permits these gears to be moved axially along the length of their respective shafts and still maintain the driving relationship whenever center carrier 121 is moved axially along shafts 212 and 212'.

Receptacle conveyor C also includes a shifting type actuating means 230 in Figs. 7, 8, 9 and 10 for moving by a movement, here shown specifically as an oscillation movement, each feed member 166 and 168 between a feeding position (shown by feed member 168 at the left in Fig. 5 with all of its driving devices 168a upwardly extending) and a non-feeding position (shown by feed member 166 at the right in Fig. 5 with all of its driving devices 166a horizontally extending). This shifting type actuating means 230 in Figs. 1, 7, 8, 9 and 10 always assures that one feed member will be in the feeding position while the other is in the non-feeding position while they respectively move through the driving and return strokes. Fig. 7 corresponds with Fig. 26 in my copending application, "Apparatus for Forming and Affixing a Divider in a Box and the Product Thereof". Power is supplied thereto from motor driven drive shaft MD in Figs. 7 and 8, rotatably supported by bracket CF58 on cross bar CF8, through a beveled gear 232 thereon meshing with another bevel gear 234 keyed to a shaft 236 rotatably mounted in frame plates CF26' and CF40 with shaft 236 having a drive gear 238 thereon meshing with a driven gear 240 keyed to a cam shaft 241 rotatably mounted near opposite ends in frame plates CF26 and CF26'. The power drive includes two rotatable cams 242 and 242'; roller type cam followers 244 and 244' rotatably mounted respectively on vertically reciprocating bars 246 and 246' mounted for vertical reciprocation between post legs CF6a and suitable guide blocks 245, 245', 247, and 247' secured respectively to plates CF26 and CF26' and to post connector plates CF6b; a connecting rod 248 secured at opposite ends to the respective bars 246 and 246'; and springs 252 and 252' secured at opposite ends to connecting rod 248 and to blocks 245 and 245' for resiliently pulling the follower rollers down against the periphery of the cams to cause return or downward movement of the connecting bar 248 while the rising profile of the cams causes the raising movement of bar 248. Of course, it is evident that only a single cam and follower could be used if so desired but the present construction applies equal vertical forces to the opposite ends of connecting bar 248 so that, as will be brought out in more detail hereinafter, the drive will not tend to bind as the machine is set up for different size receptacles R.

This shifting type actuating means 230 includes a rack and pinion drive for converting the reciprocation of followers 244 and 244' into oscillation of feed members 166 and 168 and includes a connecting means operatively connecting the followers 244 and 244' to the rack and for connecting the pinion to both feed members 166 and 168. The vertical movement of cam follower rollers 244 and 244' is transmitted through the vertical reciprocating bars 246 and 246' respectively and then through the connecting bar 248 to rack 256 adapted to reciprocate vertically in a guide member 257 secured to one edge of an end plate 255 secured to the end of base plate 125 of center carrier 121, as shown in Figs. 9 and 10. The connecting bar 248 has a groove or slot 248a extending into the side surface thereof, rectangular in cross section, as shown by the angularly cut-off right end thereof in Fig. 9, with this adapted to permit the lower end of rack 256 to slide along the length thereof by a tongue-shaped lower end 256a of rack 256 fitting into groove 248a, for a reason brought out in more detail hereinafter. Rotatably mounted on plate 255 of carrier 121 is a common drive pinion gear 258 on shaft 260 meshing with rack 256 and also meshing with driven gears 262 and 262', each keyed against rotation to and secured against endwise removal from couplings 266 and 266' rotatably mounted in plate 255 of carrier 125 with these couplings respectively having collars 266b and 266b' straddling plate 255 with gears 262 and 262' to prevent endwise movement and having non-circular, such as square in cross-section, male-type shaft portions 266a and 266a' keyed thereto and extending out of the left end thereof in Fig. 10. The feed members 166 and 168 have sleeve or female-type coupling members 268 and 268' secured respectively to the right ends thereof in Fig. 10 with each coupling member having a non-circular cross section adapted to coincide with and slide over shaft portions 266a and 266a' and to be keyed non-rotatably therewith. Hence, the oscillation of gears 262 and 262' will be transmitted as oscillation of the two feed members 166 and 168 respectively while the couplings 266a, 268 and 266a', 268' will permit reciprocation of tube type feed members 166 and 168 with respect to the gears 262 and 262' as they are moved through their driving and return strokes by the driving type actuating means 180 in Figs. 3–6. The common drive gear 258 will assure that the oscillation or shifting of the feed members between feeding and non-feeding positions will always be kept in the proper phase relationship so that one will be in the feeding position (see driving device 168a in Fig. 5) while the other is in the non-feeding position (see driving device 166a in Fig. 5).

The driving type actuating means 180 and the shifting type actuating means 230, and all cams and gears thereof, are operatively connected in the proper phase relationship to the drive shaft MD so that the proper sequence of operation takes place. In this sequence of operation, feed members 166 and 168 each moves through an operation cycle including movement in a drive cycle portion in the feeding position (see device 168a in Fig. 5) through the driving stroke and then movement in a return cycle portion in the non-feeding position (see device 166a in Fig. 5) through a return stroke. However, the timing is arranged so that one feed member, either 166 or 168, moves through one of these cycle portions while the other feed member moves through the other cycle portion so that the receptacles R will be advanced in step fashion along the length of the conveyor C by being passed from one driving device on one feed member to another driving device on the other, such as from driving device 166a to driving device 168a, since the driving strokes have adjacent ends overlapping. Also, every receptacle R on conveyor C will be advanced during every one of said cycle portions. The receptacles R in Fig. 1 are each located at the transfer point between driving devices and determine the location of receptacle stations CRS with these stations located equidistant along the length of the conveyor C. The stroke of each feed member 166 and 168 is constant and the effective stroke of each is at least equal to the maximum length of receptacle or box R expected to be used on this conveyor, disregarding the overlap of the ends of the strokes, so that this conveyor may be used for any box of this length or of a shorter length.

Receptacles R are fed to and past divider strip former and affixer D by endless belts so as to be fed one at a time to the first driving device of conveyor C. See my copending application entitled, "Apparatus for Forming and Affixing a Divider in a Box and the Product Thereof" for further details. In Figs. 7 and 8, shaft 236 drives by a sprocket 270 keyed thereto a sprocket chain 272, which in turn drives a sprocket 274 keyed to a shaft 276 rotatably mounted in frame plates CF46 and CF32. Friction type receptacle feeding belts 278 and 278' are driven respectively by bevel gears 280 and 280' keyed to shaft 276, bevel gears 282 and 282' on shafts 283 and 283' rotatably mounted in plates CF48 and CF54 and in carrier 284, and drive sheaves 286 and 286'. Both belts 278 and 278' are driven by another gear driven sheave, but only sheave 288' for belt 278' is shown. Here, gear 290' keyed to shaft 283' drives gear 292' keyed to shaft 294' with sheave 288' keyed to shaft 294, rotatably mounted in plates CF48 and CF54.

The structure of receptacle conveyor C can be suitably adjusted to allow for different widths in the receptacles R when other sizes are used. The structures of carriers 120 and 121 and the conveyor frame serve as adjustable means operatively connecting the receptacle edge guides 160 and 162 and the feed members 166 and 168 so that the guide 160 may be moved toward or away from guide 162 for different size receptacles by carrier 120 and the feed members 166 and 168 may be moved in the same direction by carrier 121 with respect to guide 162 to maintain engagement between the driving devices 166a and 168a and the receptacles R at approximately the same relative points thereof, approximately equidistant from the mid-point of the width of the receptacle R. This is easily accomplished by rotating shaft 152 or 156 of carrier 120 or shaft 153 or 157 of carrier 121 in the appropriate directions. The driving type actuating means 180 and the shifting type actuating means 230 each has an adjustable operative connection between the cam follower and feed members 166 and 168 as part of its connecting means mentioned heretofore. With this adjustable operative connection permitting this movement of the feed members 166 and 168 laterally of the conveyor path while no movement of the drive cam 192, 192', 242 and 242' occurs. In the driving type actuating means 180, this adjustable operative connection includes the keys 214a and 214a' and keyways 212a and 212a' forming connections between shafts 212 and 212' and pinion gears 214 and 214' in Fig. 5. Pinion gears 214 and 214' are adapted to move laterally with the center or feed member carrier 121 while carrying woodruff drive keys 214a and 214a' adapted to slide along keyways 212a and 212a' cut along a substantial length of each of the drive shafts 212 and 212' so that feed members 166 and 168 may be moved laterally of the conveyor path and along the length of shafts 212 and 212' while the feed members 166 and 168 always move through their driving and return strokes in the same manner. In the shifting type actuating means 230, the tongue-shaped end 256a and groove 248a in Fig. 9 are adapted to permit movement of the carrier 121 along the length of the connecting bar 248 while always causing proper oscillation type shifting movement of the feed members 166 and 168. Since drive bars 246 and 246' in Fig. 7 apply equal vertical forces to the opposite ends of the connecting bar 248, and the bar 248 is of substantial length, there is no tendency for the mechanism to bind or for the tongue and groove connection 248a and 256a in Fig. 9 to bind in any laterally displaced position of the carrier 121 throughout the range of the machine.

Also carrier 284 in Fig. 7 is frictionally secured to cross bar CF10 so belt 278 can be adjusted for different width receptacles R.

Slight alterations in construction readily suggest themselves. For example, it should be readily apparent that both feed members 166 and 168 could move through the driving stroke and the return stroke together with both being in either the feeding or the non-feeding position at the same time so that the receptacles would have a step-along action and two driving devices 166a and 168a would push each receptacle simultaneously. However, this would means that the receptacles would be idle during the return and non-feeding stroke so that the conveyor C would operate more slowly than the present construction. Also, it should be readily apparent that this conveyor C could be used for any type article, although it is shown herein as conveying only the specific receptacle R.

Sub-assemblies

Each sub-assembly A1, A2, A3, A4, A5, and A6 in Fig. 1 is substantially identical so only sub-assembly A2 will be described in detail with occasional references to the others where the structure or modes of operation are different.

The frame for sub-assembly A2 includes a plurality of rigidly interconnected frame members each having a reference numeral with a prefix AF. The first mechanism M1 and a portion of the second mechanism M2 include the same rigidly interconnected frame members shown in the aforesaid copending patent application entitled "Collating Machine" with post AF2 in Figs. 25 and 26 of the present application; side bars AF4 in Fig. 11; frame member AF6 in Fig. 11; post AF8 in Fig. 11; block AF10 in Figs. 27 and 28; frame plate AF12 in Figs. 27 and 28; parallel vertical plates AF14, AF16, AF18 and AF20 in Figs. 11, 12, 13, 14, 15, 18, 21, 27 and 28; and cross bars AF22, AF24 and AF26 in Figs. 11, 12, 13, 15 and 28 corresponding respectively to the following frame members disclosed in said last mentioned copending application: post F1 in Fig. 1; side bars F7 in Figs. 6 and 31; frame member F40 in Fig. 1; post F10 in Fig. 1; block F41 in Fig. 34a; frame plate F42 in Fig. 34a; parallel vertical plates F16, F8c, F8f and F20 in Figs. 2, 4, 31, 34, 34a, 35, 36, 37 and 40; and cross bars F25, F26 and F27 in Fig. 34. Cross bars AF22, AF24 and AF26 in the present application are secured to and maintain plates AF18 and AF20 in parallel relationship.

The second mechanism includes a plurality of frame members secured together by bolts to permit disassembly. It has transversely extending parallel plate members AF30 and AF32 in Figs. 13, 14, 15 and 18 secured respectively at their inner ends to vertical plates AF14 and AF20 and at their outer ends to vertical, parallel posts AF34 and AF36 spaced apart along the conveyor. Horizontally extending, vertically spaced apart bars AF38, AF40 and AF42 are secured to both posts AF34 and AF36. Support plate AF44 is secured at opposite ends to plate members AF30 and AF32 and has a downwardly extending support bracket AF46 secured thereto for rotatably supporting drive shaft MD and clutch 41.

The frame of mechanism M2 straddles and bears against the outer flat surfaces of conveyor side guide rails CF2 and CF4. An inverted L-shape member, comprising plate AF48 in Figs. 11, 14 and 18 and post AF50 are secured to each other at the lower right-hand corner in Fig. 18 by connector plate AF51, are secured by plate AF48 to frame member AF20 and are secured by post AF50 to plate member AF32. Guide plate AF52 is secured to plate AF48, post AF50 and connector plate AF51 at their junction and to frame member AF14 to extend parallel to and bear against the outer surface of the inner edge guide 162. On the opposite and outer side of conveyor C in Figs. 13, 14, 15, 18, 22, 23 and 24 a spacer block AF54 is secured to bar AF42 with said block having a vertical plate AF56 and a horizontal plate AF58 secured thereto. The opposite edge of plate AF58 is parallel to and bears against the outer surface of outer conveyor side rail CF2.

The outer conveyor side has a plurality of guide and support frame members. Bracket AF60 in Fig. 18 is secured to bar AF40 and post AF62 is secured to the upper surface of horizontal plate AF58. Horizontal bar AF66 in Figs. 15, 18, 22, 23 and 24 is secured at spaced points to posts AF34 and AF36, and another bar AF64, parallel to bar AF66, is secured at one end to post AF34 and at the other end by a bracket AF68 to horizontal bar AF42.

Figure 24:
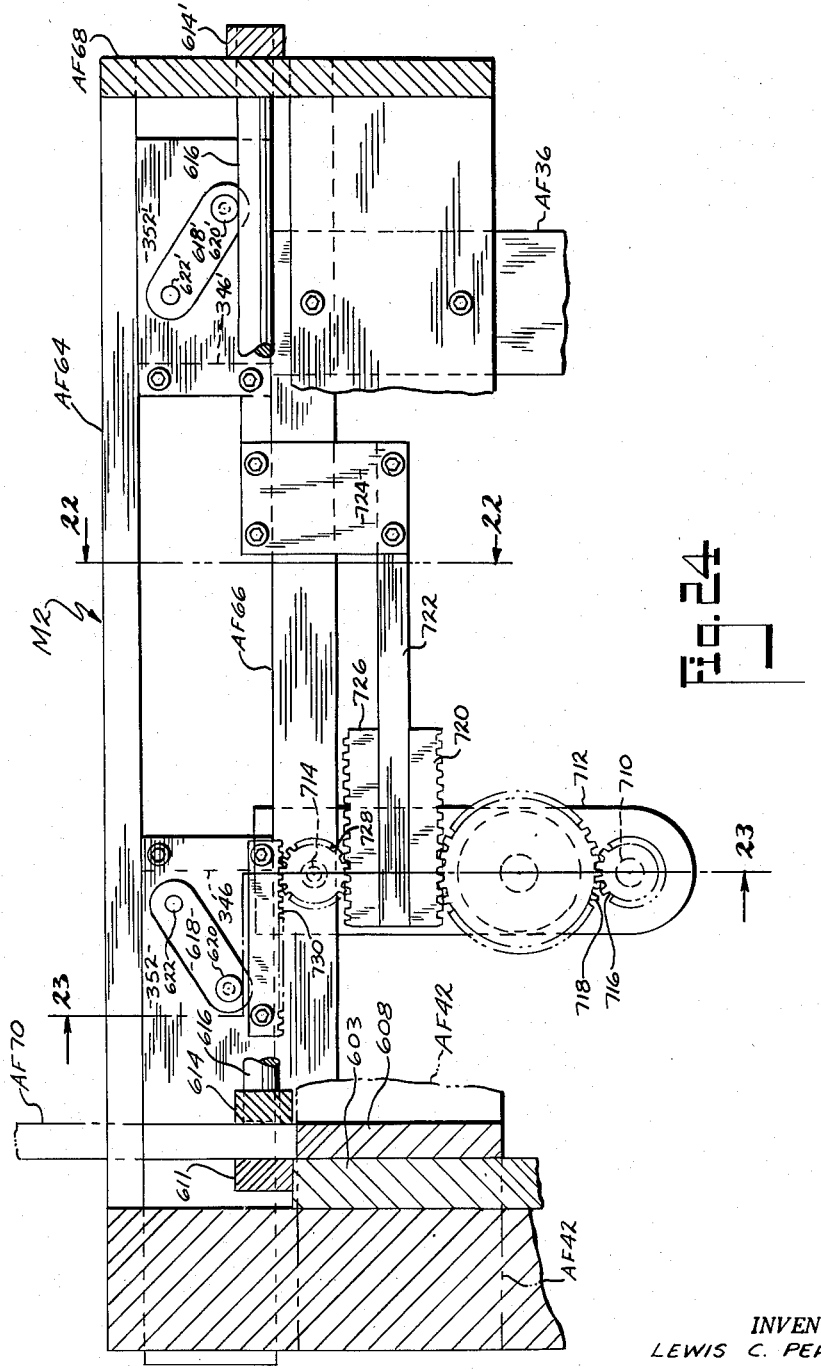
Fig. 24 is a vertical elevational view taken along the line 24—24 of Fig. 14 with parts broken away.

Suitable frame structure of mechanism M2 bridges across the top of conveyor C. At the outer side of conveyor C, a bracket AF70 in Figs. 13, 15 and 24, is secured at its lower end to horizontal bar AF42 and is joined in its upper portion to vertical plate AF72 and top plate AF74 with the latter secured to both vertical plates AF56 and AF72. At the inner side of conveyor C, a vertical plate AF76 in Figs. 13, 14, 15 and 21 is secured to vertical plate AF14. A horizontally extending plate AF78 is secured to plate AF76 by connecting bar AF80. Conveyor bridging bars AF82 and AF84 are secured respectively at opposite ends to horizontal plate AF78 in Figs. 18, 29 and 30 and to vertical plate AF56 and secured by bracket AF86 in Figs. 13 and 14 to horizontal plate AF78 and to the underside of top plate AF74. Block AF83 is secured to the undersurface of plate AF78 and has secured thereto by horizontal screws 298 a U-shaped block AF85 in Figs. 18, 21, 29 and 30. Horizontal plate AF78 has two cylindrical posts AF88 and AF90 in Figs. 14, 18 and 21 and a rectangular post AF92 secured thereto at the upper post ends to bridging bar AF84 and plate AF78 with each post being downwardly directed therefrom. Top plate AF74 in Fig. 13 has the top of a downwardly extending cylindrical post AF94 secured thereto.

A mechanism guard is shown in Figs. 14 and 21. It includes a bar AF96, extending generally parallel to bar AF84, two supporting straps AF98 each secured at opposite ends to bars AF84 and AF96, and a downwardly extending plate-like guard plate AF100 secured along a portion of its upper end to bar AF96.

The gear drive for sub-assembly A2 is shown in Figs. 11, 13 and 15 and is the same as that disclosed in said copending application entitled "Collating Machine." Gear 300, driven by clutch 41 and drive shaft MD, meshes with and drives in sequence gears 304, 306, 308 and 310. Gears 304 and 310 are secured to and carried by shafts 314 and 316 respectively. Gears 306 and 308 are secured to and rotate with shaft 318. Shaft 314 is rotatably journalled in frame plates AF30 and AF32; shaft 316 is journalled in frame plates AF18 and AF20; and shaft 318 is journalled in frame plates AF14 and AF18. It has been found that an operative machine results when the gears 300, 304, 306, 308 and 310 inclusive bear the teeth or diameter ratios of four, twelve, twelve, four, and twelve. Shafts 314 and 318 actuate the ejector arm 362 in Figs. 13, 15 and 16; shaft 316 actuates the sheet gathering conveyor G in Figs. 11, 13, 15, 16 and 17; and gear 306 actuates through suitable gears and linkage all four sheet feeding means FS in Fig. 11, the cyclic operation of the valve for applying suction to their feeding heads, and the advancement of the sheets in packs Q toward the left in Fig. 11, as disclosed in said last mentioned copending application. Hence, shafts 314 and 318 rotate at the same speed; and shaft 316 rotates at ⅓ this speed. The ejector arm 362 of transfer means T1 in Figs. 13, 16 and 17, and the movement of sheet feeding means FS in Fig. 11, have have the same operation cycle frequency. The gathering conveyor G in Figs. 11, 13 and 18 is designed so that it is moved vertically by shaft 316 the distance between two adjacent sheet unit supporting means GS in Fig. 11 during an operation cycle.

*First mechanism of each sub-assembly*

Each of the sub-assemblies A1, A2, A3, A4, A5 and A6 in Fig. 1 has a first mechanism M1 identical in each sub-assembly and identical to the major portion of the apparatus disclosed in the aforesaid copending application entitled "Collating Machine." Since each sub-assembly is identical, only the one in sub-assembly A2 will be described with this mechanism providing the functions of supplying, collating and gathering sheets S or S' into sheet units U, as disclosed in the aforementioned application entitled "Collating Machine." This mechanism includes means for feeding or collating sheets S or S', especially folded sheets S from a plurality of supply or sheet packs Q, one at a time by suction pick-engagement on the relatively smooth outer rear face S5 or S5' of each sheet, relatively smooth when compared with the front outer face S4 or S4', at the left ends of packs Q and Fig. 11 with the front outer face S4 or S4' of all sheets having a display design, with or without ornamentation S6 or S6', oriented in a predetermined manner with respect to the folded edge S3 or corresponding edge S3', as on a conventional greeting card. Each mechanism M1 has a plurality of these supply packs Q in Fig. 1, taking the form of four in number arranged vertically above each other, with four sheet feeding means FS, one for each pack, for feeding or collating the sheets from the packs onto a vertically upwardly moving run G1 of a gathering conveyor G against a vertically extending stop bar 321 in Figs. 11 and 28 into sheet units U with each unit comprising four sheets with one from each pack Q, in the manner disclosed in the aforementioned copending application. Stop bar 321 in Figs. 11 and 28 is secured to its base 321a adapted to be adjustably moved along an inverted T-way formed by guide base 323 and way caps 323a detachably secured to base 323. Guide base 323 is secured to frame block AF10 in turn secured to frame plate AF12 secured at opposite ends to frame plates AF18 and AF20 in the same manner as shown in Fig. 34a of the copending application entitled "Collating Machine," to permit adjustment of bar 321 in and out for different size cards or sheets being collated by the machine. Sheet unit gathering, inverting and transferring conveyor G in Figs. 11, 12, 13, 14, 15 and 18 mechanically gathers or collates sheets S and S' in predetermined sheet units U (if all four packs are feeding sheets, the unit is of four sheets but some of the advantages are obtained if only one pack is feeding sheets; hence, a unit may have one or more sheets therein) at spaced intervals on the right-hand side of conveyor G, in Fig. 11 received from the sheet feeding means FS with each unit individually ejected by ejector arm 362 of a first transfer means T1 at a first transfer zone Z1 on the left-hand side of conveyor G, in Fig. 18 with the display design bearing face S4 or S4' facing upwardly to be properly oriented for packing or display purposes. Gathering conveyor G includes an endless link chain type conveyor member 320 having a first or upwardly moving loading run G1 and a second or downwardly moving discharge run G2 having loading and discharge stations respectively therealong with the conveyor member movable up over the top along a connecting run G3 in moving from loading to discharge. A driving sprocket 322 is driven by shaft 316 of the gear train in Figs. 11 and 13 while a driven sprocket 324 in Fig. 11, rotatably mounted in and between frame plates AF18 and AF20, supports the upper end of this link chain type conveyor member 320 during the driving thereof.

The conveyor G has a plurality of sheet unit supporting means GS in Figs. 11 and 12, here 24 in number, spaced along the length of conveyor member 320 with each adapted to receive sheets S or S' extending generally transverse to the direction of travel of conveyor member 320 and to carry units U in spaced apart relationship. Each sheet unit supporting means GS includes a base 326 in Figs. 11 and 12 secured to endless conveyor member 320 by a pair of brackets 328. An arm connector 330, as well as base 326, is secured to each bracket by screws. Two sets of arms 332, 334, spaced along the path of movement or longitudinally along the endless conveyor member 320, are secured to opposite ends of each arm connector 330 by bolts. Each unit supporting means GS has four such arms 332, 334 and a pair of arm connectors 330. These form longitudinally spaced apart arm sets with each set having a pair of transversely spaced apart arms located equidistant from the center line of the unit travel path with the arms of each set located in a plane extending perpendicular to the direction of travel, as shown in Figs. 12 and 14. The cards or sheets S or S' making up each unit U are located between arms 332 and 334, as shown in Figs. 11 and 18. To guide the travel of each unit supporting means GS, each base 326 has projections in Figs. 11 and 12 at opposite ends guided by guide members 336, 338 and 340 in Figs. 11 and 12 with these bases 326 traveling between parallel inner and outer guide members 336 and 338 and around the outer surfaces of arcuate guide members 340. Each of these guide members is secured to frame member AF18 or AF20 and there are six of these guide members arranged in pairs on each frame member symmetrically with respect to sprockets 322 and 324 and conveyor member 320.

On sub-assembly, A2, and on each of the other sub-assemblies, mechanisms M1 and M2 include two side guide members MS and MS' having sheet unit side guide inner surfaces MSG and MSG' in Figs. 12 and 14 along the full length of sheet unit travel along the gathering conveyor G, the first sheet unit transfer means T1, the sheet unit positioning and fold closing means P, and the second sheet unit transfer means T2. Each of these guide members is composed of two side guide walls 344 and 346 or 344' and 346'. Side guide walls 344 and 344' are each of generally inverted U-shape in side view in Figs. 11, 13 and 18, and are manufactured from generally uniform thick material with this material being preferably clear plastic to permit visual observation of the gathering and transferring operation. The side guide walls 344 and 344' extend longitudinally along and straddle the sheet units U and supporting arms 332 and 334 to form portions of guide surfaces MSG and MSG'. These guide walls 344 and 344' are supported by horizontally extending parallel bars 348 and 348' (four in number) in Figs. 11, 12, 13, 14 and 18 each secured to front and rear support bars 350 or 350' by bolts with these bars in turn secured to the side guide walls 344 or 344' in the manner illustrated by straps 351 or 351'. Guide walls 346 and 346' of mechanism M2 are supported at their inner ends on guide plate AFS2 in Fig. 18 and are secured respectively at their outer ends to blocks 352 and 352' supported between parallel frame bars AF64 and AF66 in Fig. 24. Guide walls 346' and 348' are connected together by a strap 354' in Figs. 14, 18 and 21 connected to each. Guide walls 346 and 348 are connected together in Figs. 13, 14, 18 and 21 by a strap 354 connected to guide wall 344 at one end and at the other end to a boltedtogether angle bracket 356 and strap member 357 with the latter connected to the lower edge of side guide wall 346.

In operation of sub-assembly A2, sheet feeding means FS feeds the sheets from packs Q in Fig. 11 into roll units 360. The feeding action of power driven roll-type feed units 360, rotatably mounted to frame members AF6 and AF8, tend to bring the sheets making up the units into closer registration. The side guides are provided with tapered mouth opening surfaces 344a and 344a' in Fig. 12 extending along the full length of the loading run G1 of the conveyor G and immediately in front of the roll feed units 360 with these mouths opening outwardly to pull the fed sheets S or S' laterally into alignment to form a more compact unit U during the feeding operation.

The sheets forming each unit U are moved laterally together in both directions by the gathering conveyor G and guide wall 344, 344' as the units U travel from the loading to the discharge station. As the sheet units U travel from the loading to the discharge station, they will be shifted transversely of the conveyor travel into a still tighter unit by the flat sheet guide surfaces MSG and MSG' of the side guide walls 344 and 344'. Although these faces are flat, they taper in the direction of conveyor travel because support bars 350, 350' on the right in Fig. 12 are shorter than the support bars 350, 350' on the left while horizontal bars 348 and 348' are parallel to each other. Hence, as the conveyor member 320 travels from the loading station, over the top, and to the discharge station, the flat sheet guide surfaces MSG and MSG' will pull the sheets S of units U laterally (transverse to the direction of conveyor travel) into a more compact unit. Also, as the sheet units U go over the top, gravity will pull them down between the arms 332, 334 and against the arm connectors 330 as a locating stop (see Fig. 11) so as to shift the sheets of the unit laterally (in the direction toward and away from the conveyor member 320) into a more compact unit in this direction also. Hence, the surfaces MGS, MGS' are of generally uniform spacing and extend along the path of sheet unit travel from the supply packs Q to the loading stations LS1 and LS2 and are of generally uniform spacing but gradually increase in spacing rearwardly over run G3 of the gathering conveyor G. Hence, as the sheet units move from right to left in Fig. 12, this tapering of the inner guide surfaces of the guide walls 344 and 344', pulls the sheets S in each unit U laterally into a compact unit while they are supported upon the conveyor member 320 by their folded edges S3 or equivalent S3'. Equal distance between these guide surfaces MSG and MSG' is the center line of travel of the sheet units U, and for the purpose of the present discussion, it will be assumed for the present that these guide surfaces MSG and MSG' are fixed with respect to the sub-assembly frame and do not move relative thereto so as to maintain the spacing between these guide surfaces and to form rigid machine members.

The gathering conveyor supplies sheet units U in spaced apart or timed relationship to the first transfer zone Z1 in Fig. 18 while inverting the sheets with respect to their suction pick-up position by feeding means FS in Fig. 11 as they arrive at the transfer zone Z1 in Fig. 18. Also, said units U are supplied to the first transfer zone Z1 in Fig. 18 with the folded edges similarly oriented in the transfer zone to form a folded unit edge on the right in Fig. 18 against which ejector arm 362 is adapted to push in conveying the sheet units U in the leftward direction.

*Second mechanism for each sub-assembly*

Each sub-assembly includes a second mechanism, designated as M2 in Fig. 1 for sub-assembly A2, including a first sheet unit transfer means T1, sheet unit positioning and fold closing means P and a second sheet unit transfer means T2 at a receptacle loading station LS2 in Fig. 18. The first sheet unit transfer means T1 transfers the sheet units U individually from the first transfer zone Z1 from the gathering conveyor G to a position on the sheet unit positioning means P at least partially along the path of travel toward loading into the receptacle R on the receptacle conveyor C. This first transfer means T1 includes ejector arm 362 in Figs. 13, 14, 15, 16, 17 and 18 extending between the arms 332 or 334 of each set in the first transfer zone Z1 along gathering conveyor run G2 with this ejector arm 362 and the gathering conveyor G having generally the same structural relationship and timed mode of operational drive from the drive shaft MD as in the aforementioned copending application entitled "Collating Machine."

Transfer means T1, including ejector arm 362, is provided in Figs. 13–18 for discharging or transferring together all the sheets of a unit U from the gathering and inverting conveyor G. This means is the same as that disclosed in the copending application entitled "Collating Machine" except for a modified ejector arm construction. This means includes ejector arm 362 having an elongated base portion, and means for moving its distal end in timed relationship to the conveyor G and between the transversely spaced apart conveyor arms 332, 332 and 334, 334 toward and away from the endless conveyor member 320 in Fig. 13 for transferring the sheet units U one at a time from the downwardly moving run G2 of the gathering conveyor G to the positioning means P by pushing outwardly against the folded sheet edge S3 or S3' to eject the units U from between arms 332, 334 and side guide walls 344, 344'.

The ejector arm 362 is movable vertically up and down by cam 364 in Fig. 13 secured to shaft 314 of the gear train and is movable horizontally back and forth by an oscillating movement by cam 366 secured to gear train shaft 318 so as to move synchronously with the endless conveyor member 320.

The vertical movement is caused in Fig. 13 by a link 368, pivotally connected at its left end to frame member AF18, having a cam roll follower 370 at its right end biased into peripheral engagement with cam 364 by tension spring 372 secured at its upper end to link 368 and at its lower end to frame member AF18. Connecting link 374 is pivotally connected at its upper end to link 368 and at its lower end to a cross shaft 376 in Figs. 13 and 15 having ejector arm 362 clamped thereto and movable vertically by the relative movement permitted by parallel links 378, 378 in Figs. 13 and 15, each pivotally secured at one end to shaft 376 and secured at the other end to a cross shaft 380 pivotally secured to frame members AF18 and AF20. Hence, as cam 364 rotates, follower 370, cross shaft 376 and ejector arm 362 will raise and lower.

Ejector arm 362 is also simultaneously oscillated back and forth toward and away from conveyor member 320 by oscillating its supporting cross shaft 376 by the mechanism in Figs. 13 and 15. A link 382 has a cam roll follower 384 rotatably secured to one end while the other end of the link is telescoped within a sleeve 386 with a spring 388 kept in compression by lock nuts 400. Link 402 is pivotally secured at opposite ends to frame member AF18 and link 382 while link 404 is non-rotatably secured to cross shaft 376 at its lower end and is pivotally connected by a pivot and clamp bolt 406 to sleeve 386 at a point spaced from shaft 376. A tension spring 408 is fixed at its left end with respect to frame member AF18 and at the other to link 402 to resiliently urge roll follower 384 constantly into peripheral contact with cam 366. Pivot and clamp bolt 406 is movable along the length of slot 404a in the upper end of link 404 and may be secured at any point therealong for adjustment of the arcuate angle of oscillation of shaft 376 and the length of back and forth travel of the upper or distal end of ejector arm 362.

In Figs. 13 and 15, sleeve 386 and compression spring 388 are used with link 382 to provide a link variable instead of fixed in length for several reasons. First, if the sheets of a unit U are jammed against an obstruction located to the right in Fig. 13 of the distal ends of arms 332, 334 while ejector arm 362 is attempting to push the sheet unit U to the right between these arms, machine part bending or breakage will not occur since spring 388 will permit arm 362 to remain stationary while cam 366 continues to push follower 384 toward the right in Fig. 13. Second, since links 404 and 402 are not parallel and not of equal length, the length of one of the links must necessarily change as the angular relation between them changes during the oscillation of shaft 376. Third, oscillation of shaft 376 about shaft 380 will change the center to center distances between shaft 376 and the pivot at the lower end of link 402 as shaft 376 is moved vertically by cam 364. Fourth, adjustment in the length of stroke may be obtained by moving bolt 406 along the slot 404a to change the effective length of link 404; however, the end points of any given length stroke may be altered by unclamping arm 362 in Figs. 13, 15 and 16 from shaft 376 and reclamping it thereon in a new angular position. Hence, spring 388 may change in overall length during jamming and during each cycle of movement of the ejector arm 362.

The ejector arm 362 in Fig. 16 has generally the same elongated base portion as in the copending application but it is now formed in two portions, a lower portion 362a clamped to shaft 376 and an upper portion 362b operatively connected to lower portion 362a. Lower portion 362a has a member 414, U-shaped in cross section, secured at its lower end to shaft 376 and having a cover plate 416 secured thereto by bolts to form a closed channel, rectangular in cross section and securing therein a sleeve 418, having a bore rectangular in cross section. The upper portion 362b is telescopically mounted within sleeve 418 and is normally biased to the position shown in Figs. 16 and 17 by tension spring 419 secured at its upper end to sleeve 418 and at its lower end by blocks 420 and 422 and electrical contact 424 secured to the lower end of lower portion 362a and adapted to abut against the bottom of sleeve 418 so that arm portions 362a and 362b will assume their normal and expanded position shown in Figs. 16 and 17. A resilient electrical contact strip 426 is secured at opposite ends to member 414 and cover plate 416 by insulator blocks 432 and 430.

In the present application, the upper end of the ejector upper base portion 362b has a generally inverted V-shape in Figs. 13 and 18 with one leg 362c thereof being the upper end of the base portion 362b and the other leg 362d positioned for sheet unit fold engagement with the vertex of the V-shape adapted to slide behind each sheet unit U and engage the sheet folds thereof so that the other leg 362d will push the unit U clear of the gathering conveyor G, past the receptacle conveyor inner rail CF4 forming the edge of the receptacle conveyor C, over the receptacle R and into engagement with the positioning means P. The sheet units U are transferred individually by a pushing action against the sheet folds.

An additional sheet unit guide 410 in Figs. 13 and 18 may be secured to the machine frame to provide support for small sheets that would not otherwise get sufficient support from the downwardly curved distal end of the arms 334. Each guide is of inverted L-shape with a vertical portion 410a detachably secured to side rail CF4 by bracket 412 having clamp screw 412a and having integrally formed therewith a horizontal portion 410b in Fig. 18 and extending out toward the left in Fig. 18 to provide the support for the sheet units U with both portions located between the guide walls 344 and 344' and preferably between the arms 332, 334.

Next will be discussed the receptacle compartment selection function performed by the sheet unit positioning and fold closing means P and the second sheet unit transfer means T2 in Fig. 18. The positioning means P and second transfer means T2 of each sub-assembly may be set up in either of two different ways for dropping sheet units U in Fig. 18 from position P1 at receptacle loading station LS1 or LS3 into corresponding receptacle compartments R1 or R3 in all receptacles R or from position P2 at loading station LS2 or LS4 into corresponding receptacle compartments R2 or R4 in all receptacles R, as shown by sub-assemblies A1, A2, A3, and A4 respectively in Fig. 1.

The drop from position P2 into the left-hand receptacle compartment R2 at loading station LS2 will be first described and shown by sub-assembly A2 in Fig. 1 and by the stop plate 584 in its solid line position in Fig. 18. The sheet units U are kicked out from gathering conveyor G by ejector arm 362 to be received upon a guide type support member PG in Fig. 18 of positioning means P at a first position P1 in a second transfer zone Z2 and to be stopped thereat by a brake and fold closing means PB. Then, a positioning conveyor PC conveys individually the sheet units U along said support member PG from said first position P1 to a second position P2 (spaced horizontally to the left from position P1) in said second transfer zone Z2 against stop 582 and in vertical alignment with receptacle compartment R2 at rest at a receptacle station CRS directly under loading station LS2 to be dropped from position P2 into receptacle compartment R2 by actuation of at least a portion of said guide member PG to a released position. Hence, positioning means P receives the sheet unit U from transfer means T1 and positions them in second transfer zone Z2 at a loading station LS2 in vertical alignment with the proper receptacle compartment R2 at receptacle station CRS and for individual transfer by said second transfer means T2 into the proper receptacle compartment R2.

This guide type support member PG, best shown in Figs. 13, 14, 18 and 21, includes fixed unit support element portions 440 and 440' fixed at the first position P1 to their respective guide walls 346 and 346' against relative movement along and with respect to their associated guide walls 346 and 346' and retractable unit support element portions 442a and 442a' of shutters 442 and 442' operatively connected to their associated guide walls 346 and 346' and extending between and under both the first and second positions P1 and P2 and being located below the level of the fixed unit support element portions 440 and 440' at the first position P1. These portions form two generally parallel unit support elements with one comprising portions 440 and 442a and the other comprising portions 440' and 442a' straddling and extending along the path of unit travel and operatively connected respectively to guide walls 346 and 346'. Each fixed unit support element portion 440 or 440' is detachably and operatively connected to its associated side guide wall 346 or 346' by identical structure in Figs. 14, 18 and 21. Longitudinally extending brackets 444 and 444' have flanges 444a and 444a' secured to the outside of guide walls 344 and 344' by screws 446 and 446' with the transverse rods 448 and 448' clamped thereto by splits in the brackets pulled together on the rods by screws 447 and 447'. Downwardly extending supports 450 and 450' are split at their upper ends and clamped thereto by screws 452 and 452'. Straps 454 and 454' have elongated adjustment slots 454a and 454a' by which they are secured by screws 456 and 456' to supports 450 and 450'. Straps 454 and 454' extend under guide walls 346 and 346' and are secured by screws 460 and 460' to spacer blocks 458 and 458' and fixed unit support element portions 440 and 440'.

After the sheet units U are individually kicked off of the gathering conveyor G by ejector arm 362, they are received upon the guide type fixed unit support portions 440 and 440' and stopped thereon at position P1 by a brake and fold closing means PB coacting therewith. This takes the form in Figs. 13, 14, 18 and 21 of two identical, C-shaped, spring arms 462 and 462' straddling and equidistant to the center line and having their upper ends fixed to respective side guide wall 346 and 346' by U-shaped clamp members 464 and 464' by clamp screws 466 and 466'. Straps 468 and 468' are secured by screws 470 and 470' extending through adjustment slots 468a and 468a' to members 464 and 464'. Screws 472 and 472' secure straps 468 and 468' to spring arms 462 and 462'. The lower or free ends of spring arms 462 and 462' coact with the guide type fixed unit element portion 440 and 440' at the first position P1 in Figs. 18 and 21 to arrest in this first position P1 the sheet unit movement caused by the ejector arm 362, for closing the open sheet folds during this transfer action, to prevent interleaving of the sheets of unit U with any sheet unit U to the left thereof in Fig. 18, and to position the sheet unit U at the first position P1 for transfer by the positioning conveyor PC as it later moves unit U to the second position P2.

Positioning means P includes a positioning conveyor PC in Figs. 13, 14, 18, 19, 21, 22 and 23 for moving the sheet units U individually in Fig. 14 from the first position P1 to the second position P2. Suitable drive means are provided in Figs. 13, 14, 15 and 18 from shaft 314 to conveyor PC. A sprocket 480 keyed to shaft 314 drives a sprocket chain 482 traveling over idling sprockets 486 and 487 rotatably mounted on frame plate AF30, a sprocket 484 keyed to shaft 488 rotatably mounted in frame plates AF30 and AF32, a bevel gear 490 secured to shaft 488 by set screw 490a, another bevel gear 492 keyed to shaft 494 rotatably mounted in frame bracket AF60 and post AF62 to rotate a drive gear 496 keyed thereto in Figs. 18 and 22. Gear 496 drives gear 498 in Figs. 13 and 23, formed integrally with sprocket 500 rotatably connected to frame post AF94. Positioning conveyor PC includes two driven sprockets 502 and 504 in Figs. 14 and 21 respectively rotatably mounted on frame posts AF88 and AF90. The positioning conveyor PC also includes a conveyor member 506 consisting of upper and lower endless sprocket chains 508 and 510 drivingly connected around sprockets 500, 502 and 504 and having an active run 506M traveling in Fig. 18 between the first and second positions P1 and P2 generally parallel to and equidistant from guide element portions 440, 440', 442a and 442a' in Fig. 21 and having an approach run 506N in Fig. 21 located between the first position P1 and the gathering conveyor G and right angularly inclined with respect to the path of travel between positions P1 and P2. The diagonal return run 506R in Figs. 13 and 14 makes up the third run of the conveyor. This drive drives the conveyor member 506 in timed relationship with the rest of the machine. The positioning conveyor PC includes a plurality of sheet unit pushers 512, here shown as five in number equally spaced along and carried by the conveyor member 506, equidistant from said corresponding generally parallel guide element portions while traveling between first and second positions P1 and P2. Each pusher 512 in Figs. 18 and 19 includes a plate 514 having secured to its upper and lower edges guide shoes 516 and 518 adapted to travel longitudinally respectively through the U-shaped channels in upper active and return guide members 520M and 520R and in lower active and return guide members 522M and 522R secured respectively to bridging bars AF82 and AF84 by two straps 524 and two inverted-L-strap members 526. Each guide shoe in Figs. 19 is secured by two longitudinally spaced screws to its associated pusher plate 514 and has a third screw located therebetween clamping conveyor member link flange 506a thereto. Each pusher 512 includes a pusher arm 528 formed as a helical coil spring for pushing the sheet unit U in a direction transverse to the spring coil axis in Fig. 18. The upper end of the pusher arm 528 has means operatively connecting it to pusher plate 514 by a base stem 530 projecting radially from a gear 532 rotatably connected to a shaft 534 secured to plate 514 with base stem 530 secured at opposite ends to arm 528 and gear 532. Each pusher 512 also includes a follower arm 536 having a cylindrical follower 536a at its upper end and operatively connected at its lower end to the pusher plate 512 by a shaft 538 secured to plate 514 with a gear 540, meshing with gear 532, rotatably mounted on this shaft 538 and secured to the inner end of follower arm 536. The gears 532 and 540 rotatably connect both arms 528 and 536 together and to the conveyor member 506. Each pusher 512 includes a tension spring 542, secured at opposite ends to stop block 544 and base stem 530 and extending around the bottom of gear 532, normally urging pusher arm 528 clockwise in Fig. 18 against stop block 544, secured to plate 514, to the position shown on the right in Fig. 18 called the sheet unit pushing position.

Positioning conveyor PC is so related to position P1 that each pusher arm 528 may move out behind its associated unit U, which has stopped in position P1 in Fig. 18, so as to push it from the right-hand side in Fig. 18. Consider the structure in Figs. 13, 14, 18 and 21.

Positioning conveyor PC includes a pusher control means having an active control member PM in Fig. 18 and an approach control member PN in Fig. 21 respectively having an active control surface PMS and an approach control surface PNS extending generally parallel to and above the travel of the active conveyor member run 506M and the approach run 506N. These coact with the follower 536a of follower arm 536 on each pusher 512 to control the position of the pusher arm 528 thereof. As the pusher 518 moves from right to left in Fig. 18, the pusher arm 528 will move from its sheet unit pushing position on the right, through an intermediate position (as shown) into a retracted or inactive position shown on the left. This action takes place as the sheet unit U is pushed from the first position P1 to the second position P2 with the follower arm 536 following said active control surface PMS and swinging through an over-center position in the middle position illustrated in Fig. 18 through a plane extending perpendicular to the active pusher control surface PMS with the cylindrical follower 536a being on the left side of the plane in the pushing position on the right of Fig. 18 and on the opposite or right side of the plane in the retracted position at the left in Fig. 18 with this active control surface PMS swinging simultaneously the follower arm 536 in a clockwise direction and pusher arm 528 in a counter-clockwise direction against the returning force exerted by the tension spring 542. As the pusher 512 travels from active run 506M to and then along the return run 506R, the pusher arm 538 is kept in the retracted position by a suitable control surface on the underside of control member 550, arcuate in horizontal contour and suspended from top plate AF74 by posts 552 and 554 in Figs. 13, 14 and 31, and by a suitable return control surface PRS in Fig. 13 on the lower surface of guard bar AF96 until it approaches the approach run 506N. As the pusher 512 moves from the return run 506R to the approach run 506N, the control surfaces PRS and PNS at the left end of bar AF96 in Fig. 13 and right end of Fig. 21 respectively and located slightly higher so that these control surfaces, combined with the pulling action of spring 542, serve as a means for urging movement of arms 528 and 536 back from a retracted position shown at the left in Fig. 18 to the sheet unit pushing position against stop 544 shown at the right on Fig. 18 to ready the pusher arm 528 for the same type sheet unit engagement again. This structure permits the follower arm 536 to swing over center and assures that the follower arm 536 will return to the pushing position shown at the right end of Fig. 18.

The approach control member PN in Figs. 13, 21, 29 and 30 includes a suitably bent strap 546 having its right end pushed down against the top of guard bar AF96 by a screw 547 extending loosely down through a hole in strap 546 and screwed into a hole in bar AF96 with a compression type helical spring 549 surrounding the shank of screw 547 and located between the head of screw 547 and the top of strap 546. The left end of strap 546 in Fig. 21 is supported by a bracket 548 secured at its right end to the top of strap 546 and having a horizontal left end portion normally supported on a bottom plate 553 in Fig. 30 secured in U-shaped block AF85 by block securement screws 298. The left end portion in Fig. 21 of bracket 548 has a guide pin 543 in Figs. 21 and 30 connected thereto by a fastener 545 having flanges straddling a hole in bracket 548 and secured thereto. Spring 551 presses fastener 545 down against bottom plate 553.

The active control member PM in Figs. 14, 18 and 21, includes a rod 558 extending generally parallel to the active run 506M and having threaded zone 558a at the left end in Fig. 18 remote from positions P1 and P2 and threaded zone 558b at the right end. An adjustment knob type nut element 560 is screwed onto threaded zone 558 and is rotatably connected to and restrained against endwise movement relative to frame plate AF56 and side guide walls 346, 346' by a collar 562 attached by a set screw to a cylindrical portion of element 560 extending through a hole in plate AF56 in Fig. 18. Rod 558 is fixed against rotation relative to the active control surface PMS and other portions of active control member PM by having its threaded zone 558b threaded into a plate 566 and locked therein by a set screw 568 screwed into plate 566 against threaded zone 558b to prevent rod rotation. Plate 566 is pressed against the vertical coplanar surfaces in Fig. 29 of bridging bar AF82 and block AF83 by a cover plate 570 in Figs. 18, 21 and 29 secured by screws at its upper end to plate AF78 and having an inturned integral lip 570a at its lower edge slidably engaging a groove 566a in plate 566. Hence, plate 566 is mounted so that it cannot turn around the axis of rod 558. A plurality of spacer blocks 564 in Figs. 18, 19 and 32 are telescoped over rod 558 by holes 564a therethrough surrounding the rod 558. Each block 564 has at least two opposite end edge surfaces 564b and 564c, each located a different distance from the axis of rod 558 and adapted so that either may, by swinging one or more blocks 564 around rod 558, form a portion of the active control pusher surface PMS with each surface being located at a different distance from the active conveyor member run 506M to form either the pusher position or retracted position at the right and left respectively in Fig. 18. A pusher control block 572 in Figs. 19 and 32 has a U-shaped slot 572a therein to permit detachable connection to rod 558 for removal or attachment thereto without removal of the spacer blocks 564 from rod 558. This pusher control block has a surface 572c adapted to form a portion of the active control surface PMS and generally forming a gap in this active control surface PMS to form a camming portion when the sheet unit U reaches the second position P2 for causing over-center swing of the follower arm 536 and movement of the pusher arm 528 from pushing to retracted positions. This gap formed by surface 572c determines the location of the second position P2 with unit U against stop 582 and is adapted to move the pusher arm 528 from the pushing to the retracted positions while a cover plate portion 572b of this block 572 covers this gap.

Lock means operatively connects rod 558 and blocks 564 and 572 for movement between an unlocked position to permit moving the spacer blocks 564 endwise along rod 558 or swinging either edge surface 564b or 564c of any spacer block 564 between an active pusher control surface forming position on the right in Fig. 18 formed by surface 564b or an inactive position on the left in Fig. 18 formed by surface 564c and for relocating the pusher control block 572 between the appropriate spacer blocks 564 and a locked position (shown in Fig. 18) for preventing relative swinging movement between the blocks 564 and 572 about rod 558 and preventing block movement along the length of the rod 558 or direction of travel of the active conveyor member run 506M. Each block has a hole 564d or 572d in Figs. 18, 19 and 32 therethrough extending parallel to rod 558 with a pin 574 firmly wedged in the hole 564d or 572d of each block and having a reduced diameter located half out of the hole adapted to telescope into the hole in an adjacent block. Lock nut 576 on threaded zone 558a is adapted to be screwed toward the left from the Fig. 18 position to provide sufficient clearance with left-hand plate 578 in Fig. 18 slidably mounted on rod 558 and bridging bar AF82 in Figs. 18 and 31 by clamp plate 579 secured by a screw to bridging bar AF82, so that the left-hand and right-hand ends of plates 566 and 578 respectively in Fig. 18 may be moved apart into an unlocked position. Then, control block 572 may be removed by means of its U-shaped slot 572a, some of the spacer blocks 564 may be moved axially along the rod 558 and swung around rod 558 from one position to the other to present either surface 564b or 564c lowermost, the control block 572 may be relocated a whole number of spacer blocks 564 and reinserted on rod 558, and then lock nut 576 may be screwed toward the right into the Fig. 18 or locking position shown therein to lock the blocks 564 and 572 together by pins 574. Hence, any major adjustment of the distance between the second position P2 and the first position P1 may be easily made in this manner. A ruler 580 is secured at its right end in Figs. 18, 29 and 30 to frame plate AF78 and bar AF82, and the pusher control block 572 has an arm 572e extending over the top of ruler 580 and adapted to coact with the indicia on the top face of the ruler 580 to indicate the distance between the first and second positions P1 and P2.

It should now be apparent that active control surface PMS in Figs. 18 and 31 includes surface 566b of plate 556, spacer block surfaces 564b, pusher control block surface 572c, spacer block surfaces 564c, surface 578a of plate 578, and surface 581a of plate 581 secured to plate 578.

If finer adjustment of the distance between the positions P1 and P2 is desired, adjustment knob type nut element 560 is rotated to move, by the threaded connection between element 560 and rod 558, the rod 558 and all of the blocks 564 and 572 endwise relative to frame plate AF56 to change the distance between the positions P1 and P2. Then, the whole control surface PMS moves endwise and the new position of pusher control block surface 572c will determine a new position P2. However, rotation of knob 572 does not move ruler 580 or stop 582, which stop 582 must be separately adjusted along bar AF82 by the structure shown in Fig. 33.

Stop 582 in Figs. 14, 18 and 33 includes an inverted U-shaped bracket 590 clamped over ruler 580 and crossbar AF82 by a clamp screw 592 to permit adjustment thereof along bar AF82 transverse to conveyor C. Stop 582 has a post 588 secured to bracket 590 and to a block 586 secured to its lower end, which block is secured to stop plate 584.

Each pusher arm 528 may be of either solid construction or formed of a coil spring, as shown. The coil spring construction is preferred for several reasons. First, the spring will normally give if the sheet units U form an obstruction as the arm moves from the approach to the active runs 506N and 506M respectively and as the arm pushes the sheet units U against plate 584 of stop 582.

Second, as the pusher arm 528 swings around the junction between the return run 506R and the approach run 506N, interference may occur if spring pusher arms 528 are not used. If the arm is still in the retracted position (shown at the left in Fig. 18) the pusher arm 528 will have its distal end extending outwardly a considerable distance, and may hit the side guide wall 344 or guard plate AF100 in Figs. 14 and 20 and cause damage if the pusher arm is not of flexible construction. This problem can also be eliminated by raising the return control surface PRS in Fig. 13 to a higher point on the return control frame member AF96 so that the pusher arm 528 will normally be swung to its vertically downward and pusher position before it starts to round the junction corner between the return and approach runs 506R and 506N.

The second transfer means T2 of sub-assembly A2 includes the two retractible shutters 442 and 442' and their unit support element portions 442a and 442a' and means for moving these support portions relative to the machine center line of sheet unit travel and to the side guide walls 346 and 346' between a unit supporting position (Figs. 14 and 21) and a unit transferring position (Fig. 33) for transferring in Fig. 18 by gravity a sheet unit U from the second position P2 and the second transfer zone Z2 into receptacle compartment R2 at receptacle station CRS by a mechanism shown in Figs. 13, 14, 15, 18, 21, 22, 23 and 24. This movement is caused by driven shaft 488 in Figs. 13, 14 and 15 driving cam 600 keyed thereto for vertically reciprocating bar 603. Bar 603 is loosely mounted for vertical movement at its upper end in Figs. 14, 15 and 24 in a rectangular cross sectioned passageway formed by post AF34, bar AF42, bar AF66, and a guide bar 608 secured to bar AF42. The lower end of bar 603 is pivotally connected to lever arm 605 at pivot 605a and the other end of arm 605 is secured by pivot 605b to the shaft rotatably supporting sprocket 487 on plate member AF30 with the looseness in the upper end mounting permitting the small lateral bar movement caused by lever arm 605. Lever arm 605 has a roller follower 607 rotatably mounted thereto and bearing against the periphery of the cam 600. The upper end of bar 603 bears against the distal end of an arm 611 in Figs. 13, 14 and 24 secured to a shaft 612 mounted for oscillation in frame brackets AF68 and AF70. Shaft 612 has two arms 614 and 614' spaced along its length and keyed thereto with their distal ends connected by a rod 616 adapted to engage in Figs. 22–24 against protruding roller followers 620 and 620' on the distal ends of cranks 618 and 618' with these cranks keyed at their opposite ends to shafts 622 and 622' respectively rotatably mounted at their outer ends in guide blocks 352 and 352'. Shafts 622 and 622' have gear segments 624 and 624' keyed to the opposite end thereof with these segments meshing with racks 626 and 626' secured to retractable shutters 442 and 442' having unit support element portions 442a and 442a' with said shutters supported by and adapted to slide within side wall slots 346a and 346a'. Brackets 444 and 444' rotatably support the inner ends of shafts 622 and 622' and have in Figs. 13, 14 and 21 outwardly extending arms 444b and 444b' slidably engaged on four sides by shutters 442 and 442', bearing caps 628 and 628', and racks 626 and 626'. Screws secure bearing caps 628 and 628' and racks 626 and 626' to shutters 442 and 442' respectively.

The whole linkage is always biased into contacting position by suitable springs. Tension spring 609 in Figs. 13 and 14, secured at opposite upper and lower respective ends to bar AF66 and bar 603, biases follower 607 against cam 600. Torsion spring 630 in Figs. 14 and 15 is telescoped over shaft 612, has its opposite ends secured to bracket AF68 and to a collar 632 keyed to shaft 612, and biases shaft 612 clockwise in Fig. 22 to push arm 611 down against bar 603. Torsion springs 634 and 634' respectively in Figs. 13 and 14 are telescoped over shafts 622 and 622', have their opposite ends secured to blocks 352 and 352' and to collars 636 and 636' keyed to shafts 622 and 622', and bias shafts 622 and 622' in Fig. 24 counterclockwise and clockwise respectively to push roller followers 620 and 620' against actuating rod 616.

It should now be apparent that as the rise on cam 600 moves reciprocating bar 603 downwardly, the retractable unit support element portions 442a and 442a' move from the released position to the supporting position, the latter being shown in Fig. 14. Spring 609 returns element portions 442 and 442' from the supporting position to the released position.

Four guides, 640, 640, 640' and 640' in Figs. 13, 14 and 21 are designed to press the folded sheets down into the receptacle compartments to prevent snagging of sheets on any of the sub-assembly components as the receptacle R is moved along the receptacle conveyor C. Each guide 640 or 640' has a press down rail portion 642 or 642' and a supporting portion having an arm 644 or 644' pivotally secured by a clamp screw to a bracket 646 or 646' adjustably clamped to rod 448 or 448' by clamp screws to permit suitable adjustment. These guides 640 and 640' may be two or six in number instead of the four illustrated and may be located on both sides of or wholly on one side of supports 450 or 450'.

The sheet units U may also be dropped from position P1 by sub-assembly A1 at a loading station LS1 into receptacle compartment R1 by another setup of the machine. Then, the sheet units U are kicked out from gathering conveyor G by ejector arm 362 to be received upon the guide type support member PG of positioning means P at a single position P1 in the second transfer zone Z2 and to be stopped thereat by the brake and fold closing means PB in alignment with receptacle compartment R1 at rest at a receptacle station CRS. The sheet units U are dropped, by actuation of said guide type support member PG, from this position P1 into receptacle compartment R1. Hence, positioning means P receives the sheet units from transfer means T1 and positions them in the second transfer zone Z2 at a loading station LS1 against stop 582 and in vertical alignment with the proper receptacle compartment R1 at a receptacle station CRS for individual transfer by the second transfer means T2 into this proper receptacle compartment R1.

The structure in Fig. 18 may be easily altered to provide this method of operation. First, both fixed units supporting element portion 440 and 440' are disconnected from the respective supporting rods 448 and 448' in Figs. 13, 14 and 21 by loosening screws 452 and 452' and removing supports 450 and 450' from rods 448 and 448' with portions 440 and 440'. Then, the sheet units U ejected by the ejector arm 362 will be received directly upon the retractable unit support element portions 442a and 442a' instead of the fixed portions 440 and 440'. Second, stop 582 is moved from the solid line to the dotdash line position in Fig. 18 by loosening clamp screw 592 in Fig. 33, sliding bracket 590 along bar AF82 to the new position, and then tightening clamp screw 592 against bar AF82 to lock the stop 582. Then, stop 582 stops the leftward travel in Fig. 18 of the sheet units U caused by the transfer and pushing action by the ejector arm 362. Brake spring arms 462 and 462' now coact with these retractable support portions 442a and 442a' instead of the fixed portions 440 and 440' to provide the braking and fold closing action mentioned heretofore. Fourth, since the positioning conveyor PC and the pusher arms 528 are not needed because the sheet units U are transferred to the first position P1 by the ejector arm 362 and dropped therefrom directly into the receptacle compartment R1, the drive to the conveyor member 506 may be disconnected for idling the positioning conveyor PC while all of the rest of the machine components continue to operate. This disconnection of the drive may be done in either of two manners. First, a block 650 in Figs. 13, 18 and 22 has a U-shaped groove 650a therein so it can be easily slid horizontally outwardly from between gear 496 and frame post AF62 so as to lower the drive gear 496 for sprocket 500 to disconnect the drive. Gear 496 is keyed to shaft 494 to drive therewith but is axially slidable relative thereto so that drive gear 496 may be moved out of mesh with driven gear 498 after block 650 is removed. Also, block 650 has a downwardly directed retaining flange 650b at the base of the U-shape and flanges 650c, at the distal end of the U-arms straddling post AF62 to retain block 650 in the Fig. 22 position. Second, bevel gear 490 in Fig. 15 may have a set screw 490a thereon securing it to shaft 488 so as to permit loosening of the set screw and moving of the bevel gear 490 to the left along shaft 488 to disengage the bevel gears 490 and 492 to stop the driving of the conveyor member 506 when gears 496 and 498 remain in meshing engagement in driving position. The set screw also serves as the weak link in the driving mechanism to permit slippage if a jam occurs.

Now it should be readily apparent that positioning means P and second transfer means T2 may be set up in either of two different ways for dropping sheet units U from position P1 at a receptacle loading station LS1 into corresponding receptacle compartments R1 in all receptacles R, as shown by sub-assembly A1 in Fig. 1, or from position P2 at a loading station LS2 into corresponding receptacle compartments R2 in all receptacles R, as shown by sub-assembly A2 in Fig. 1. In each setup, positioning means P receives the sheet units U from transfer means T1 and positions them in second transfer zone Z2. After a brake and fold closing action at position P1 by brake and fold closing means PB, the sheet units U are positioned at a loading station LS1 or LS2 in alingment with the proper receptacle compartment R1 or R2 at a receptacle station CRS for individual transfer by the second transfer means T2 into the proper receptacle compartment R1 or R2. The timing between the movements of the retractable portions 442a and 442a', ejector arm 362 and pusher arms 518 is such that the machine will perform satisfactorily in either setup. When a first sheet unit U is being dropped in the second position P2, a second sheet unit U will be supported on fixed portions 440 and 440' at position P1 in the manner shown in Fig. 18. However, when the sheet units U are being dropped at position P1, this second unit U will be dropped into the receptacle compartment at position P1 instead of being supported by the fixed portions 440 and 440'.

*Sheet jam detection*

It is desirable that the whole machine in Fig. 1 be stopped whenever a sheet S or sheet unit U causes a jammed condition, and suitable mechanism has been provided for this purpose. The use of this mechanism is desirable not only to protect the material being handled, namely, the sheets and sheet units, but also the different component parts of the machine itself, which otherwise might be damaged when a jam condition occurs. Also, since it is desirable to have a full receptacle R emerging from the right-hand end of receptacle conveyor C in Fig. 1, any jamming condition will cause one compartment, or more than one compartment, in one or more receptacles R, to have an insufficient number of sheets therein. Since the customer expects the receptacle R to have the designated number of sheets or greeting cards therein, the smaller contents of some of the receptacles would hurt the vendor's goodwill. Although it may not appear difficult by considering only these drawings to visually detect when a jam occurs, it should be noted that the machine is nearly completely automatic so that very few people are required to operate it and a jam can easily go undetected. Also, since the machine is about 130 feet long, as illustrated in Fig. 1, along the horizontal length thereof, and since the sub-assemblies A1, etc. are arranged parallel and fairly close together with the sheet movements in each taking place in a fairly small zone, much of which is covered with the machine frame and other members, it may be very difficult to detect a jam visually until after serious damage has occurred. Therefore, each sub-assembly has a plurality of sheet unit jam detector means with each movable to a jam detecting position in response to the presence of any jam. Also, means is provided responsive to the movement of any of these jam detecting means to a jam detecting position for stopping the drive motor M in Fig. 1 to stop the complete machine.

As the sheet units U are carried downwardly along run G2 of gathering conveyor G in Fig. 13, there is always the danger that a sheet S or S' or sheet unit U during a jam, such as shown in Fig. 20, will cause endwise pressure in the downward direction on the upper end of ejector arm 362 to cause a jamming condition. Hence, a first sheet unit jam detector means J1 in Figs. 2, 13, 15, 16 and 17 is provided with this means being movable to a jam detecting position in response to abnormal endwise pressure on the ejector arm 362 generally in the direction of travel of the gathering conveyor run G2. When this endwise pressure is exerted on the distal end of ejector arm 362, the lower arm portion 362a slides upwardly along the upper arm portion 362b. Electrical contact 424, protruding laterally from the lower end of upper arm portion 362b, is adapted to have contact strip 426 slide therealong to colse an electrical contact maintained normally open by spring 419 biasing the upper arm portion 362b to the position shown in Fig. 16. When lower arm portion 362a moves upwardly relative to the upper arm portion 362b to a jam detecting position, these switch contacts 424 and 426 close in Figs. 2 and 16, and they form an energizing circuit from the ground in Fig. 2 through line 652, transformer 654 energized by power lines L4 and L5, line 656, safety trip relay coil 70, line 658, line 660, closed contacts 426 and 424, and line 662, to return through the ground. Energization of relay coil 70 opens the normally closed safety trip relay contacts 70–1, which are in series with the stop buttons 54 in the aforementioned second circuit, and will cause the same result as pressing a stop button. Hence, opening contacts 70–1 break the aforementioned second circuit in the motor control description to deenergize coil 76; open motor power contacts 76–1, 76–2 and 76–3 and energize motor brake 88 to stop motor M quickly.

If a sheet S or a sheet unit U remains in the gathering conveyor G after run G2 has passed downwardly past transfer zone Z1, a second sheet unit jam detector means J2 in Figs. 2, 13, 27 and 28 detects this type of jam by being movable to a jam detecting position. As ejector arm 362 is swung in Fig. 13 to its extreme counterclockwise position, it may have a tendency to jam any sheets S trapped to the left thereof against the endless conveyor member 320 as the arm moves to the beginning of its transfer stroke at its extreme left-hand position in Fig. 13. Then, these jammed sheets will be carried downwardly by the gathering conveyor G past the first transfer zone Z1 and cause other serious jam-ups and possible machine part breakage. A jam detector means J2 in Figs. 13, 27 and 28 is secured to the sub-assembly frame below the gathering conveyor drive sprocket 322 with its jam detecting portion extending between gathering conveyor arms 332 and 334 of each set on the center line of the gathering conveyor travel, as shown in Fig. 27. This means J2 has long flexible contact fingers 668 and 670 held in spaced apart and insulated relationship by insulator block 672 and secured by screws to base 674 detachably secured in the T-way of base 323 for adjustable movement in and out to properly locate the distal ends of fingers 668 and 670 relative to conveyor member 320. Fingers 668 and 670 are shown herein as secured to base 674 in place of the litter strip in Fig. 34a of the aforementioned copending application entitled "Collating Machine" but it should be apparent that both the fingers and the strip could both be mounted simultaneously on this common base 674. Hence, the upper or distal ends of the fingers 668 and 670 serve as jam detecting portions, and are capable of relative approach and separation movement but are normally maintained in the separated position shown in Fig. 28 until a jam occurs. Any sheets S jammed back against conveyor member 320 will, as they travel clockwise about the driving sprocket 322 in Fig. 28 from run G2 to run G1, push the distal end of contact finger 668 against finger 670 to close these contacts to form a similar energizing circuit in Fig. 2 from line 660 to the ground for energizing safety trip relay coil 70 to stop the motor M in the same manner as the closing of contacts 424 and 426 on the ejector arm 362 previously described.

As the sheet units U are moved downwardly along gathering conveyor run G2, any abnormal protrusion of the sheets toward the right in Fig. 13 or left in Fig. 18, as they approach the first transfer zone Z1, may cause a jam-up of the sheets S between the conveyor arms 332 on gathering conveyor G and parts of the second mechanism M2, such as frame plate AF78, and also may interfere with proper transfer by the first sheet unit transfer means T1. Fig. 13 shows the true clearance at the end of these arms while the machine parts have been separated horizontally an exaggerated amount in Fig. 18 to more clearly show the component parts. Any jam may also cause a force tending to bend gathering conveyor arms 332 by a sheet S or sheet units U involved in the jam. Sometimes one or more sheets S of a unit will extend out far enough beyond the arms 332 so that as it goes by the frame plate AF78 the distal end of the sheet or sheets will be bent around the gathering conveyor arms 332. Therefore, a third sheet unit jam detector means J3 in Figs. 2, 13, 14, 15, 18, 21, 29 and 30 is provided to be movable to a jam detecting position in response to abnormal protrusion of the sheet units U from the gathering conveyor run G2 approaching the first transfer zone Z1. This takes the form of an insulator block 676 and strip contact 678 secured to the top of machine frame plate AF78 in Figs. 13, 14, 18, 21, and 29. Contact 678 has an end portion 678a having flexibility so that its distal end will serve as a contact to ground against the machine frame by striking as a contact cover plate 570, active control member plate 566, and/or block AF83 in Figs. 18, 21, 29 and 30. Closing these contacts will energize the safety trip relay coil 70 of Fig. 2 in the same manner to stop the motor M.

A fourth sheet unit jam detector means J4 in Figs. 2, 13, 14, 15, 18, 21, 29 and 30 is also provided to respond to a jam occurring by sheet units pushed by pusher arms 528 traveling between positions P1 and P2 in Fig. 18. It includes a loose connection between the nut element 560 and collar 562 of the active control member PM and the frame plate AF56 to provide a limited horizontal pivotal connection thereat to the left of and remote from positions P1 and P2 in Fig. 18 to permit limited swinging movement of the active control member PM about this pivot toward and away from the conveyor member 506. Normally, this control member PM rests against the stop provided by cover plate lip 570a in groove 566a, as shown in Fig. 21, but this pivotal connection permits upward movement of control member PM away from this stop since slot 566a is wider (has a larger vertical dimension in Fig. 21) than lip 570a. This sheet unit jam detector means includes means movable to a jam detecting position in response to the lifting of the active control member PM about this loose or pivotal connection. If a jam occurs as a sheet unit U is being pushed toward the left in Fig. 18 by a pusher arm 528 between positions P1 and P2, the sheet unit U will exert an abnormal pressure against the pusher arm 528 tending to swing it counterclockwise so as to swing the follower arm 536 clockwise and thus exert an abnormally high lifting pressure on the active control member PM to move it about its pivotal connection on its left end in Fig. 18 because the pusher arm 528 and follower arm 536 will then be located intermediate their pushing and retracted positions and this force attempts to push the follower arm 536 through the over-center position. Lifting of the right end of the control member PM in Fig. 18 by a small counterclockwise arcuate swing about its loose left end causes normally open contacts 678b and 566c in Figs. 2, 18, and 30 to close so as to close the energizing circuit in Fig. 2 of the safety trip relay coil 70 and to thus stop the driving motor M. Contact 678b is the left end of contact strip 678 and grounds against projection 566c extending upwardly from active control member plate 566. It should be noted that contact 678b is part of the same switch as contact 678a used for the third sheet unit jam detector J3. Any abnormal force exerted by a sheet unit U being pushed will tend to move the pusher arm 528 and follower arm 536 from pushing to retracted positions. This type of jamming can also be caused by pushing the sheets units U against the stop 582 if the machine is improperly set up.

A fifth sheet unit jam detector means J5 in Figs. 2, 13, 14, 15, 18, 21, 29 and 30 is provided to operate in response to movement of the approach control member PN. It includes a loose horizontal pivot type connection, provided by the looseness of screw 547 in the hole in strap 546 and by spring 549, between the right-hand end of the approach control member PN in Fig. 21 and the frame guard bar AF96 on its end opposite the active run 506M. It also includes means movable to a jam detecting position in response to lifting of the approach control member PN about this pivotal connection at screw 547 by the follower arm 536 of the pusher 512, as shown by the dotted line position in Fig. 21. This lifting action may be caused by any of several different jam actions. Return spring 542 in Fig. 21 must return the follower and pusher arms 536 and 528 from the retracted position at the left in Fig. 18 to the pushing position at the right in Fig. 18 as these arms travel along the left-hand end of their path in Fig. 13 and right-hand end of their path in Fig. 21. If the spring 542 incompletely returns the pusher arm 528 or improperly positions it out of the pushing position, the follower arm 536 will not have swung completely over center and will, as it approaches the left end of member PN, exert a swing type lifting action on the approach control member PN about the pivot provided by screw 547 in a clockwise direction in Fig. 21. Second, if the transfer means T1 has not pushed a sheet unit fully out to the first position P1 in Fig. 18, the pusher arm 528 cannot get out behind the sheet unit U to push it from the first to the second positions P1 and P2. Then, as the pusher arm 528 travels in the zone of the approach run 506N approaching this first position P1, it will strike the right-hand side of the sheet unit U and buckle it, as shown in dot-dash lines in Fig. 21, instead of engaging the right-hand end thereof in Fig. 18, to cause abnormal pressure against the pusher arm 528 tending to rotate it counterclockwise in Fig. 21 and thus cause the follower arm 536 to lift the approach control member PN about the pivot provided by screw 547. This lifting action of the approach control member PN causes closing of the same switch used for the third and fourth jam detector means so as to energize the safety trip relay coil 70 in Fig. 2 and to stop the motor M in the same manner as previously described. Hence, a common switch is used for the third, fourth and fifth jam detector means. In the jam detector means J5, strap 546, bracket 548 and guide pin 543 are pushed upwardly against the downward bias of spring 551 so that the upper end of pin 543 hits strip contact 680 secured to strip contact 678. Pin 543 is telescopically mounted in aligned holes in frame plate AF78 and insulator block 676.

*Mode of operation*

As the receptacle R moves from left to right in Fig. 1, all operations are controlled and are performed in timed sequence by the common motor driven drive shaft MD. First, the empty receptacle R is fed toward the right by two endless friction belts 278 and 278', in the manner disclosed in the copending application entitled "Apparatus for Forming and Affixing a Divider in a Box and the Product Thereof," until it is stopped by the divider strip former and affixer D in timed sequence with the movement of the driving devices of receptacle conveyor C (note that Fig. 7 in the present application corresponds with the illustration of the drive mechanism in Fig. 26 of the last mentioned copending application). Then, the divider strip is first formed and then affixed to the center of the receptacle R in Fig. 1, here shown as in the shape of a cross, to divide the receptacle R into the four receptacle compartments R1–R4. After the completed receptacle R has been released from the means D, the friction belts 278 and 278' continue to move it toward the right in Fig. 1 until it is engaged by the driving devices 166a and 168a of receptacle conveyor C to move the completed receptacle R in step fashion from receptacle station CRS to station CRS.

Second, all sub-assemblies are synchronously driven by the common motor driven drive shaft MD. In each sub-assembly A1–A6, the first mechanism M1 works substantially the same. In each sub-assembly, each of the four sheet feeding means FS, such as in sub-assembly A2 in Fig. 11, feeds a single sheet S or S' by suction pick-up engagement on one outer face S5 or S5' of a sheet S or S' from the end of its supply pack Q onto a sheet unit supporting means GS of gathering conveyor G on the upwardly moving run G1 thereof so that as the sheet carrier or unit supporting means GS reaches the top of the run, a sheet unit U will be formed thereon from the four packs Q consisting of four single sheets S' or folded sheets S, or any combination thereof. As the sheet units U go over the top of the connecting run G3 of the gathering conveyor G, the sheets S or S' of the sheet unit U are compacted laterally and then are carried downwardly by gathering conveyor run G2 to the first transfer zone Z1. Then, the second mechanism M2 takes over the sheet unit handling. The ejector arm 362 of the first sheet unit transfer means T1 transfers the sheet units U individually from gathering conveyor G onto the first position P1 of a sheet unit positioning and fold closing means P wherein they are stopped and the open folds are closed by a brake and fold closing means PB. As the receptacles R are moved from conveyor receptacle station to conveyor receptacle station (herein shown as stations CRS) by conveyor driving devices 166a and 168a, each receptacle R momentarily pauses under its associated second mechanism M2 of each sub-assembly A1–A6. Then, the machine setup in Fig. 1 drops each sheet unit U from sub-assembly A1 into a receptacle compartment R1 at receptacle loading station LS1 below the first position P1 of the positioning means P and loads all of the receptacles R in the same corresponding compartment by sub-assembly A1.

As to sub-assembly A2, each sheet unit U received at the first position P1 is pushed by a pusher arm 528 from position P1 to a second position P2 and then drops at its loading station LS2 into receptacle compartment R2. In corresponding manner, the sub-assembly A3 drops each sheet unit U into receptacle compartment R3 from position P1 at receptacle loading station LS3 in the same manner as sub-assembly A1. Also, sub-assembly A4 deposits each sheet unit U in receptacle compartment R4 from its receptacle loading station LS4 in the same manner as sub-assembly A2. Although loading stations LS3 and LS4 respectively coincide transverse of conveyor C with loading stations LS1 and LS2 because of the compartment construction in receptacle R, it should be apparent that any of these loading stations may be horizontally displaced in Fig. 18 to a different position along active control member PM for other type receptacles. Sub-assemblies A5 and A6 are not used for loading compartments in receptacles R illustrated in Fig. 1 but may be used with other type receptacles. Each sub-assembly drops its sheet units U into corresponding compartments in all receptacles R but each sub-assembly drops its sheet unit U in a compartment different from that loaded by each of the other sub-assemblies in the setup illustrated in Fig. 1. The compartments are spaced along the length of the conveyor (compare compartments R1 and R3) and others are spaced across the width of the conveyor (compare compartments R3 and R2). Note that each loading station LS1, LS2, LS3, and LS4 is located at a different receptacle station CRS and that the timing of all sub-assemblies is such that the sheet units U are dropped from all of these loading stations simultaneously from all sub-assemblies into the preselected receptacle compartments. When only a four compartment receptacle R is used, as illustrated, two of the sub-assemblies may be used for dropping envelopes into the receptacles for the greeting cards S or S' deposited therein. However, the envelopes are preferably placed in the receptacle before the cards S or S' so that the cards will be on top for display purposes. Hence, the sub-assemblies A3–A6 preferably load the four compartment receptacle R with cards S or S' while sub-assemblies A1 and A2, as well as any other envelope loading means located between means D and sub-assembly A1, load the receptacle R with envelopes. Although each sub-assembly has been disclosed as assembling four different cards into a pack for deposit into a receptacle compartment, it should be apparent one or more sub-assemblies may assemble three cards and a pack of envelopes into a pack instead of four cards for similar deposit if banded packs of envelopes are substituted for cards in one supply pack Q.

Several advantages are obtained. First, suction pickup by feeding means FS in Fig. 11 from each supply pack Q is by engagement on the back outer face S5 or S5' of each single sheet S' or folded sheet S (or of a plurality of sheets prebanded, packaged or otherwise wrapped to form a single package) so that the suction pick-up will act properly and positively at all times even though the front outer face S4 or S4' of each sheet has a display design (such as indicia, ornamentation, an uneven surface or a die cut outline (interfering with proper suction pick-up).

Second, each sub-assembly inverts its sheet units U as they travel over the gathering conveyor G so that the front outer display design bearing face S4 or S4' of each sheet (not engaged by suction during the pick-up feeding) now faces upwardly on the positioning means P and remains facing upwardly after dropping into the receptacle R so as to be facing upwardly for display. Also, since each folded sheet S or single sheet S' has its folded edge S3 or equivalent edge S3' and has its display design on front face S4 or S4' located along the same edge and facing in the same direction respectively, each sheet unit U will have all of its sheet edges S3 or S3' correspondingly located and display designs facing in the same direction, and each receptacle R will have the edges S3 or S3' of all of the sheet units U correspondingly located (at the top edge of each receptacle compartment in Fig. 1) and will have all the display designs facing in the same direction (being bottomed along the left-hand edge of each receptacle compartment in Fig. 1) so that all of the greeting cards or sheets S or S' in every receptacle R coming off of the right end of the conveyor C will have their display designs facing in the same direction and all may be opened in the corresponding manner about their folded edges. It should be noted that the folded sheets in all of the packs Q have their folded edge S3 or corresponding edge S3' located on the lower edge of every supply pack Q and all of the sheet units U on the gathering conveyor G have their folded edges against the gathering conveyor member 320 as they travel to the first transfer zone T1.

Third, when folded sheets S are being handled, mechanisms M1 and M2 of each sub-assembly handle the sheets S and sheet units U so that (1) for any substantial force exerted against a sheet edge, at least a substantial component of it will be exerted against and perpendicular to the folded sheet edges S3 thereof, the strongest edge, to minimize sheet edge damage and to minimize sheet buckling, and (2) all supporting, inertia retarding and conveying forces are applied by the machine to the sheet unit U symmetrically to the center line path of sheet unit movement from the supply packs Q to the receptacle R. As to the first, note that the sheet feeding means FS feeds the sheets S fold first between rolls 360 in Fig. 11, that each sheet S driven by these rolls is stopped by fold-first engagement with gathering conveyor member 320 or stop bar 321 in Fig. 11, that the sheets of each unit U are compacted laterally by the inner guide surfaces MSG and MSG' of side guide walls 344 and 344' in Figs. 11 and 12 in gathering conveyor run G3 while a supporting force is applied to the sheet unit folded edges S3 by conveyor member 320, and that the ejector arm 362 and pusher arms 528 both propel the sheet units U by fold engagement. Also, all propelling forces exerted along the direction of movement and all supporting forces exerted on sheet unit edges are exerted on folded edges S3, the strongest sheet edges. Also, any force exerted against a cut edge, other than the folded edges S3, are approximately equally distributed over the whole cut edge. Note the action of guide inner surfaces MSG and MSG' of guide walls 344 and 344' on the cut edges during the travel of the sheet units U. As to the aforementioned (2), note that the fold closing rolls 360; gathering conveyor arms 332 and 334; stop bar 321; conveyor member 320; ejector arm 362; brake spring arms 462 and 462'; pusher arm 528; guide elements 440, 442a and 440', 442a'; and side guide members MS and MS' apply their forces symmetrically to the center line of travel of sheet units U.

*Universal machine features permitting setup for different size and type sheets and receptacles*

These universal machine features take several forms: (1) adjustment of side guide members MS and MS' for different sheet sizes of dimension X in Fig. 1, (2) adjustment of the loading stations LS1, LS2, LS3, etc. for sub-assemblies A1, A2, A3, etc. relative to each other longitudinally or along the length of the receptacle conveyor C, (3) adjustment of these loading stations LS1, LS2, LS3, etc. relative to each other transversely to the direction of travel of receptacle conveyor C, and (4) the relative adjustment of the loading stations, either longitudinally or transversely in the manner disclosed in the aforementioned (2) or (3), to adjust the machine sub-assemblies for the dimensions X and Y of the different size sheets handled and to select the particular receptacle compartment to be fed by each of the sub-assemblies.

First, the adjustment for each sub-assembly of the distance between the side guide inner surfaces MSG and MSG' of side guide members MS and MS' for different sheet size dimensions X will be first discussed. Both the first and second mechanisms M1 and M2 include side guide adjusting means for moving simultaneously the side guide surfaces MSG and MSG' toward or away from each other while keeping corresponding portions on the side guide surfaces equidistant from the center line of the sheet unit movement. As mentioned before, each guide member MS or MS' is formed of a guide wall 344 or 344' on first mechanism M1 and a guide wall 346 or 346' on second mechanism M2 secured together to move as a unit.

When cards or sheets of different sizes X are being collated, it is desirable to adjust the width between the guide faces by moving both side guide members MS and MS' simultaneously toward or away from each other during set-up of the machine to that the distance between guide surfaces MSG and MSG' is only slightly larger than unit or sheet dimension X for the unit to be handled by each sub-assembly. A rotatably mounted adjustment knob 682 in Fig. 12 can be used to manually turn shaft 684 (shown in Figs. 12 and 13 and journalled in frame plates AF18 and AF20), the bevel gears 686 and 688 secured respectively to shafts 684 and 690 for rotating shaft 690, rotatably mounted in frame crossbars AF24 and AF26 in Figs. 11 and 13 to drive simultaneously two coaxially spaced apart pinion gears 692, having faces bearing against crossbars AF24 and AF26, for simultaneously moving by each gear 692 two racks 694 reciprocably guided on frame bars AF24 and AF26 with each rack secured at its outer ends to horizontal bar 348 or 348' secured in turn to walls 344 and 344' for moving side guide walls 344 and 344' inwardly or outwardly as desired.

Another structure simultaneously moves side guide walls 346 and 346' in the same direction as and with walls 344 and 344'. Shaft 684 has a bevel gear 696, in Fig. 12 on the end opposite adjustment knob 682, meshing with bevel gear 698 secured to shaft 700 journalled in a bracket 704 secured to frame plate AF18 and in a strap 702, which strap is secured at its upper end to guide plate AF52. Gear 706, secured to the right end of shaft 700 in Fig. 13 meshes with a gear 708 on the left end of shaft 710 rotatably supported at opposite ends by strap 702 in Fig. 13 and by strap 712 in Figs. 13, 15, 22, 23, and 24, which strap 712 is secured at its upper end to frame bar AF66 by screw 714. The outer end of shaft 710 has a gear 716 secured thereto and meshing with gear 718 rotatably secured to strap 712. Pinion gear 728 is rotatably mounted on a sleeve secured with the gear 728 by screw 714 to bar AF66. Bar 722 is secured to racks 720 and 726, meshing respectively with gears 718 and 728, and is connected by connecting plate 724 to block 352' and guide wall 346'. Rack 730 is secured to block 352 and wall 346. In operation, as shaft 684 is rotated clockwise in Fig. 13 by knob 682, gear 692 in Fig. 12 rotates clockwise to move walls 344 and 344' apart and shaft 710 in Fig. 24 rotates counterclockwise to rotate gear 718 clockwise to move walls 346 and 346' apart. The pinion gear and rack sizes are chosen so that equal movements will be imparted to all four movable walls so that walls 344 and 346 will move together and walls 344' and 346' will move together with corresponding opposite portions on walls 344, 344', 346 and 346' always equidistant from the center line of sheet unit movement.

This side wall movement is harmonious with the operation of the machine. Inner faces MSG and MSG' of walls 344, 344', 346 and 346' will always be equidistant from arms 332 and 334 so that each sheet unit U will be approximately centrally supported during conveyance with no tendency to tilt off the arm; also, the arms do not have to be adjusted laterally during setup. Also, ejector arm 362; pusher arms 528; unit support portions 440, 440', 442a and 442a', and stop 582 each exert their forces on the sheet unit U symmetrically to the center line path of sheet unit movement in all positions of the side walls for all dimensions X. Side guide walls 346 and 346' have operatively secured thereto and carried therewith brake and fold closing spring arm 462 and 462', fixed unit, support element portions 440 and 440', shutters 442 and 442' with their retractable unit support element portions 442a and 442a', and the drive means therefor including the racks 626 and 626', gear segments 624 and 624', rock shafts 622 and 622', and cranks 618 and 618'. However, each part carried by guide members MS and MS' is fixed against relative movement along and with respect to the center line of sheet unit travel in at least its sheet unit supporting position for all given width dimensions X between these side guide walls 346 and 346'. Since the retractable unit support shutters 442 and 442' of the second transfer means T2 are reciprocated between unit supporting and retracted positions by actuating rod 616 in Figs. 22, 23 and 24 bearing against the roller followers 620 and 620' on the distal ends of the cranks 618 and 618', the timed interval of the shutter movement between these positions and the phase timing of this movement with respect to the other movements on the machine will remain the same for all adjustment distances X between the guide walls 346 and 346' because the roller followers 620 and 620' on the distal ends of the cranks 618 and 618' will merely move along the actuating rod 616 as the spacing between these side guide walls 346 and 346' is changed.

Also, stop plate 584 in Fig. 33 has horizontal slits 584a in opposite edges thereof adapted to receive retractable support portions 442a and 442a' when they are extended into the supporting position of Fig. 21 and guide walls 346 and 346' closely straddle stop plate 584.

The assembly A includes an adjusting means operatively connecting at least some of the loading stations LS1, LS2, LS3, etc. of the sub-assemblies A1, A2, A3, etc. and their associated receptacle stations CRS on the receptacle conveyor C together for relative movement of at least one loading station relative to the other longitudinally along the path of travel on the conveyor C for aligning each loading station with its proper longitudinally spaced receptacle compartment for depositing the sheet units U from each sub-assembly into corresponding compartments of all the receptacles R. Since the conveyor receptacle stations CRS are spaced equidistant along the conveyor C (as shown by the receptacles R in Fig. 1), since the driving strokes of the driving devices on conveyor C are constant and equal to the distance between these stations (disregarding the overlap between the driving strokes) and since the receptacles R are stationary at the conveyor receptacle stations CRS so that loading is more easily achieved, the present invention independently adjusts each loading station LS1, etc. along the length of the conveyor C by moving the whole sub-assembly A1, A2, etc. for the associated loading station along the conveyor until the loading station is properly located. Here, the machine frame of each sub-assembly, heretofore designated by reference numerals with an AF prefix, is supported for movement relative to the floor at opposite ends and at an intermediate point and is supported for movement relative to the conveyor C by bearing against opposite side rails thereof. The rear end support is shown in Figs. 1, 25, and 26 as a gear 736 keyed to a shaft 738 rotatably mounted in connecting frame members AF104 and AF105 secured to the components of frame post AF2. A floor plate structure 740, secured to the floor against relative movement, has a rack 742 secured thereto with which gear 736 meshes to carry a portion of the end weight of the sub-assembly with connecting member AF105 resting on the top of the floor plate structure to provide stability and to prevent rocking around shaft 738. The front end support is shown in Figs. 1, 13 and 15 as straps 746, 746 secured at opposite ends of horizontal frame bar AF38 and having rollers 748, 748 rotatably mounted on their distal ends resting in rolling contact on floor plate structure 750, secured to the floor against relative movement. The intermediate support is shown in Figs. 1, 13, 27 and 28 as shaft 738, rotatably supported in frame plate AF12, having a gear 752 keyed thereto coacting with rack 756 secured to floor plate structure 754, secured to the floor against relative movement, while frame plate AF12 and crossbar AF22 rest on top of floor plate structure 754 for sliding movement. Conveyor side rails CF2 and CF4 are straddled in sliding relationship in Figs. 13, 14, 18, 22 and 23 by frame plate AF58 bearing against the outer surface of outer side rail CF2 and by guide plate AF52 bearing against the outer and top surface of inner edge receptacle guide 162.

Means is provided for moving the whole sub-assembly along conveyor C over floor plate structures 740, 750 and 754. In Figs. 27 and 28, hand wheel 758, keyed to shaft 760 rotatably mounted in frame plates AF18 and AF20, may be rotated to drive a gear train through worm gear 762 keyed to shaft 760, the worm wheel 766 and gear 769 keyed to shaft 768 rotatably mounted in frame block AF10, gear 770 meshing with gear 769 and keyed to shaft 771 rotatably mounted in frame plate AF12, gear 752 meshing with gear 770, shaft 738, gear 736, and racks 742 and 756. Hence, as hand wheel 758 is rotated, the whole sub-assembly will move in one direction or the other along the length of the receptacle conveyor C until the transversely extending center line of its loading station LS is aligned vertically with the transverse center line of the selected receptacle compartment at a conveyor receptacle station CRS. Rotation of the hand wheel 758 causes simultaneous rotation of gears 736 and 752 to move the sub-assembly over the stationary racks 742 and 756 as the connecting member AF105 slides over floor plate structure 740, as frame plate AF12 and crossbar AF22 slide over floor plate structure 754, as rollers 748 roll over floor plate structure 750, and as frame plate AF58 and guide plate AF52 slide on the outer surfaces of conveyor side rail CF2 and guide 162. This structure will simultaneously move all parts of the sub-assembly along the conveyor and always keeps the center line of the sheet unit path of travel in a plane extending perpendicular to the path of travel of conveyor C. Hence, the receptacle R will always stop at the same point, namely, the conveyor receptacle station CRS and the sub-assembly can be adjusted along the length of the conveyor C with respect to this station so as to drop its sheet unit U in the appropriate location in the receptacle R. This adjustment of the sub-assemblies along the length of the receptacle conveyor allows for: (1) conversion of the machine from loading receptacles of one dimension along the length of the conveyor to receptacles of another dimension, (2) conversion of the machine from sheet units having one dimension X along the length of the conveyor to those having another dimension X, whether the change be from sheet units of one dimension for all of the sub-assemblies to sheet units of another dimension for all of the sub-assemblies or for a variation in dimension X for sheet units of only some of the sub-assemblies while the others have the sheet unit dimension X remaining the same, such as in a receptacle containing sheets of different dimension X instead of having all dimensions X equal, as shown in Fig. 1, (3) to place the sheet units U from a particular sub-assembly into a different longitudinally arranged receptacle compartment (sub-assembly A1 drops its sheet units U into receptacle compartment R1 but longitudinal adjustment of sub-assembly A1 would permit it to drop its sheet units U in receptacle compartment R3), and (4) to allow for a different number of longitudinally spaced compartments in the receptacles of one machine run in comparison with the receptacles of another machine run (for example, longitudinally aligned receptacle compartments R1 and R3 are shown as two in number in Fig. 1 but may instead take the form of one single long receptacle compartment or a plurality of three or more receptacle compartments arranged along the length of the receptacle conveyor C. Each compartment construction change of this type would require readjustment of the sub-assembly A1 along the length of the conveyor C).

If one attempts to keep the sub-assemblies A1, A2, etc. spaced the same distance apart and fixed with respect to the floor and the receptacle conveyor C and if one tries to adjust the component parts of receptacle conveyor C instead of the sub-assemblies, complex problems result. First, if receptacle driving devices 166a and 168a are moved longitudinally along the length of the frame of receptacle conveyor C so as to displace all of the conveyor receptacle stations CRS a uniform distance along the length of the conveyor C, this type adjustment will not solve the problem. Although it may compensate for different receptacle lengths along the path of travel on the conveyor C, it will not permit a particular sub-assembly to drop its sheet units U into a different longitudinally displaced receptacle compartment than it had in previous machine runs, it will not permit adjustment for different sheet unit dimensions X along the length of the conveyor C, it will not permit use of receptacles of different compartment sizes, designs and arrangements, etc. Second, if one attempts to adjust the individual driving devices 166a and 168a relative to their feed member tubes 166b and 168b, more complications will arise. Many, if not all, of the driving devices would have to be adjusted. The adjustment of each must be such that the driving strokes of each will overlap slightly so as to pass the receptacles from the driving device on one feed member to the driving device on another in step fashion along the length of the receptacle conveyor C. Also, any such adjustment must permit the conveyor to handle receptacles having a large variation in length along the receptacle conveyor from the shortest to longest receptacle. Also, the receptacles would have to be delivered simultaneously and at the proper time to the stations CRS for loading and transfer from one driving device to another. Since some driving devices would have to move the receptacles a long distance while others would be only permitted to move the receptacle a short distance, a great many more driving devices 166a and 168a would probably have to be added to the feed members 166 and 168 for a given maximum receptacle dimension along the length of the receptacle conveyor C. Also, there is always the danger that the receptacle movement by the driving devices may occur slightly out of phase with the loading action of the second transfer means T2 at each sub-assembly since the beginning and end of the receptacle driving strokes may not be the same throughout the length of the conveyor for all machine conveyor adjustments, and sheet unit loading may begin before the end of the driving stroke of the conveyor in Fig. 1. Hence, movement of the sub-assemblies A1, A2, A3 longitudinally along the length of the receptacle conveyor C is easier than readjusting the component parts of the receptacle conveyor C and assures that the machine will be truly universal and handle all the different setup problems encountered.

Adjusting means operatively connects the loading stations LS1, LS2, LS3, etc., of sub-assemblies A1, A2, A3, etc. and the associated conveyor receptacle stations CRS on the receptacle conveyor C together for relative movement of the loading stations with respect to each other and to the receptacle stations in a direction generally transverse to the receptacle path of movement for aligning each loading station with its proper transversely spaced receptacle compartment at its associated receptacle station CRS. Each sub-assembly A1, A2, etc. can be easily changed in setup and is convertable so that it may drop the sheet units U into a receptacle compartment from a position P1 or position P2 in Fig. 18 with these two positions being merely illustrative of two different type sheet unit drops but with each of these positions adapted to be varied along the horizontal path in Fig. 18. To drop the sheet units U for receptacle loading at position P1, the fixed unit support element portion 440 and 440' in Figs. 14, 18 and 21 are removed, the drive to conveyor member 506 is disconnected, and stop 582 is secured to the bridging bar AF82 at the dotted line position in Fig. 18. Then, the sheet units U will drop at the first position P1, as shown by the loading station LS1 for the sub-assembly A1 in Figs. 1 and 18. To drop the sheet units U at the position P2 in Fig. 18, the conveyor member 506 is driven to move the pusher arms 528 to convey the sheet units U from position P1 to position P2; fixed unit support element portions 440 and 440' are secured in position, as shown in Figs. 14, 18 and 21; and the stop 582 is secured to the bridging bar AF82 in the solid line position shown in Fig. 18. Then, the sheet units U will be dropped at position P2, as shown by the loading station LS2 in Figs. 1 and 18 for sub-assembly A2. Of course, it should be clearly apparent that the distance between positions P1 and P2 may be easily changed by readjusting the stop 582 along the horizontal bridging bar AF82 of the machine frame to which it is clamped in Fig. 18, by providing fixed unit support element portions 440 and 440' of longer or shorter horizontal length, and by adjusting the spacer blocks 564 and pusher control block 572 along rod 558 to change the location along the horizontal at which the follower arm 536 swings over center and the pusher arm 528 swings from the pushing position to the retracted position. Hence, each sub-assembly may be set up to drop the sheet units U at position P1 into the first receptacle compartment or at any chosen position P2 into a second, third, etc., laterally spaced compartment toward the left of receptacle compartment R1 or R3 in Fig. 18. The reference point for the determination of each of these receptacle loading positions is the inner receptacle edge guide 162 fixed to the conveyor side rail CF4. Adjustment of positions P1 and P2 may be required to adjust for different sheet dimensions Y, to adjust for the number of transversely arranged compartments (such as two, three, etc.) in the receptacle, and to select the compartment into which the sheet units U are to be dropped.

The factors limiting the size of the sheet units U, which can be handled by this machine, will be briefly discussed at this point. The sheet units U are loaded by all sub-assemblies A1, A2, A3, etc. simultaneously at all loading stations LS1, LS2, LS3, etc., when the receptacles R are stationary at the associated receptacle stations CRS. Hence, all retractable unit support element portion 442a and 442a' must be moved from unit supporting to retracted positions simultaneously. Therefore, each sheet unit U must be against its stop 582 and on its retractable support portions 442a and 442a' ready to drop at the same time. Also, each sub-assembly must remove one sheet from a pack Q to form a sheet unit as it deposits another sheet unit into a receptacle so that all machine components must move at the same frequency. This may present problems in the phase relationship between all or some of the components of the different sub-assemblies.

The sheet unit size capacity of the machine may be changed in several ways. First, assume that the gathering conveyor G and the first transfer means T1 operate synchronously and in phase in all sub-assemblies A1, A2, etc. Since the action of transfer means T1 is substantially independent of the sheet unit dimensions X and Y, each sheet unit U will be transferred to position P1 substantially simultaneously. However, since the pusher arm 528 cannot move past the inner guide surface of guide walls 344 and 346 in Figs. 14 and 21 until after the sheet unit U has traveled past, and then the pusher arm 528 must move out and behind the sheet unit U so as to be in position to push it from the position P1 to the position P2, the dimension X of the sheet units U falling into the receptacle compartment R2 or R4 in the second position P2 is critical because it determines the lag or lead of the pusher arm 528. Also, the pusher arm 528 must push the right-hand edge of the sheet unit U in Fig. 18 out to a position P2 slightly beyond the edge of the divider for the receptacle R separating compartments R3 and R2 so that the sheet unit U will be properly positioned for dropping into compartment R2. Hence, the capacity of the machine in this setup is a function of dimension Y for unit U in receptacle compartment R3 plus half the dimension X for the unit U in receptacle compartment R2. Although the problem is not too serious with the four compartment receptacle R shown in Fig. 1, the extreme capacity of the machine may be required when receptacle compartments R2 and R4 are combined into one to make a three-compartment receptacle with this combined receptacle compartment receiving sheet units U having an extremely large dimension X and an extremely short dimension Y for the so-called slim type greeting cards. Maximum machine capacity can be achieved by rephasing the pusher arms 528 with respect to the rest of the components of a particular sub-assembly and with respect to pusher arms 528 in other sub-assemblies; or by changing the meshing relationship between gears 490 and 492, for example, so that a pusher arm 528 is in alignment with the inner edge of side wall 344 or 346 as a sheet unit U arrives at position P1 after transfer by the first transfer means T1. Second, the machine may be changed in capacity by rephasing one or more complete sub-assemblies. Any particular sub-assembly may be rephased in this manner by reengagement of its clutch 41 at a new phase relationship with the drive shaft MD. Then, all of the sub-assembly will be out of phase with all of the other sub-assemblies; however, the retractable unit support element portions 442a and 442a' thereof must be rephased so that they will operate simultaneously with the corresponding portions of all of the other sub-assemblies. Third, instead of rephasing the complete sub-assembly, only certain moving components thereof may be rephased. This may be easily done by disengaging gear teeth in any particular drive and reengaging them at a new location, by tightening a cam in a new angular location on its driving shaft; by changing a cam shape; by loosening the set screw 490a and tightening it at a new location on the shaft 488; by changing the gear ratio for driving a particular component, such as the conveyor member 506, and/or by changing the number of parts on a particular component, such as changing the number of pusher units 512 and pusher arms 528 on the conveyor member 506.

It should now be obvious that the machine in different setups: (1) may handle receptacles R of many different sizes and shapes with different numbers of receptacle compartments, (2) may handle sheets S or S' of different dimensions X and Y with the sheets in some or all receptacle compartments being of the same dimensions or with sheets of some or all of the different compartments being of different dimensions, (3) may have the phase relationship between moving component parts altered, and/or (4) may have adjustably movable component parts, such as side guide members MS and MS' and such as carriers 120 and 121, located in any one of many different positions. Instead of having all the component parts in all drawing figures in a single phase position of a machine cycle for a single machine setup, it has been chosen to show some of the drawing figures in different phase positions of the operation cycle, to show in at least some of the drawing figures the machine in different setups, and to show at least some of the component parts in different phase positions even in the same drawing figure. Hence, the drawings show the versatility of the machine and each component part in its best viewed position even though the component moving parts in some views may never assume the illustrated relative position between the parts.

One typical operative machine setup and relative position between component parts is given hereinafter, and it illustrates the versatility of the machine over the Fig. 1 setup. This setup is satisfactory for a four compartment receptacle having its compartments arranged in pairs like compartments R1–R4 in Fig. 1, having a longer dimension X and narrower dimension Y for each receptacle than those illustrated in Fig. 1, but having dimensions Y smaller for compartments R2 and R4 than for compartments R1 and R3. Then, as the shutters 442 and 442' are in their outward and fully released position of Fig. 33 to drop sheet unit U from position P2 at loading station LS2 into compartment R2, the remainder of the moving component parts may simultaneously assume approximately these positions: all receptacles are at rest at the conveyor stations CRS illustrated in Fig. 1; pushing devices 166a and 168a are laterally aligned in pairs, are each 45° from the horizontal forming a V in Figs. 5 and 7, are in positions intermediate between receptacle feeding and non-feeding positions, and are at the ends of driving or return strokes; cam follower 194 in Fig. 4 is at the low point of cam 192 while cam follower 194' is at the high point of cam 192' so that the driving devices are at the ends of their strokes; cam followers 244 and 244' in Figs. 7 and 8 are half-way up the rises of cams 242 and 242'; cam follower 607 in Figs. 13 and 15 engages the low point of cam 600; one of the five pusher units 512 is half-way between the two dotted line positions in Fig. 18 relative to control member 572 with the pusher unit 512 in Fig. 18 not appearing in the solid line position shown therein; a sheet unit U is on fixed support portions 440 and 440' at position P1; the next pusher unit 512 has its pusher arm 528 approximately coplanar with guide wall 344 and is located along approach run 566N; the ejector arm 362 is traveling clockwise in Fig. 18 but is located slightly to the left of the Fig. 18 position; cams 364 and 366 are each rotationally displaced slightly from their low points illustrated in Fig. 13; and the feeding of a sheet S or S' from each pack Q in Fig. 11 has just been completed so that each sheet unit supporting means GS is slightly above the Fig. 11 position.

It should now be obvious that many variations of the machine setup in Fig. 1 may be easily achieved. Although receptacle R is illustrated with only four compartments R1–R4 in Fig. 1, a receptacle of any size within the capacity of the machine may be used and the receptacle may have 1, 2, 3, 4, 5 or 6 compartments since six sub-assemblies A1–A6 are provided. Only four receptacle compartments R1–R4 are used in Fig. 1 so that only four sub-assemblies A1–A4 are actually needed to load the receptacle R. It should be obvious that a different sub-assembly could be used for loading each of the receptacle compartments, as shown in Fig. 1, or all of the sub-assemblies may be used for loading the same compartment, such as a single compartment box. Also, the sub-assemblies can be arranged in any variation between these two extremes, such as having two of the sub-assemblies load each compartment of a three-compartment box, or having three sub-assemblies load each compartment of a two-compartment box, so that all six sub-assemblies are being used. Also, the six compartments of a six-compartment box can be arranged in many variations. The six compartments may be arranged along the length of the conveyor with the conveyor receptacle edge guides 160 and 162 moved fairly close together, three compartments may be arranged along the length of the conveyor C in a row and the box be two compartment rows wide transverse to the conveyor to make up the six compartments, two compartments may be arranged along the length of the conveyor in a row with the box being three rows wide transverse to the conveyor, or (if the capacity of the machine permits) the receptacle may be six compartments wide along the width of the conveyor with each sub-assembly dropping its sheet unit in a different transversely and/or longitudinally spaced receptacle compartment. Of course, a receptacle having a smaller number of compartments than six may also have its compartments correspondingly oriented with respect to the conveyor C. Also, the orientation of the receptacle R on the conveyor C will determine to some degree the manner of display of the loaded receptacle R. Since all of the sheet units U will have their display or indicia so arranged that their bottom edge is on the left in Fig. 1 since the folded edge S3 is on the top in Fig. 1, the sheet units U may be properly loaded for end or side display. For example, if a side display two compartment receptacle is desired, a receptacle with compartments R2 and R3 would be used so that the common vertical left edge in Fig. 1 would serve as the bottom edge of the display receptacle. However, if an end display two compartment receptacle were desired, the two compartment receptacle would have compartments R1 and R3 so that the left edge of receptacle R1 would be the bottom edge of the end display receptacle.

Variations in the illustrated construction will readily suggest themselves to one skilled in the art. For example, the sub-assemblies A1–A6 could deposit the sheet units U in a sheet unit receiving flat surface area, such as a conveyor belt on conveyor C, or on any other suitable area with this area divided into sheet unit receiving zones instead of receptacle compartments if direct receptacle loading by the sub-assemblies A1–A6 were not desired.

Also, one or more of the sub-assemblies A1–A6 could simultaneously feed and load its sheet units U into different compartments of a single receptacle mounted on a support instead of to a receptacle R moved along by conveyor C. Then, at least some of the advantages mentioned heretofore would be obtained.

Each sub-assembly could, of course, be actuated in response to the stopping of the receptacle at its associated receptacle station CRS, if so desired, but this would provide a machine of substantially slower mode of operation than the one illustrated. The illustrated machine is a high production machine wherein all of the sub-assemblies A1–A6, the divider strip former and affixer D, and the receptacle conveyor C are driven in timed relationship by motor M for collating sheets S or S', such as greeting cards, from a plurality of supply packs Q and then loading them into different compartments R1–R4 of receptacle R to form a mixture box of different greeting cards (for example, each greeting card may be of different design and verse) with all greeting cards on the top of the compartments having their folds in corresponding positions and their display designs facing the same way for convenient display so that when the prospective purchaser thumbs through the greeting cards in the receptacle R, each can be individually viewed, read and considered because each will be upright and in proper display position.

Various changes in detail and arrangement of parts can be made by one skilled in the art without departing from either the spirit of this invention or the scope of the appended claims.

What I claim is:

1. In a machine having a support for a receptacle at a receptacle station; a collating type sheet unit supply feeder and receptacle loading assembly comprising a sheet unit supplying, collating and gathering first mechanism including a gathering conveyor and including means for collating folded sheets from a plurality of sheet packs and placing them fold first on said gathering conveyor to form units with each unit comprising a plurality of sheets with at least one from each pack with said gathering conveyor conveying said units in spaced apart relation to a first transfer zone, said gathering conveyor having means for compacting the sheets in each unit laterally into a compact unit while a force is applied to said folded edge, a second mechanism including a first sheet unit transfer means, conveying type sheet unit positioning means, and receptacle loading second sheet unit transfer means for respectively transferring said units individually from said first transfer zone on said gathering conveyor to said conveying type sheet unit positioning means by exerting a force on said fold, for conveying said units individually by said positioning means from a first to second position in a second transfer zone into alignment with a receptacle at said receptacle station by exerting a force on said fold, and for transferring said unit individually from said second position in said second transfer zone into said receptacle.

2. In a machine having a support for a receptacle at a receptacle station, a sheet unit supply feeder and receptacle loading assembly; said assembly having a sheet unit supplying first mechanism for conveying sheet units in spaced apart relation to a first transfer zone; said assembly having a first sheet unit transfer, sheet unit positioning, and receptacle loading second sheet unit transfer second mechanism for transferring said units individually from said first transfer zone on said first mechanism, for conveying said units individually to a loading station in said second transfer zone in alignment with a receptacle compartment and spaced from said first transfer zone, and for transferring said unit individually from said second transfer zone into receptacles at said receptacle station; said first and second mechanisms including two sheet unit side guide surfaces of generally uniform spacing extending along the path of sheet unit travel from the supply to said loading station.

3. In a machine having a support for a receptacle at a receptacle station, a sheet unit supply feeder and receptacle loading assembly; said assembly having a sheet unit supplying first mechanism for conveying sheet units in spaced apart relation to a first transfer zone; said assembly having a first sheet unit transfer, sheet unit positioning, and receptacle loading second sheet unit transfer second mechanism for transferring said units individually from said first transfer zone on said first mechanism, for conveying said units individually to a loading station in said second transfer zone in alignment with a receptacle compartment and spaced from said first transfer zone, and for transferring said unit individually from said second transfer zone into receptacles at said receptacle station; said first and second mechanisms including two sheet unit side guide surfaces of generally uniform spacing extending along the path of sheet unit travel from the supply to said loading station but gradually increasing in spacing rearwardly along said first mechanism.

4. In a machine, as set forth in claim 2, wherein said assembly includes side guide adjusting means for moving said side guide surfaces toward or away from each other while keeping corresponding portions on each side guide surface equidistant from the center line of sheet unit movement.

5. In a machine having a support for a receptacle at a receptacle station, a sheet unit supply feeder and receptacle loading assembly; said assembly having a sheet unit supplying first mechanism for conveying sheet units in spaced apart relation to a first transfer zone; said assembly having a first sheet unit transfer, sheet unit positioning, and receptacle loading second sheet unit transfer second mechanism for transferring said units individually from said first transfer zone on said first mechanism, for conveying said units individually to a loading station in said second transfer zone in alignment with a receptacle compartment and spaced from said first transfer zone, and for transferring said unit individually from said second transfer zone into receptacles at said receptacle station; said assembly including two sheet unit side guide surfaces of generally uniform spacing extending along the path of sheet unit travel from the supply to said loading station, side guide adjusting means for moving said side guide surfaces toward or away from each other while keeping corresponding portions on each side guide surface equidistant from the center line of sheet unit movement; said second mechanism having at the loading station a unit support for said sheet units operatively connected together and to at least one of said side guide surfaces and having a retractable unit support portion at said loading station, and means for moving said retractable unit support portion relative to said center line and side guide surfaces between unit supporting and unit transferring positions for transferring by gravity a unit into said receptacle with the time interval of movement being independent of the spacing between said side guides.

6. In a machine having a support for a receptacle adapted to receive sheet units; a sheet unit supplying, collating and gathering first mechanism for collating sheets from a plurality of sheet packs into sheet units and conveying said units in spaced apart relation to a first transfer zone; a first sheet unit transfer, sheet unit positioning, and receptacle loading second sheet unit transfer second mechanism for transferring said units individually from said first transfer zone on said first mechanism into alignment with a receptacle on said support in a second transfer zone spaced from said first transfer zone, and for transferring said units individually from said second transfer zone into a receptacle; and means on said mechanisms for applying all supporting, inertia retarding, or conveying forces symmetrically about a movement path center line to said sheet units as they move along the sheet unit movement path from supply to receptacle.

7. In a machine having a support for a receptacle adapted to receive sheet units; a sheet unit supplying, collating and gathering first mechanism for collating sheets from a plurality of sheet packs to form sheet units and conveying said units in spaced apart relation along a path center line by forces applied symmetrically to said center line to a first transfer zone; a first sheet unit transfer, conveying type sheet unit positioning, and receptacle loading second sheet unit transfer second mechanism for moving said units along a path center line from said first transfer zone into a receptacle by transferring said units individually from said first transfer zone on said first mechanism to said sheet unit positioning means by applying forces symmetrical to said center line, for braking the travel of said units and for conveying said units individually by said positioning means in a second transfer zone into alignment with a receptacle on said support by applying forces symmetrical to said center line, and for transferring a unit individually from said second transfer zone into said receptacle.

8. An article conveyor for advancing an article in step fashion by being passed from one driving device to another by driving strokes having adjacent ends overlapping, including a feed member having a plurality of article driving devices spaced along its length dimension for engagement during a driving stroke with an article and for release therefrom during a return stroke, driving type actuating means for reciprocating said feed member in opposite directions along its length through a driving stroke and a return stroke, shifting type actuating means for moving said feed member between feeding and non-feeding positions, and timing means operatively connecting said shifting means and driving means for moving said feed member through an operation cycle including movement in a drive cycle portion in the feeding position through the driving stroke and then movement in a return cycle portion in the non-feeding position through the return stroke.

9. An article conveyor, including two feed members each having a plurality of article driving devices spaced along its length dimension for engagement during a driving stroke with an article and for release therefrom during a return stroke, driving type actuating means for reciprocating each feed member in opposite directions along its length through a driving stroke and a return stroke, shifting type actuating means for moving each feed member between feeding and non-feeding positions, and means operatively connecting said shifting means and driving means for moving said feed member through an operation cycle including movement in a drive cycle portion in the feeding position through the driving stroke and then movement in a return cycle portion in the non-feeding position through the return stroke and for timing said movements so that one feed member moves through one of said cycle portions while the other feed member moves through the other cycle portion so that said article will be advanced in step fashion along said length dimension by being passed from a driving device on one feed member to a driving device on the other.

10. An article conveyor, including two feed members each having a plurality of article driving devices spaced along its length dimension for engagement during a driving stroke with an article equidistant from the mid-point of its width and for release therefrom during a return stroke, two opposite article outer edge guides for said article extending generally parallel to each other and to said feed members, driving type actuating means for reciprocating each feed member in opposite directions along its length through a driving stroke and a return stroke, shifting type actuating means for moving each feed member between feeding and non-feeding positions, and timing means operatively connecting said shifting means and driving means for moving each feed member through an operation cycle including movement in a drive cycle portion in the feeding position through the driving stroke and then movement in a return cycle portion in the non-feeding position through the return stroke and for timing said movements so that said articles will be advanced in step fashion along said length dimension by being passed from one driving device to another driving device.

11. An article conveyor, including two feed members each having a plurality of article driving devices spaced along its length dimension for engagement during a driving stroke with an article and for release therefrom during a return stroke, driving type actuating means for reciprocating each feed member in opposite directions along its length through a driving stroke and a return stroke, shifting type actuating means for moving each feed member between feeding and non-feeding positions, and timing means operatively connecting said shifting means and driving means for moving each feed member through an operation cycle including movement in a drive cycle portion in the feeding position through the driving stroke and then movement in a return cycle portion in the non-feeding position through the return stroke and for timing said movements so that said articles will be advanced in step fashion along said length dimension by being passed from one driving device to another driving device.

12. An article conveyor, including two feed members and actuating means for moving said feed members in opposite directions during driving and return strokes, said actuating means including for each feed member a rotatable cam, a cam follower, and connecting means operatively connecting said follower to said cam and to said feed member, movement of said driving means cam in one direction occurring during driving stroke movement and movement thereof in the opposite direction occurring during return stroke movement.

13. An article conveyor for advancing an article in step fashion by being passed from one driving device to another by driving strokes having adjacent ends overlapping, including a feed member having a plurality of article driving devices spaced along its length dimension for engagement during a driving stroke with an article and for release therefrom during a return stroke, driving type actuating means for reciprocating said feed member in opposite directions along its length through a driving stroke and a return stroke, shifting type actuating means for moving said feed member between feeding and non-feeding positions, and timing means operatively connecting said shifting means and driving means for moving said feed member through an operation cycle including movement in a drive cycle portion in the feeding position through the driving stroke and then movement in a return cycle portion in the non-feeding position through the return stroke, at least one of said actuating means including a rotatable cam, a cam follower, a rack and pinion drive, and connecting means operatively connecting said follower to said cam and to said rack and operatively connecting said pinion to at least one of said feed members so that timed rotation of said cam by said timing means causes the operational sequence mentioned heretofore.

14. An article conveyor, including two feed members each having a plurality of article driving devices spaced along its length dimension for engagement during a driving stroke with an article and for release therefrom during a return stroke, driving type actuating means for reciprocating each feed member in opposite directions along its length through a driving stroke and a return stroke, shifting type actuating means for moving said feed members between feeding and non-feeding positions, and means operatively connecting said shifting means and driving means for moving said feed members through an operation cycle including movement in a drive cycle portion in the feeding position through the driving stroke and then movement in a return cycle portion in the non-feeding position through the return stroke and for timing said movements so that one feed member moves through one of said cycle portions while the other feed member moves through the other cycle portion so that said article will be advanced in step fashion along said length dimension by being passed from a driving device on one feed member to a driving device on the other, said driving type actuating means including for each feed member a rotatable cam, a cam follower, a rack and pinion drive, and connecting means operatively connecting said follower to said cam and to said rack and operatively connecting said pinion to its feed member so that timed rotation of said cams by said timing means causes the operational sequence mentioned heretofore.

15. An article conveyor for advancing an article in step fashion by being passed from one driving device to another by driving strokes having adjacent ends overlapping, including a feed member having a plurality of article driving devices spaced along its length dimension for engagement during a driving stroke with an article and for release therefrom during a return stroke, driving type actuating means for reciprocating said feed member in opposite directions along its length through a driving stroke and a return stroke, shifting type actuating means for moving said feed member between feeding and non-feeding positions, and timing means operatively connecting said shifting means and driving means for moving said feed members through an operation cycle including movement in a drive cycle portion in the feeding position through the driving stroke and then movement in a return cycle portion in the non-feeding position through the return stroke, said driving type actuating means and said shifting type actuating means each including a rotatable cam, a cam follower, a rack and pinion drive, and connecting means operatively connecting said follower to said cam and to said rack and operatively connecting said pinion to said feed member so that timed rotation of said cams by said timing means causes the operational sequence mentioned heretofore.

16. An article conveyor, as set forth in claim 12, with said means operatively connecting said followers to said cams including a flexible connector operatively connecting said followers to urge them into cam contacts, the profiles of said cams arranged so that said connector does not substantially change in length through the operating cycle but always urges both followers into cam contact, said flexible connector including for a portion of its length a resilient means urging said followers into cam contacts, causing said return stroke, providing give in the feed member drive to prevent part breakage and remaining of substantially constant length unless jamming occurs so that no work need to normally performed against said resilient means.

17. An article conveyor for advancing an article in step fashion by being passed from one driving device to another by driving strokes having adjacent ends overlapping, including a feed member having a plurality of article driving devices spaced along its length dimension for engagement during a driving stroke with an article and for release therefrom during a return stroke, two opposite article outer edge guides for said article extending generally parallel to each other and to said feed members, driving type actuating means for reciprocating through an adjustable operative connection, said feed member in opposite directions along its length through a driving stroke and a return stroke, shifting type actuating means for moving through an adjustable operative connection, said feed member between feeding and non-feeding positions, timing means operatively connecting said shifting means and driving means for moving said feed member through an operation cycle including movement in a drive cycle portion in the feeding position through the driving stroke and then movement in a return cycle portion in the non-feeding position through the return stroke, and adjustable means operatively connecting said edge guides and said feed members so that one of said guides may be moved toward or away from the other for different size articles and said feed members may be moved in the same direction to maintain engagement between said driving devices and article at approximately the same relative point of the width thereof while said adjustable operative connections in said driving means and shifting means permits this adjusting movement.

18. A receptacle conveyor for advancing a receptacle in step fashion by being passed from one driving device to another by driving strokes having adjacent ends overlapping, including two feed members each having a plurality of receptacle driving devices spaced along its length dimension for engagement during a driving stroke with a receptacle equidistant from the mid-point of its width and for release therefrom during a return stroke, two opposite receptacle outer edge guides for said receptacle extending generally parallel to each other and to said feed members, driving type actuating means for reciprocating each feed member in opposite directions along its length through a driving stroke and a return stroke with the driving strokes alternately arranged along said length dimension with only the adjacent stroke ends thereof overlapping, shifting type actuating means for moving each feed member between feeding and non-feeding positions, timing means operatively connecting said shifting means and driving means for moving said feed members through an operation cycle including movement in a drive cycle portion in the feeding position through the driving stroke and then movement in a return cycle portion in the nonfeeding position through the return stroke and for timing said movements so that one feeder member moves through one of said cycle portions while the other feed member moves through the other cycle portion so that said receptacle will be advanced in step fashion along said length dimension by being passed from a driving device on one feed member to a driving device on the other with a receptacle station being located at each transfer point between said devices, said driving type actuating means including for each feed member and said shifting type actuating means each including a rotatable cam, a cam follower, a rack and pinion drive, connecting means operatively connecting said follower to said cam and to said rack and operatively connecting said pinion to at least one of said feed members so that timed rotation by said timing means of the cam in each actuating means causes the operational sequence mentioned heretofore, said last mentioned connecting means including an adjustable operative connection between said follower and said feed member, the rise of said driving means cams causing driving stroke movement and the fall thereof occurring during return stroke movement, said connecting means operatively connecting said followers to said cams of said driving means including a flexible connector operatively connecting said followers to urge them into cam contacts, the profiles of said driving means cams arranged so that said connector does not substantially change in length through the operating cycle but always urges both followers into cam contacts, said flexible connector including for a portion of its length a resilient means urging said followers into cam contacts, causing said return strike, providing give in the feed member drive to prevent part breakage and remaining of substantially constant length unless jamming occurs so that no work need be normally performed against said resilient means, and adjustable means operatively connecting said receptacle edge guides and said feed members so that one of said guides may be moved toward or away from the other for different size receptacles and said feed members may be moved in the same direction to maintain engagement between said driving devices and receptacle at approximately equidistant from the mid-point of the width thereof while said adjustable operative connections in said driving means and shifting means permits this adjusting movement.

19. A sheet unit positioning means for conveying sheet units between first and second positions along a path of travel, including a guide type unit support for said sheet units and positioning conveyor operatively connected to said support for conveying said sheet units individually from said first to second position; said positioning conveyor including a conveyor member having a run traveling between said positions generally parallel to said guide type unit support, said positioning conveyor including a unit pusher carried by said conveyor member, said positioning conveyor including a pusher control means having a control surface extending generally parallel to the travel of said conveyor member run, said pusher including a pusher arm for pushing a sheet unit and a follower means operatively engaging said control surface and including means operatively connecting said pusher arm and follower means together and to said conveyor member so that said pusher arm will move between unit pushing and retracted positions as said follower means follows said control surface; said active control member including a rod extending generally parallel to said active run, a plurality of spacer blocks at least partially surrounding said rod, a pusher control block adapted to form a portion of a pusher control surface and being detachably connected to said rod for removal or attachment thereto between said spacer blocks without removal of said spacer blocks from said rod, said pusher control block having a control surface determining the location of said second position and adapted to move said pusher arm from pushing to retracted positions, and lock means operatively connecting said rod and blocks for movement between an unlocked position to permit moving said blocks endwise along said rod and for relocating said pusher control block between the appropriate spacer blocks and a locked position preventing block movement along the length of the rod, whereby said second position may be moved relative to said first position by moving said lock means to an unlocked position, by relocating said control block an even number of spacer blocks and then by moving said lock means to said locked position.

20. A sheet unit positioning means for conveying sheet units between first and second positions along a path of travel, including a guide type unit support for said sheet units operatively connected to the center line of unit travel along said positioning means, and a positioning conveyor operatively connected to said center line for conveying said sheet units individually from said first to second position; said positioning conveyor including a conveyor member having a run traveling between said positions generally parallel to said guide type unit support, said positioning conveyor including a unit pusher carried by said conveyor member, said positioning conveyor including a pusher control means having a control surface extending generally parallel to the travel of said conveyor member run, said pusher including a pusher arm for pushing a sheet unit and a follower means operatively engaging said control surface and including means operatively connecting said pusher arm and follower means together and to said conveyor member so that said pusher arm will move between unit pushing and retracted positions as said follower means follows said control surface; said active control member including a rod extending generally parallel to said active run, a plurality of spacer blocks at least partially surrounding said rod and having at least two edge surfaces each located at different distances from the axis of said rod and adapted so that either may be swung around said rod to form a portion of said active pusher control surface, said distances respectively determining said pushing and retracted positions, and lock means operatively connecting said rod and blocks for movement between an unlocked position to permit swinging either edge surface of any spacer block between an active pusher control surface forming position and a locked position preventing relative swinging movement between the blocks, whereby said second position may be moved relative to said first position by moving said lock means to an unlocked position, swinging at least some of said spacer blocks about said rod, and then moving said lock means to a locked position.

21. A sheet unit positioning means for conveying sheet units between first and second positions along a path of travel, including a guide type unit support member for said sheet units operatively connected to the center line of unit travel along said positioning means, and a positioning conveyor operatively connected to said center line for conveying said sheet units individually from said first to second position; said positioning conveyor including a conveyor member having a run traveling between said positions generally parallel to said guide type unit support member, said positioning conveyor including a unit pusher carried by said conveyor member, said positioning conveyor including a pusher control means having a control surface extending generally parallel to the travel of said conveyor member run, said pusher including a pusher arm for pushing a sheet unit and a follower means operatively engaging said control surface and including means operatively connecting said pusher arm and follower means together and to said conveyor member so that said pusher arm will move between unit pushing and retracted positions as said follower means follows said control surface, and a control member at said second position carried by said control surface for moving said pusher arm by said follower means from pushing to retracted positions; said active control member including a rod element extending generally parallel to said run and having a threaded zone, and a nut element screwed onto said threaded zone, said elements connected against endwise movement relative respectively to said retractable unit support member in its unit supporting position and to said control member, one of said elements being rotatably carried by its member while the other being fixed against rotation relative to its member, whereby said second position may be moved relative to said first position by rotating said rotatable element to move said control member endwise relative to said unit support in said unit supporting position.

22. A sheet unit positioning means for conveying sheet units between first and second positions along a path of travel, including a guide type unit support for said sheet units operatively connected to the center line of unit travel along said positioning means, and a positioning conveyor operatively connected to said center line for conveying said sheet units individually from said first to second position; said positioning conveyor including a conveyor member having a run traveling between said positions generally parallel to said guide type unit support, said positioning conveyor including a plurality of unit pushers spaced along and carried by said conveyor member, said positioning conveyor including a pusher control means including a control surface extending generally parallel to the travel of said conveyor member run, each pusher including a pusher arm for pushing a sheet unit and a follower arm operatively engaging said control surface and including means operatively connecting said pusher arm and follower arm together and rotatably to said conveyor member so that said pusher arm will move between unit pushing and retracted positions as said follower arm swings over center through a plane extending perpendicular to the pusher control surface with said follower arm being on one side of said plane in said pushing position and on the opposite side of said plane in said retracted position, each pusher including means urging movement from retracted to pushing position, said positioning conveyor including means for permitting movement of said pusher arm back from retracted to pushing position as said pusher returns from said second to said first position, each of said pusher arms including a helical coil spring adapted to push its unit in a direction transverse to the coil axis and at a point axially spaced from the spring connection to the remainder of said pusher to minimize damage to the sheet unit being pusher; said active control means including a rod extending generally parallel to said active run and having a threaded zone remote from said positions, a nut screwed onto said threaded zone and rotatably connected against endwise movement relative to said unit support portion in its unit supporting position, a plurality of spacer blocks telescoped over said rod and having at least two edge surfaces each located a different distance from the axis of said rod and adapted so that either may be swung around said rod to form a portion of said pusher control surface, said distances respectively determining said pushing and retracted positions, a pusher control block adapted to form a portion of said control surface and being detachably connected to said rod for removal or attachment thereto between said spacer blocks without removal of said spacer blocks from said rod, said pusher control block having a gap in said control surface forming a camming portion at said second position for causing over center swing of said pusher arm from pushing to retracted positions and determining the location of said second position, and lock means operatively connecting said rod and blocks for movement between an unlocked position to permit moving said blocks endwise along said rod or swinging either edge surface of any spacer block between an active pusher control surface forming position or an inactive position and for relocating said pusher control block between the appropriate spacer blocks and a locked position preventing relative movement between the blocks and preventing block movement along the length of the rod, whereby said second position may be moved relative to said first position by moving said lock means to an unlocked position, removing said control block, swinging at least some of said spacer blocks about said rod, relocating said control block an even number of spacer blocks, moving said lock means to said locked position, and then obtaining any finer adjustment by rotating said nut to move said blocks and rod endwise relative to said unit support in said unit supporting position.

23. In a machine, a sheet unit supplying means for supplying said units in timed relationship to a first transfer zone with said units including folded sheets, a push type first sheet unit transfer means, sheet unit positioning means, and second sheet unit transfer means for respectively supplying said units individually to said first transfer zone with the folded edges similarly oriented in said first transfer zone to form a folded unit edge, transferring said units individually from said sheet unit supplying means in said first transfer zone by a pushing action against the folded unit edge to said sheet unit positioning means for positioning said units individually by said positioning means at a position in a second transfer zone spaced from said first transfer zone, and for transferring said units individually from said positioning means in said second transfer zone; said supply means, said first transfer means, said positioning means and said second transfer means having two sheet unit side guide surfaces of generally uniform spacing, and side guide adjusting means for moving said side guide surfaces toward or away from each other while keeping corresponding portions on each side guide surface equidistant from the center line of sheet unit movement; said positioning means and second transfer means having said second transfer zone for respectively receiving said units from said first transfer means and positioning them for individual transfer by said second transfer means, including a guide type unit support for said sheet units comprising two generally parallel unit support elements straddling the path of unit travel operatively connected to corresponding side guide surfaces, each element having a retractable unit support element portion at said position in said second transfer zone, means for moving said retractable unit support element portion relative to said center line and side guide surfaces between unit supporting and unit transferring positions for transferring by gravity a unit in the second transfer zone with the timing of the movement being substantially independent of the spacing between said guides, and brake and fold closing means straddling said center line and fixed relative to said center line and said side guide surfaces for resiliently coacting with both said guide type unit support elements to arrest the unit movement caused by said first transfer means.

24. In a machine, as set forth in claim 23, wherein said second transfer zone takes the form of a single position for receiving said units from said first transfer means and positioning them for individual transfer by said second transfer means, and wherein said brake and fold closing means resiliently coacts with both said retractable guide type unit support element portions.

25. In a machine, a sheet unit supplying means for supplying said units in timed relationship to a first transfer zone with said units including folded sheets, a push type first sheet unit transfer means, sheet unit positioning means, and second sheet unit transfer means for respectively supplying said units individually to said first transfer zone with the folded edges similarly oriented in said first transfer zone to form a folded unit edge, transferring said units individually from said sheet unit supplying means in said first transfer zone by a pushing action against the folded unit edge to said sheet unit positioning means for positioning said units individually by said positioning means at a position in a second transfer zone spaced from said first transfer zone, and for transferring said units individually from said positioning means in said second transfer zone; said supply means, said first transfer means, said positioning means and said second transfer means having two sheet unit side guide surfaces of generally uniform spacing, and side guide adjusting means for moving said side guide surfaces toward or away from each other while keeping corresponding portions on each side guide surface equidistant from the center line of sheet unit movement; said positioning means and second transfer means having first and second positions in the second transfer zone spaced along the path of sheet unit travel for respectively receiving said units from said first transfer means and positioning them for individual transfer by said second transfer means at said second position, including a guide type unit support for said sheet units comprising two generally parallel unit support elements straddling the path of unit travel operatively connected to corresponding side guide surfaces, each element having a fixed unit support element portion fixed at said first position to said side guide surfaces against relative movement with respect to the center line of unit travel along said positioning means in any given position of said side guide surfaces and having a retractable unit support element portion at said second position in said second transfer zone, means for moving said retractable unit support element portion relative to said center line and side guide surfaces between unit supporting and unit transferring positions for transferring by gravity a unit in the second position with the timing of the movement being substantially independent of the spacing between said guides, brake and fold closing means straddling said center line and fixed relative to said center line and said side guide surfaces for resiliently coacting with both said fixed guide type unit support element portions to arrest in said first position the unit movement caused by said first transfer means and to prevent interleaving of said units between said positions, and a positioning conveyor for conveying said sheet units individually from said first to second position in said second transfer zone.

26. In a machine having multiple setups, as set forth in claim 25, wherein said positioning means and second transfer means have first and second positions in the second transfer zone spaced along the path of sheet unit travel with said first position receiving said units from said first transfer means in first and second machine setups and with said units being positioned for individual transfer by said second transfer means at said first or second position respectively in said first and second machine setups, the operative connection between said fixed unit support portion and said center line taking the form of a detachable connection to permit either removal thereof or mounting it in said first position above the level of at least a portion of said retractable unit support portion, said retractable unit support portion extending between and under said first and second positions, whereby said unit may be selectively dropped in either said first or second position by respectively removing in said first setup or operatively connecting in said second setup said fixed unit support portion, and positioning conveyor drive means for driving said positioning conveyor in timed relationship with said transfer means in said second setup and for idling said positioning conveyor during driving of said transfer means in said first setup.

27. In a machine, a sheet unit supplying means for supplying said units in timed relationship to a transfer zone, a push type sheet unit transfer means, and sheet unit positioning means for respectively supplying said units individually to said transfer zone and transferring said units individually from said sheet unit supplying means in said transfer zone by a pushing action to said sheet unit positioning means for positioning said units individually by said positioning means in a position spaced from said transfer zone; said positioning means including a guide type unit support for said sheet units having a guide surface extending along the path of unit travel and fixed at said position against relative movement along the center line of unit travel, and brake means fixed relative to said guide surface for resiliently coacting with said guide surface to arrest in said position the unit movement caused by said transfer means.

28. In a machine, a sheet unit supplying means for supplying said units in timed relationship to a transfer zone with said units including at least one folded sheet, a push type sheet unit transfer means, and sheet unit fold closing means for respectively supplying said units individually to said transfer zone, transferring said units individually from said sheet unit supplying means in said transfer zone by a pushing action against said fold and for closing the open unit fold during said transfer action to prevent interleaving of said units.

29. In a machine, a sheet unit supplying means for supplying said units in timed relationship to a transfer zone with said units including at least one folded sheet, a push type sheet unit transfer means, and sheet unit positioning means for respectively supplying said units individually to said transfer zone with the folded edges similarly oriented in said transfer zone to form a folded unit edge, transferring said units individually from said sheet unit supplying means in said transfer zone by a pushing action against the folded unit edge to said sheet unit positioning means and positioning said units individually by said positioning means in a position spaced from said transfer zone; said positioning means including a guide type unit support for said sheet units having a guide surface extending along the path of unit travel and fixed at said position against relative movement along the center line of unit travel, and brake and fold closing means fixed relative to said guide surface for resiliently coacting with said guide surface to arrest in said position the unit movement caused by said transfer means and to prevent interleaving of said units.

30. A positioning means and transfer means having first and second positions spaced along the path of sheet unit travel for respectively receiving said units and positioning them for individual transfer by said transfer means, including two sheet side guide surfaces of generally uniform spacing, side guide adjusting means for moving said side guide surfaces toward or away from each other while keeping corresponding portions on each side guide surface equidistant from the center line of sheet unit movement, a guide type unit support for said sheet units comprising two generally parallel unit support elements straddling the path of unit travel operatively connected to corresponding side guide surfaces, each element having a fixed unit support element portion fixed at said first position to said side guide surfaces against relative movement with respect to the center line of unit travel along said positioning means and having a retractable unit support element portion at said second position, means for moving said retractable unit support element portions relative to said center line between unit supporting and unit transferring positions for transferring by gravity a unit in the second position with the movement being substantially independent of the spacing of said side guide surfaces, and a positioning conveyor for conveying said sheet units individually from said first to second positions.

31. A positioning means and transfer means having first and second positions spaced along the path of sheet unit travel for respectively receiving said units from a supply and positioning them for individual transfer by said second transfer means, including two sheet side guide surfaces of generally uniform spacing, side guide adjusting means for moving said side guide surfaces toward or away from each other while keeping corresponding portions on each side guide surface equidistant from the center line of sheet unit movement, a guide type unit support for said sheet units comprising two generally parallel unit support elements straddling the path of unit travel operatively connected to corresponding side guide surfaces, each element having a fixed unit support element portion fixed at said first position to said side guide surfaces against relative movement with respect to the center line of unit travel along said positioning means and having a retractable unit support element portion at said second position, means for moving said retractable unit support element portions relative to said center line between unit supporting and unit transferring positions for transferring by gravity a unit in the second position with the movement being substantially independent of the spacing of said side guide surfaces, and a positioning conveyor for conveying said sheet units individually from said first to second positions; said positioning conveyor including a conveyor member having a run traveling between said positions, and including a unit pusher carried by said conveyor member with said pusher including a pusher arm for pushing a sheet unit and means operatively connecting said pusher arm and unit support element portion so that said pusher arm will swing between unit pushing and retracted positions as said unit is pushed into said second position.

32. In combination, a receptacle conveyor, a sheet unit supply conveyor, and transfer means for transferring sheet units individually from said supply conveyor at least partially along a path of travel into a receptacle on said receptacle conveyor; said supply conveyor including a generally vertically moving run for conveying the units to a transfer zone, and including a conveyor member and unit supporting means for carrying said units in spaced apart relationship to said transfer zone, each of said unit supporting means including a set of arms carried by said conveyor member with two arms located equidistant from the center line of the unit travel path in a plane extending perpendicular to the direction of travel; said transfer means including an ejector arm extending between the arms of at least some of the sets along the sheet unit path of travel center line of said run, said ejector arm having an elongated base portion extending generally parallel to said conveyor run during a portion of its travel and forming at one end thereof one leg of a generally V-shape with the other leg thereof positioned for sheet unit engagement; and means for moving said ejector arm in timed relationship with said conveyor for transferring the units one at a time from the run of said conveyor to said positioning means by having the vertex of the V-shape adapted to slide behind each sheet unit and by having the other leg push the unit clear of said supply conveyor, past the edge of the receptacle conveyor and over said receptacle.

33. In a machine, a sheet unit supply conveyor for conveying said units in spaced apart relation to a transfer zone, a sheet unit transfer means, and sheet unit positioning means for respectively supplying sheet units, transferring said units individually from said transfer zone on said supply conveyor to said sheet unit positioning means; said supply conveyor including a generally vertically moving run for conveying the units to a transfer zone, including a conveyor member and unit supporting means for carrying said units in spaced apart relationship to said transfer zone, each of said unit supporting means including a set of arms carried by said conveyor member with two arms located equidistant from the center line of the unit travel path in a plane extending perpendicular to the direction of travel; said transfer means including an ejector arm extending between the arms of at least some of the sets along the sheet unit path of travel center line of said run; means for moving said ejector arm in timed relationship with said conveyor for transferring the units one at a time from the run of said conveyor to said positioning means by having the vertex of the V-shape adapted to slide behind each sheet unit and by having the other leg push the unit clear of said supply conveyor and into engagement with said positioning means; said positioning means including a guide type unit support for said sheet units operatively connected with respect to the center line of unit travel, and brake means fixed relative to said center line for resiliently coacting with said guide type unit support to arrest the unit movement caused by said first transfer means.

34. In combination, a positioning means, including a positioning conveyor for conveying sheet units individually from first to second positions; said positioning conveyor including a conveyor member having an active run traveling between said positions and an approach run leading to said first position, a pusher arm for pushing a sheet unit, and means operatively connecting said pusher arm to said conveyor member for movement between unit pushing and inactive positions, and means for causing movement of said pusher arm at said second position from pushing to inactive position and for causing movement of said pusher arm back from inactive to pushing position as said pusher returns from said second to said first position; jam detector means movable to a jam detecting position in response to incomplete return of said pusher arm to said pushing position as it approaches said first position; and means responsive to movement to said jam detecting position by said sheet unit jam detector means for deactivating said conveyor.

35. In combination, a positioning means including a positoning conveyor for conveying sheet units individually from first to second conveyor positions; said positioning conveyor including a conveyor member having an active run traveling from first to second positions and an approach run leading to said first position, a unit pusher carried by said conveyor member, and a pusher control means including active and approach control members respectively having active and approach control surfaces extending generally parallel to the travel of said active and approach conveyor member runs, said pusher including a pusher arm for pushing a sheet unit and a follower arm operatively engaging one of said control surfaces as said pusher is located along the corresponding run and including means operatively connecting said pusher arm and follower arm together and to said conveyor member so that said pusher arm will swing between unit pushing and retracted positions, as said follower arm being swingable through an over center position in a plane extending perpendicular to the pusher control surface so as to engage with said follower arm on one side of said plane in said pushing position and on the opposite side of said plane in said retracted position, said positioning conveyor including means for causing movement of said pusher arm at said second position from pushing to retracted positions and for causing movement of said pusher arm back from retracted to pushing position as said pusher returns from said second to said first position; sheet unit jam detector means including a loose connection between at least one of said control members remote from at least one of said conveyor positions and its associated conveyor member run to permit movement of said one control member in said one conveyor position toward and away from said conveyor member, said jam detector means including means movable to a jam detecting position in response to movement of said one control member about its loose connection by the follower arm of said pusher when said pusher arm is located intermediate its positions; and means responsive to movement to said jam detecting position by said sheet unit jam detector means for deactivating said conveyor.

36. In combination, a positioning means including a positioning conveyor for conveying sheet units individually from first to second positions; said positioning conveyor including a conveyor member having an active run traveling from first to second positions and an approach run leading to said first position, a unit pusher carried by said conveyor member, said pusher including a pusher arm for pushing a sheet unit and means operatively connecting said pusher arm to said conveyor member for movement between unit pushing and inactive positions with any abnormal force exerted by a unit being pushed tending to move said arm from pushing to inactive position, said positioning conveyor including means for causing movement of said pusher arm at said second position from pushing to inactive position and for causing movement of said pusher arm back from inactive to pushing position as said pusher returns from said second to said first position; sheet unit jam detector means movable to a jam detecting position in response to the location of said pusher arm between pushing and inactive positions in a zone on said runs approaching said first position and between said first and second positions; and means responsive to movement to said jam detecting position by said sheet unit jam detector means for deactivating said conveyor, said last mentioned means including a single switch for detecting any jam condition, whereby said conveyor will be stopped in response to incomplete return of said pusher arm to said pushing position as it approaches said first position and to abnormal pressure exerted against a pusher arm by a sheet unit being pushed.

37. In a machine, a sheet unit supply conveyor for conveying said units in spaced apart relation to a transfer zone; a sheet unit positioning means including a positioning conveyor for conveying sheet units individually from first to second conveyor positions; a sheet unit transfer means for transferring said units individually from said transfer zone on said supply conveyor to said first position; said positioning conveyor including a conveyor member having at least one pusher arm for pushing a sheet unit from said first to said second position; sheet unit jam detector means including a first sheet unit jam detector means movable to a jam detecting position in response to abnormal protrusion of sheet units from said supply conveyor approaching said first transfer zone, and including a second sheet unit jam detector means movable to a jam detecting position in response to improper positioning of and abnormal pressure exerted against said pusher arm as it approaches said first position or travels from said first to second position; and means responsive to movement to a jam detecting position by any of said sheet unit jam detector means for deactivating said conveyors and transfer means, said last mentioned means including a common switch for all jam detector means.

38. In a machine, a sheet unit supply conveyor for conveying said units in spaced apart relation to a transfer zone; a sheet unit positioning means including a positioning conveyor for conveying sheet units individually from first to second conveyor positions; a sheet unit transfer means for transferring said sheet units individually from said transfer zone on said supply conveyor to said first position; said positioning conveyor of said positioning means including a conveyor member having an active run traveling from first to second conveyor positions and an approach run located between said first position and said supply conveyor leading to said first position and right angularly inclined with respect to the path of travel between said first and second positions, a plurality of unit pushers spaced along and carried by said conveyor member, and a pusher control means including active and approach control members respectively having active and approach control surfaces extending generally parallel to and above the travel of said active and approach conveyor member runs, each pusher including a pusher arm for pushing a sheet unit and a follower arm operatively engaging one of said control surfaces as said pusher is located along the corresponding run and including means operatively connecting said pusher arm and follower arm together and to said conveyor member so that said pusher arm will swing between unit pushing and retracted positions as said follower arm swings through an over center position in a plane extending perpendicular to the pusher control surface it engages with said follower arm being on one side of said plane in said pushing position and on the opposite side of said plane in said retracted position and any abnormal force exerted by a unit being pushed tending to move said arm from pushing to retracted positions, said positioning conveyor including means for causing movement of said pusher arm at said second position from pushing to retracted positions and for causing movement of said pusher arm back from retracted to pushing position as said pusher returns from said second to said first position; a plurality of sheet unit jam detector means including a first sheet unit jam detector means movable to a jam detecting position in response to abnormal pressure on said sheet unit transfer means generally in the direction of travel of said supply conveyor in said transfer zone, a second sheet unit jam detector means movable to a jam detecting position in response to the presence of any sheets in said supply conveyor jammed against the supply conveyor by the action of the transfer means moving to the beginning of its transfer stroke, a third sheet unit jam detector means movable to a jam detecting position in response to abnormal protrusion of sheet units from said supply conveyor approaching said first transfer zone, a fourth sheet unit jam detector means including a loose pivot type connection between said active control member remote from said conveyor positions and said active conveyor member run to provide a horizontal pivotal connection at one end of said active control member remote from said first position to permit movement of said control member toward and away from its conveyor member run, and a fifth sheet unit jam detector means including a loose horizontal pivot type connection between the end opposite the active run end of said approach control member and said approach conveyor run to permit movement of said control member toward and away from its conveyor member run, said fourth and fifth sheet unit jam detector means including means movable to a jam detecting position in response to lifting of its associated approach or active control member about its pivotal connection by the follower arm of said pusher when said pusher arm is located intermediate its position in response to incomplete return of its pusher arm to said pushing position as it approaches said first position, to abnormal pressure exerted against its pusher arm by a sheet unit ahead of said first position as said pusher arm approaches said first position, and to abnormal pressure exerted against its pusher arm by a sheet unit being pushed from said first to second position; and means responsive to movement to a jam detecting position by any of said sheet unit jam detector means for deactivating said conveyors and transfer means, said last mentioned means including a common switch for said third, fourth and fifth jam detector means.

39. In a machine having a receptacle conveyor for moving receptacles from receptacle station to receptacle station in series along a path having said receptacle stations fixed along the length thereof and with multiple zones in each receptacle being at least two in number along said path and at least two in number transverse to said path; a sheet unit feeder and receptacle zones loading assembly comprising a plurality of sub-assemblies spaced along the length of said path with each sub-assembly loading its sheet unit at a loading station into a different receptacle zone at a receptacle station; each of said sub-assemblies having a sheet unit supply mechanism, a mechanism for transferring said sheet units individually from said supply mechanism to a loading station on said sub-assembly into a preselected receptacle receiving zone, adjusting means operatively connecting at least some of the loading stations of said sub-assemblies and their associated receptacle stations on the receptacle conveyor together for relative movement along said receptacle path for aligning of each sub-assembly with the proper longitudinally spaced compartment at its associated receptacle station, and including adjusting means operatively connecting at least some of said loading stations and their associated receptacle stations on the receptacle conveyor together for relative movement generally transverse to said receptacle path for aligning on each sub-assembly its loading station with the proper transversely spaced receiving zone.

40. In a machine having a support for receptacles with each receptacle divided into multiple sheet unit receiving zones; a sheet unit supply feeder and receptacle loading assembly comprising a sheet unit supplying mechanism for feeding sheets from a sheet pack and including suction pickup means for engagement with one face of a sheet from one end of said pack and operable to separate said sheet therefrom, a second mechanism for individually receiving said separated sheet from said supplying mechanism with said one face of said sheet facing in a first direction, said second mechanism being operable to transfer said separated sheet to one of said receiving zones, and said second mechanism while transferring said separated sheet being operable to invert said sheet to locate said one face thereof in a second direction.

41. In a machine, a sheet unit supplying means for supplying said units in timed relationship to a first transfer zone, a first sheet unit transfer means, sheet unit positioning means, and second sheet unit transfer means for respectively supplying said units individually to said first transfer zone transferring said units individually from said sheet unit supplying means in said first transfer zone to said sheet unit positioning means for positioning said units individually by said positioning means at a position in a second transfer zone spaced from said first transfer zone, and for transferring said units individually from said positioning means in said second transfer zone by movement along a path center line; said positioning means and second transfer means having first and second positions in the second transfer zone spaced along the path of sheet unit travel for respectively receiving said units from said first transfer means and positioning them for individual transfer by said second transfer means at said second position, including a guide type unit support for said sheet units operatively connected to the path of unit travel and having a fixed unit support portion fixed at said first position with respect to the center line of unit travel along said positioning means and having a retractable unit support portion at said second position in said second transfer zone at said loading station, and means mounting said retractable unit support portion for movement relative to said center line between unit supporting and unit transferring positions for transferring a unit in the second position, and including a positioning conveyor for conveying said sheet units individually from said first to second positions in said second transfer zone, said positioning means and second transfer means have first and second positions in the second transfer zone spaced along the path of sheet unit travel with said first position receiving said units from said first transfer means in first and second machine setups and with said units being positioned for individual transfer by said second transfer means at said first or second position respectively in said first and second machine setups, the operative connection between said fixed unit support portion and said center line taking the form of a detachable connection to permit either removal thereof or mounting it in said first position above the level of at least a portion of said retractable unit support portion, said retractable unit support portion extending between and under said first and second positions, whereby said unit may be selectively dropped in either said first or second position removing in said first setup or operatively connecting in said second setup said fixed unit support portion, and positioning conveyor drive means for driving said positioning conveyor in timed relationship with said transfer means in said second setup and for idling said positioning conveyor during driving of said transfer means in said first setup.

42. In a machine, means for moving sheet units along a path from a supply position to a final position, each of said units composed of one or more sheets and having one edge portion thereof composed of one or more folded edges, said moving means including a means for always exerting on said folded edge portion of any sheet unit a propelling force exerted along the direction of said path on an edge portion of said sheet unit during travel along said path, said supply position having a plurality of folded sheet packs with each sheet unit adapted to be formed by at least one sheet from each pack and said final position having a sheet unit receiving receptacle, said moving means including means for collating folded sheets from said packs at said supply position, for placing them fold first on a gathering conveyor, for pushing the sheets laterally into a compact unit as the sheets are supported on said conveyor by their fold, and means for transferring said sheet units individually from said conveyor onto a conveyor type sheet unit positioning means, and means for transferring said sheet units to a receptacle loading station by said positioning means and for transferring said sheet units into a receptacle at said final position.

References Cited in the file of this patent
UNITED STATES PATENTS

| | | |
|---|---|---|
| 635,177 | McCabe | Oct. 17, 1899 |
| 824,920 | Erickson | July 3, 1906 |
| 1,368,351 | Purrington | Feb. 15, 1921 |
| 1,696,294 | Crawford et al. | Dec. 25, 1928 |
| 1,711,647 | Milmoe | May 7, 1929 |
| 1,740,582 | Farmer | Dec. 24, 1929 |
| 1,977,732 | Mattler | Oct. 23, 1934 |
| 2,096,277 | Hohl et al. | Oct. 19, 1937 |
| 2,260,540 | Schramm | Oct. 28, 1941 |
| 2,408,838 | Wilckens et al. | Oct. 8, 1946 |
| 2,602,554 | Griffith | July 8, 1952 |
| 2,643,754 | Doak | June 30, 1953 |
| 2,645,327 | Hildmann | July 14, 1953 |
| 2,645,365 | Haessler | July 14, 1953 |
| 2,649,675 | Schrage | Aug. 25, 1953 |
| 2,783,873 | Lowe | Mar. 5, 1957 |
| 2,827,159 | Peteler | Mar. 18, 1958 |